(12) United States Patent
Hayashi et al.

(10) Patent No.: US 11,287,720 B2
(45) Date of Patent: Mar. 29, 2022

(54) SEMICONDUCTOR OPTICAL MODULATOR

(71) Applicant: Mitsubishi Electric Corporation, Chiyoda-ku (JP)

(72) Inventors: Shusaku Hayashi, Chiyoda-ku (JP); Koichi Akiyama, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/650,186

(22) PCT Filed: Aug. 9, 2018

(86) PCT No.: PCT/JP2018/029854
§ 371 (c)(1),
(2) Date: Mar. 24, 2020

(87) PCT Pub. No.: WO2019/106890
PCT Pub. Date: Jun. 6, 2019

(65) Prior Publication Data
US 2020/0225556 A1    Jul. 16, 2020

(30) Foreign Application Priority Data

Nov. 30, 2017 (JP) .............................. JP2017-230952
Dec. 28, 2017 (JP) .............................. JP2017-253671

(51) Int. Cl.
*G02F 1/225* (2006.01)
*G02B 6/293* (2006.01)
(Continued)

(52) U.S. Cl.
CPC ....... *G02F 1/2257* (2013.01); *G02B 6/29344* (2013.01); *G02F 1/2255* (2013.01);
(Continued)

(58) Field of Classification Search
CPC ...... G02F 1/011; G02F 1/2255; G02F 1/0356; G02F 1/2257; G02F 2201/127;
(Continued)

(56) References Cited

U.S. PATENT DOCUMENTS 4,380,364 A * 4/1983 Marcatili .............. G02F 1/3134
385/40
4,381,139 A * 4/1983 Alferness .............. G02F 1/3134
359/245
(Continued)

FOREIGN PATENT DOCUMENTS

JP    2015-129906 A    7/2015

OTHER PUBLICATIONS

International Search Report dated Sep. 11, 2018 in PCT/JP2018/029854 filed Aug. 9, 2018.

*Primary Examiner* — Robert Tavlykaev
(74) *Attorney, Agent, or Firm* — Xsensus LLP

(57) ABSTRACT

A semiconductor optical modulator includes a modulation region and a non-modulation region. A first width of a first ground electrode in the non-modulation region is larger than a second width of the first ground electrode in the modulation region. A third width of a second ground electrode in the non-modulation region is larger than a fourth width of the second ground electrode in the modulation region. In the non-modulation region, a first insulating layer is disposed between a first optical waveguide and a first traveling wave electrode and between a second optical waveguide and a second traveling wave electrode. For this reason, a bandwidth of the semiconductor optical modulator can be widened.

13 Claims, 24 Drawing Sheets

(51) Int. Cl.
*G02B 6/12* (2006.01)
*G02F 1/21* (2006.01)

(52) U.S. Cl.
CPC .... *G02B 2006/12142* (2013.01); *G02F 1/212* (2021.01); *G02F 2201/127* (2013.01)

(58) Field of Classification Search
CPC ......... G02F 2202/102; G02F 2001/212; G02F 2203/50; G02B 2006/12142
USPC ........................................................ 385/1–3
See application file for complete search history.

(56) References Cited

U.S. PATENT DOCUMENTS

| | | | | |
|---|---|---|---|---|
| 4,448,479 | A * | 5/1984 | Alferness | G02F 1/3134 385/2 |
| 4,553,810 | A * | 11/1985 | Alferness | G02F 1/0356 385/132 |
| 6,198,853 | B1 * | 3/2001 | Yamada | G02F 1/025 257/458 |
| 6,741,762 | B2 * | 5/2004 | Grinberg | G02F 1/0123 359/245 |
| 7,426,321 | B2 * | 9/2008 | Eriksson | G02F 1/035 385/2 |
| 8,917,958 | B2 * | 12/2014 | Prosyk | G02F 1/035 385/3 |
| 9,069,223 | B2 * | 6/2015 | Prosyk | G02F 1/011 |
| 2004/0052442 | A1 * | 3/2004 | Li | B82Y 20/00 385/3 |
| 2008/0304786 | A1 * | 12/2008 | Ishibashi | B82Y 20/00 385/3 |
| 2009/0034904 | A1 * | 2/2009 | Tsuzuki | G02F 1/025 385/14 |
| 2010/0142026 | A1 * | 6/2010 | Kato | G02F 1/025 359/248 |
| 2011/0235971 | A1 * | 9/2011 | Hashimoto | B82Y 20/00 385/31 |
| 2014/0355926 | A1 * | 12/2014 | Velthaus | G02F 1/225 385/3 |
| 2018/0203322 | A1 * | 7/2018 | Zhou | G02F 1/025 |
| 2019/0072834 | A1 * | 3/2019 | Kono | G02F 1/2257 |

\* cited by examiner

SEMICONDUCTOR OPTICAL MODULATOR

TECHNICAL FIELD

The present invention relates to a semiconductor optical modulator.

BACKGROUND ART

In recent years, a communication amount has increased due to the spread of PCs, smartphones, and the like. For this reason, in a Mach-Zehnder (Mach-Zehnder, hereinafter, referred to as "MZ") type optical modulator, which is generally adopted as an optical modulator, signal multiplexing is widely used by intensity modulation methods such as quaternary pulse amplitude modulation (PAM4) or phase modulation methods such as quadrature phase shift keying (QPSK) and 16-value quadrature amplitude modulation (16QAM). However, because noise immunity of the signal decreases with increasing signal density, a signal transmission distance is shortened when the signal multiplexing is performed. Consequently, the signal is not multiplexed, but the signal is driven at a modulation rate of 50 to 64 Gbps twice as high as the modulation rate of 25 to 32 Gbps, which is currently mainstream, and therefore it is necessary to increase a bit rate.

There is a problem in that a bandwidth of the optical modulator is widened because a modulation rate is enhanced while power consumption and degradation of signal quality are suppressed. In order to widen the wideband, it is necessary to optimize a capacitance and an inductance of the modulator to match an impedance. Japanese Patent Laying-Open No. 2015-129906 (PTL 1) discloses a semiconductor Mach-Zehnder type optical modulator including a mechanism that adjusts the impedance and speed of electricity. The semiconductor Mach-Zehnder type optical modulator disclosed in PTL 1 includes a Mach-Zehnder interferometer, a first traveling wave electrode, and a second traveling wave electrode.

CITATION LIST

Patent Literature

PTL 1: Japanese Patent Laying-Open No. 2015-129906

SUMMARY OF INVENTION

Technical Problem

An object of the present invention is to provide a semiconductor optical modulator having a wide band.

Solution to Problem

A semiconductor optical modulator of the present invention includes unit structures. Each of the unit structures includes a modulation region and a non-modulation region. A first width of a first ground electrode in the non-modulation region is different from a second width of the first ground electrode in the modulation region. A third width of a second ground electrode in the non-modulation region is different from a fourth width of the second ground electrode in the modulation region. A first insulating layer is disposed between a first optical waveguide and a first traveling wave electrode and between a second optical waveguide and a second traveling wave electrode in the non-modulation region.

Advantageous Effects of Invention

In the semiconductor optical modulator of the present invention, an impedance of a first line formed by the first traveling wave electrode, the second traveling wave electrode line, the first ground electrode, and the second ground electrode can be increased because the capacitance of the semiconductor optical modulator can be decreased. Furthermore, a microwave refractive index of the semiconductor optical modulator can be decreased. According to the semiconductor optical modulator of the present invention, the semiconductor optical modulator in which the broadband is widened can be provided.

DESCRIPTION OF EMBODIMENTS

Figure 1:
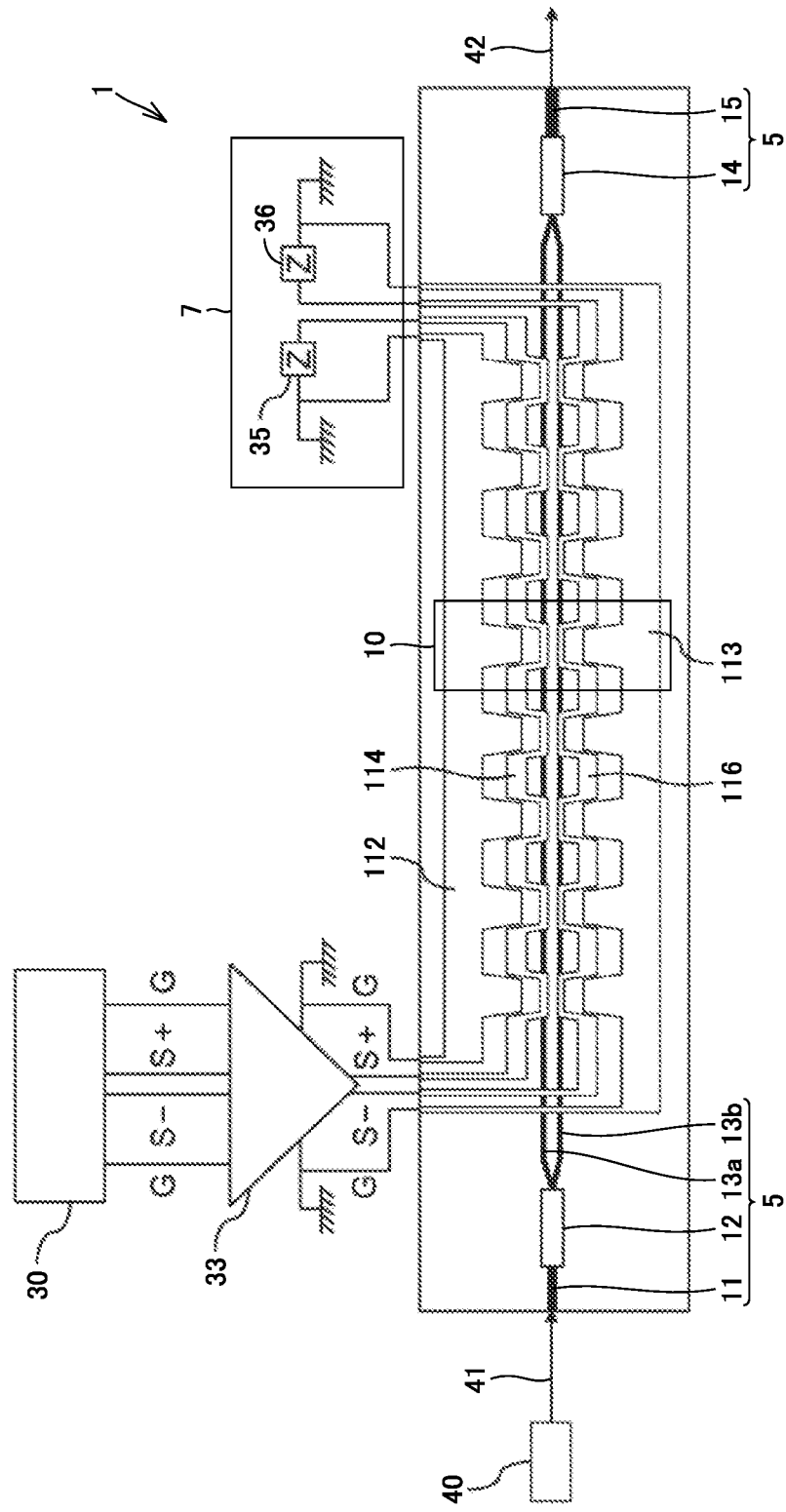
FIG. 1 is a schematic plan view of an optical modulator according to a first embodiment.

Hereinafter, embodiments of the present invention will be described. The same components are designated by the same reference numerals, and the overlapping description will be omitted.

First Embodiment

FIG. 1 schematically illustrates a configuration of an optical modulator 1 according to a first embodiment. Optical modulator 1 is an MZ (Mach-Zehnder) type optical modulator. Optical modulator 1 includes an optical waveguide 5 that is a first Mach-Zehnder type optical waveguide. Light 41 emitted from a laser light source 40 is input to optical waveguide 5 of optical modulator 1. Optical waveguide 5 divides light 41 and then multiplexes light 41. Light 41 passes through optical waveguide 5 of optical modulator 1, and is output.

Specifically, the first Mach-Zehnder type optical waveguide includes a first optical input unit 11, a first optical branch unit 12, a first optical waveguide 13a, a second optical waveguide 13b, and a first optical multiplex unit 14, and a first optical output unit 15. First optical branch unit 12 is connected to first optical input unit 11. For example, first optical branch unit 12 is a multi-mode interference (MMI) optical waveguide having a 1-input 2-output configuration or a 2-input 2-output configuration. First optical waveguide 13a and second optical waveguide 13b are connected to first optical branch unit 12. First optical multiplex unit 14 is connected to first optical waveguide 13a and second optical waveguide 13b. For example, first optical multiplex unit 14 is a multimode interference (MMI) optical waveguide having a 1-input 2-output configuration or a 2-input 2-output configuration. First optical output unit 15 is connected to first optical multiplex unit 14.

Optical modulator 1 includes ground electrodes 112, 113 connected to a ground (G), a first electrode 114 that transmits a positive signal S+ of a differential electric signal, and a second electrode 116 that transmits a negative signal S− of the differential electric signal. First electrode 114 is a first traveling wave electrode. Second electrode 116 is a second traveling wave electrode. Ground electrode 112 is a first ground electrode. Ground electrode 113 is a second ground electrode. In the description, the "electrode" includes, but is not limited to, a gold electrode and a platinum electrode, and includes electrodes of all conductors.

Positive signal S+ and negative signal S− of the differential electric signal are input to input sides (left side in FIG. 1) of first electrode 114 and second electrode 116, respectively. Positive signal S+ and negative signal S− of the differential electric signal are output by a signal source 30, and amplified by an electric amplifier 33. The first embodiment is not limited to this configuration, but conversely first electrode 114 may transmit negative signal S− and the second electrode may transmit positive signal S+.

Thus, optical modulator 1 has what is called a GSSG (Ground, Signal, Signal, Ground) type structure. Ground electrode 112, first electrode 114, second electrode 116, and ground electrode 113 constitute a first line. The first line is a GSSG (Ground, Signal, Signal, Ground) type differential line (coplanar line). The GSSG type differential line enables miniaturization of optical modulator 1. In the GSSG type differential line, first electrode 114 and second electrode 116 are adjacent to each other, so that noise immunity can be improved.

One end of first electrode 114 and one end of second electrode 116 are electrically connected to signal source 30. Signal source 30 outputs a differential signal. The differential signal is not particularly limited, but may have a high frequency of 20 Gbit/s or higher. A voltage having an opposite phase to second optical waveguide 13b is applied to first optical waveguide 13a (push-pull configuration). Electric amplifier 33 is disposed between signal source 30 and one end of first electrode 114 and between signal source 30 and one end of second electrode 116. Electric amplifier 33 amplifies the differential signal output from signal source 30, and outputs the amplified differential signal to one end of first electrode 114 and one end of second electrode 116.

First electrode 114 is disposed above first optical waveguide 13a. Second electrode 116 is disposed above second optical waveguide 13b. Ground electrode 112 is disposed on the opposite side to second electrode 116 with respect to first electrode 114, and disposed at a space from first electrode 114. Ground electrode 113 is disposed on the opposite side to first electrode 114 with respect to second electrode 116, and disposed at a space from second electrode 116. First electrode 114 and second electrode 116 are disposed between ground electrode 112 and ground electrode 113.

A termination 7 is connected to output sides (right side in FIG. 1) of first electrode 114 and second electrode 116. Thus, positive signal S+ and negative signal S− of the differential electric signal output from first electrode 114 and second electrode 116 of optical modulator 1 are input to termination 7. In the example of FIG. 1, 50-ohm resistors are connected to between positive signal S+ and the ground and between negative signal S− and the ground in termination 7. The connection of termination 7 is an example. For example, positive signal S+ and negative signal S− may be connected to each other through a 100-ohm resistor.

Termination 7 includes a first termination resistor 35 and a second termination resistor 36. The other end of first electrode 114 and ground electrode 112 are connected to first termination resistor 35. The other end of second electrode 116 and ground electrode 113 are connected to second termination resistor 36. Each of first termination resistor 35 and second termination resistor 36 has a resistance of 50Ω. Termination 7 has a differential impedance of 100Ω. First termination resistor 35 and second termination resistor 36 may have a resistance of 100Ω. One end of ground electrode 112 and one end of ground electrode 113 are connected to the grounding potential. The other end of ground electrode 112 and the other end of ground electrode 113 are connected to the grounding potential.

Figure 2:
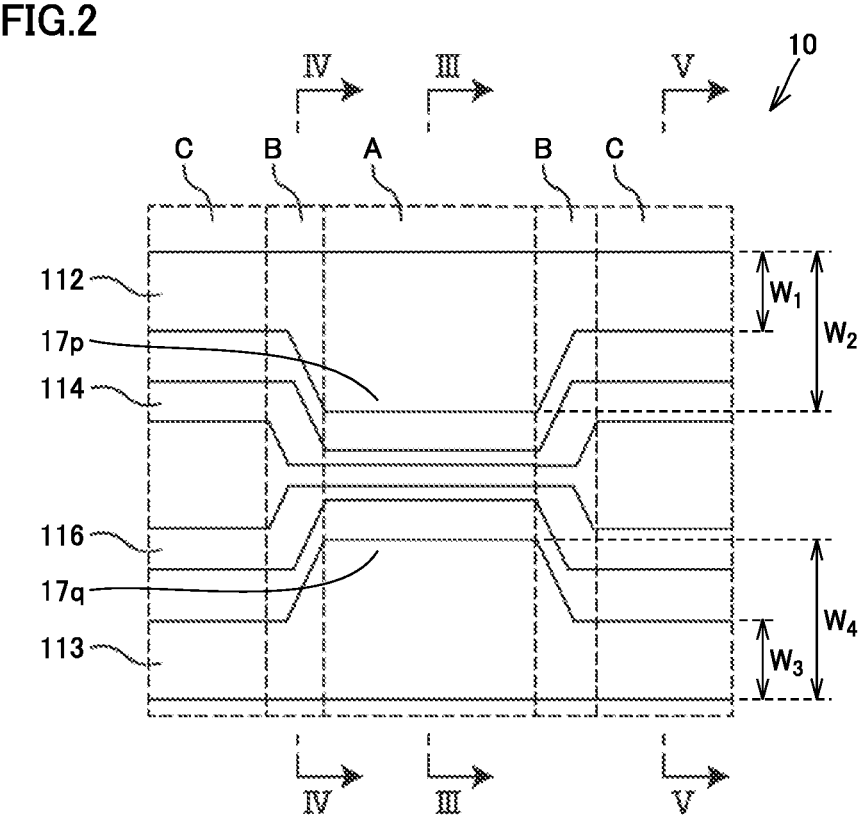
FIG. 2 is a partially enlarged plan view schematically illustrating the optical modulator of the first embodiment.

FIG. 2 is a schematic enlarged view of a part of optical modulator 1 of FIG. 1. Optical modulator 1 includes unit structures 10 arrayed along first optical waveguide 13a and second optical waveguide 13b. Optical modulator 1 has a periodic structure along first optical waveguide 13a and second optical waveguide 13b. Each of unit structures 10 has a three-segment configuration including a modulation portion A that modulates light, a non-modulation portion C that does not modulate light, and a transition portion B formed between modulation portion A and non-modulation portion C. Transition portion B is configured such that the electric signal is reflected as small as possible between modulation portion A and non-modulation portion C. Each of unit structures 10 includes modulation portion A, a first transition portion B adjacent in a longitudinal direction of modulation portion A, non-modulation portion C adjacent in the longitudinal direction of first transition portion B, and a second transition portion B adjacent in the longitudinal direction of non-modulation portion C. Unit structures 10 are repeated in the longitudinal direction (light traveling direction).

A first width $W_1$ of ground electrode 112 in non-modulation portion C is different from a second width $W_2$ of ground electrode 112 in modulation portion A. Specifically, first width $W_1$ of ground electrode 112 in non-modulation portion C is smaller than second width $W_2$ of ground electrode 112 in modulation portion A. A third width $W_3$ of ground electrode 113 in non-modulation portion C is different from a fourth width $W_4$ of ground electrode 113 in modulation portion A. Specifically, third width $W_3$ of ground electrode 113 in non-modulation portion C is smaller than fourth width $W_4$ of ground electrode 113 in modulation portion A.

A space between first electrode 114 and second electrode 116 in modulation portion A is smaller than a space between first electrode 114 and second electrode 116 in non-modulation portion C. In transition portion B, the space between first electrode 114 the second electrode 116 decreases gradually as it goes from non-modulation portion C to modulation portion A. In transition portion B, the width of ground electrode 112 gradually increases from non-modulation portion C to modulation portion A. In transition portion B, the width of ground electrode 113 gradually increases from non-modulation portion C toward modulation portion A.

In modulation portion A, ground electrode 112 may include a first protrusion 17p. First protrusion 17p is formed on a first side surface of ground electrode 112 facing first electrode 114, and may protrude toward first electrode 114. In non-modulation portion C, ground electrode 113 may include a second protrusion 17q. Second protrusion 17q is formed on a second side surface of ground electrode 113 facing second electrode 116, and may protrude toward second electrode 116.

First electrode 114, second electrode 116, ground electrode 112, and ground electrode 113 are formed on a low-dielectric constant material layer 120. Thus, as illustrated in FIG. 2, low-dielectric constant material layer 120 is visible between ground electrode 112 and first electrode 114, between first electrode 114 and second electrode 116, and between second electrode 116 and ground electrode 113.

In the description, the "low-dielectric constant material" includes, for example, benzochlorobutene (BCB), but is not limited to BCB, and includes all dielectrics.

Figure 3:
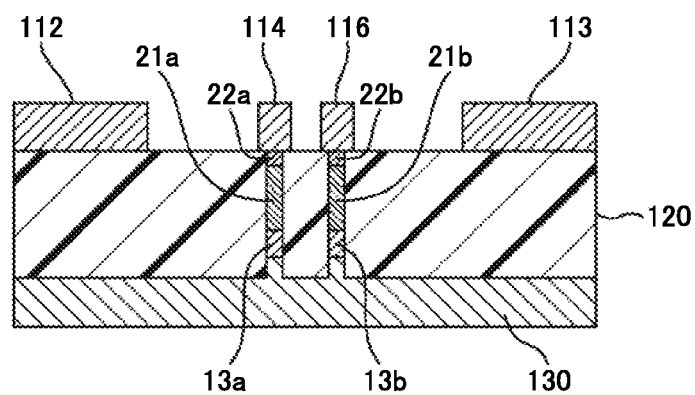
FIG. 3 is a schematic sectional view of the optical modulator of the first embodiment taken along a sectional line III-III in FIG. 2.

FIG. 3 is a sectional view of optical modulator 1 in FIG. 2 as viewed in a direction. Thus, FIG. 3 illustrates a section of modulation portion A of optical modulator 1. Modulation portion A includes an n layer 130 made of an n-type semiconductor such as n-type indium phosphide (n-InP). n layer 130 is a first semiconductor layer. A portion constituting an optical path on n layer 130 rises up in a convex shape, and therefore has a shape capable of forming what is called a high mesa type optical waveguide on the convex shape. An optical waveguide layer (first optical waveguide 13a, second optical waveguide 13b) made of a multiple quantum well (MQW) and an undoped semiconductor such as i-type (intrinsic) indium phosphide (i-InP) is formed in a portion above n layer 130.

A p layer (second semiconductor layers 21a, 21b) made of a p-type semiconductor such as p-type indium phosphide (p-InP) is formed on the optical waveguide layer (first optical waveguide 13a, second optical waveguide 13b). Contact layers 22a, 22b made of, for example, a p-type indium gallium arsenide (p-InGaAs) are formed on the p layer (second semiconductor layers 21a, 21b). First electrode 114 and second electrode 116 are formed on contact layers 22a, 22b with a space interposed therebetween. Contact layers 22a, 22b and first electrode 114 and second electrode 116 are in ohmic contact with each other through a high temperature treatment.

A portion located above n layer 130 and below first electrode 114 and second electrode 116, the optical waveguide layer (first optical waveguide 13a, second optical waveguide 13b), the p layer (second semiconductor layers 21a, 21b), and contact layers 22a, 22b being not formed in the portion, is filled with low-dielectric constant material layer 120. Low-dielectric constant material layer 120 is a buried layer. Ground electrodes 112, 113 are formed on low-dielectric constant material layer 120 at a space from first electrode 114 and second electrode 116, respectively.

When an electric signal flows through first electrode 114 and second electrode 116, and thus a voltage is applied to first electrode 114 and second electrode 116, an electric field is generated in a p-i-n junction including the p layer (second semiconductor layers 21a, 21b), the optical waveguide layer (first optical waveguide 13a, second optical waveguide 13b), and n layer 130 through contact layers 22a, 22b that are in ohmic contact with first electrode 114 and second electrode 116 in modulation section A. An optical confinement factor in the optical waveguide layer (first optical waveguide 13a, second optical waveguide 13b) is changed by the electric field, and a refractive index of the optical waveguide layer (first optical waveguide 13a, second optical waveguide 13b) is changed. A phase of the light input to the optical waveguide layer (first optical waveguide 13a, second optical waveguide 13b) is modulated due to the refractive index change. Optical modulator 1 is a semiconductor optical modulator.

Figure 4:
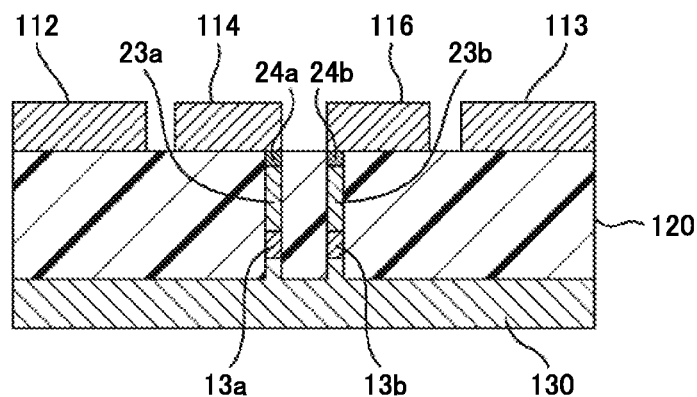
FIG. 4 is a schematic sectional view of the optical modulator of the first embodiment taken along a sectional line IV-IV in FIG. 2.

FIG. 4 is a sectional view of optical modulator 1 in FIG. 2 as viewed in a IV-IV direction. Thus, FIG. 4 illustrates a section of transition portion B of optical modulator 1. Similarly to modulation portion A, transition portion B includes n layer 130, the optical waveguide layer (first optical waveguide 13a, second optical waveguide 13b) on n layer 130, and low-dielectric constant material layer 120 filling surroundings of n layer 130 and the optical waveguide layer. However, in transition portion B, unlike modulation portion A, an insulating layer (second insulating layers 23a, 23b) is formed on the optical waveguide layer (first optical waveguide 13a, second optical waveguide 13b). The insulating layer (second insulating layers 23a, 23b) is made of, for example, i-InP or Fe—InP, but is not limited to i-InP or Fe—InP, and includes all dielectric materials. A surface layer (first insulating layers 24a, 24b) made of a dielectric, typically an insulator such as $SiO_2$ is formed on the insulating layer (second insulating layers 23a, 23b). First electrode 114 and second electrode 116 are formed on the surface layer (first insulating layers 24a, 24b) with a space interposed therebetween. Ground electrodes 112, 113 are formed on low-dielectric constant material layer 120 at a space from first electrode 114 and second electrode 116, respectively.

In this way, unlike modulation portion A, the p-i-n junction does not exist in transition portion B. Even when the electric signal flows through first electrode 114 and second electrode 116, and thus even when the voltage is applied to first electrode 114 and second electrode 116, the electric field change is hardly changed in the optical waveguide layer (first optical waveguide 13a, second optical waveguide 13b), and phase modulation of the light is hardly generated.

Figure 5:
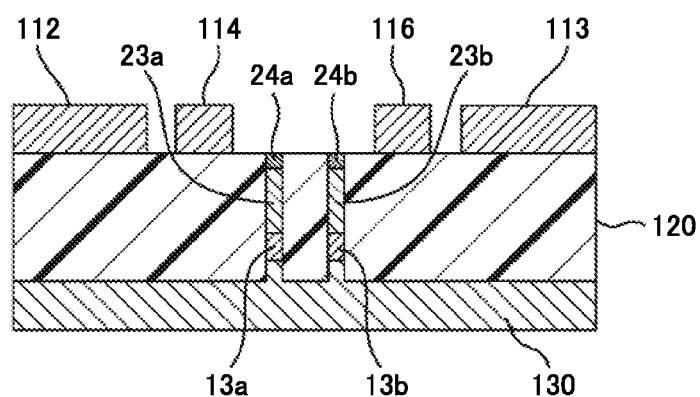
FIG. 5 is a schematic sectional view of the optical modulator of the first embodiment taken along a sectional line V-V in FIG. 2.

FIG. 5 is a sectional view of optical modulator 1 in FIG. 2 as viewed in a V-V direction. Thus, FIG. 5 illustrates a section of non-modulation portion C of optical modulator 1. The structure of non-modulation portion C is the same as that of transition portion B except for shapes and positions of ground electrodes 112, 113, first electrode 114, and second electrode 116. Because the p-i-n junction does not exist in non-modulation portion C, the phase modulation of the light is hardly generated even if the electric signal flows through first electrode 114 and second electrode 116.

Operation of optical modulator 1 will be described below.

As illustrated in FIG. 1, light 41 is input from laser light source 40 to first optical input unit 11. Light 41 is input from first optical input unit 11 to first optical branch unit 12. In first optical branch unit 12, light 41 is branched into first partial light propagating through first optical waveguide 13a and second partial light propagating through second optical waveguide 13b.

A first microwave propagating through first electrode 114 changes the refractive index of first optical waveguide 13a in modulation portion A. The first partial light propagating through first optical waveguide 13a is modulated by the first microwave propagating through first electrode 114. A second microwave propagating through second electrode 116 changes the refractive index of second optical waveguide 13b in modulation portion A. The second partial light propagating through second optical waveguide 13b is modulated by the second microwave propagating through second electrode 116. The modulated first partial light and the modulated second partial light are multiplexed by first optical multiplex unit 14 to become modulated light 42. Modulated light 42 is output from first optical output unit 15.

Widening a bandwidth of an optical signal by optical modulator 1 of the first embodiment will be described below. In order to widen the bandwidth of the optical signal, it is necessary to decrease reflection of the electric signal as much as possible, and to match phase velocities of the microwave that is the electric signal and the light. For this reason, the impedance needs to be brought close to 100 ohms (50 ohms for single phase driving) and the microwave refractive index needs to be brought close to 3.6 when differential driving of the impedance is performed. An impedance $Z_1$ and a microwave refractive index $n_m$ are given by the following equations (1), (2).

[Mathematical Formula 1]

$$Z_1 = \sqrt{\frac{L}{C}} \quad (1)$$

[Mathematical Formula 2]

$$n_m = c\sqrt{CL} \quad (2)$$

Where C represents a capacitance of optical modulator 1, L represents an inductance of optical modulator 1, and c represents a speed of light in vacuum.

Figure 6:
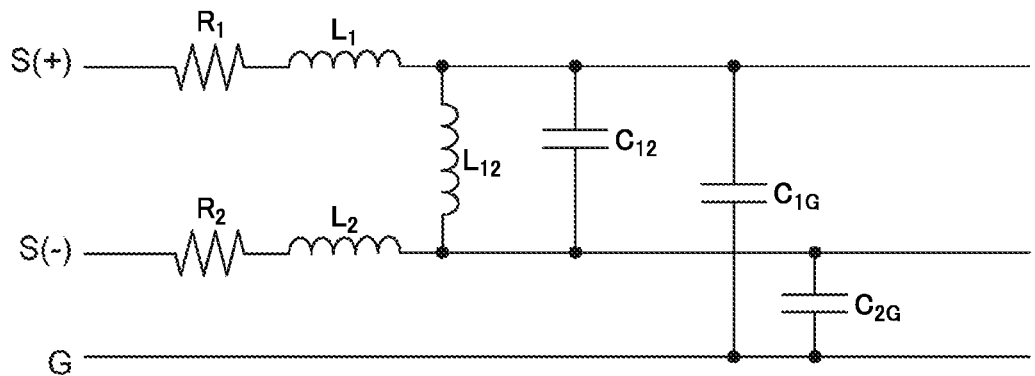
FIG. 6 is a view illustrating an electric circuit model of the optical modulator of the first embodiment.

As illustrated in FIG. 6, optical modulator 1 includes a first resistance $R_1$ of first electrode 114, a first inductance $L_1$ of first electrode 114, a second resistance $R_2$ of second electrode 116, a second inductance $L_2$ of second electrode 116, and a mutual inductance $L_{12}$ between first electrode 114 and second electrode 116. Optical modulator 1 further includes a first mutual capacitance $C_{1G}$ between first electrode 114 and ground electrode 112, a second mutual capacitance $C_{2G}$ between second electrode 116 and ground electrode 113, and a third mutual capacitance $C_{12}$ between first electrode 114 and second electrode 116. Although strictly a mutual capacitance between first electrode 114 and ground electrode 113 and a mutual capacitance between second electrode 116 and ground electrode 112 also exist, these are negligibly small as compared with $C_{1G}$ and $C_{2G}$, and excluded from consideration.

Figure 7:
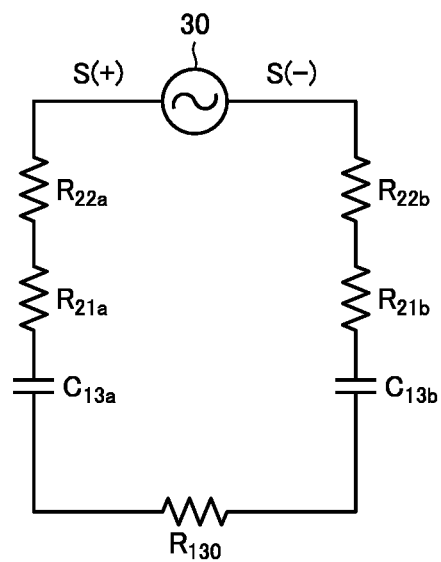
FIG. 7 is a view illustrating an electric circuit model of a modulation unit in the optical modulator of the first embodiment.

As illustrated in FIG. 7, modulation portion A includes a resistance $R_{130}$ of n layer 130, a capacitance (a capacitance $C_{13a}$ of first optical waveguide 13a and a capacitance $C_{13b}$ of second optical waveguide 13b) of the optical waveguide layer, a resistance (a resistance $R_{21a}$ of second semiconductor layer 21a and a resistance $R_{21b}$ of second semiconductor layer 21b) of the p layer, a resistance (a resistance $R_{22a}$ of contact layer 22a and a resistance $R_{22b}$ of contact layer 22b) of the contact layer. Resistances $R_{130}$, $R_{21a}$, $R_{21b}$, $R_{22a}$, $R_{22b}$ and capacitances $C_{13a}$, $C_{13b}$ are connected in series.

Figure 8:
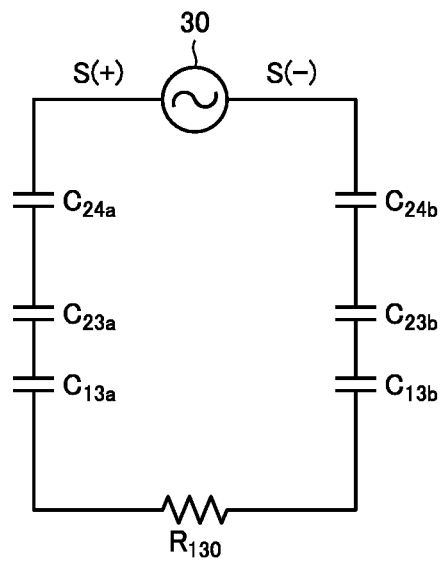
FIG. 8 is a view illustrating an electrical circuit model of a transition unit and a non-modulation portion in the optical modulator of the first embodiment.

As illustrated in FIG. 8, transition portion B and non-modulation portion C include resistance $R_{130}$ of n layer 130, the capacitance (capacitance $C_{13a}$ of first optical waveguide 13a, and capacitance $C_{13b}$ of second optical waveguide 13b) of the optical waveguide layer, a capacitance (a capacitance $C_{23a}$ of second insulating layer 23a, and a capacitance $C_{23b}$ of second insulating layer 23b) of the insulating layer, and a capacitance (a capacitance $C_{24a}$ of first insulating layer 24a and a capacitance $C_{24b}$ of first insulating layer 24b) of the surface layer. Resistance $R_{130}$ and capacitances $C_{13a}$, $C_{13b}$, $C_{23a}$, $C_{23b}$, $C_{24a}$, $C_{24b}$ are connected in series. In this way, the capacitance of non-modulation portion C and the capacitance of transition portion B are smaller than the capacitance of modulation portion A because not only the capacitance (capacitance $C_{13a}$ of first optical waveguide 13a and capacitance $C_{13b}$ of second optical waveguide 13b) of the optical waveguide layer but also the capacitance (capacitance $C_{24a}$ of first insulating layer 24a and capacitance $C_{24b}$ of first insulating layer 24b) of the surface layer and the capacitance (capacitance $C_{23a}$ of second insulating layer 23a and capacitance $C_{23b}$ of second insulating layer 23b) of the insulating layer exist in transition portion B and non-modulation portion C.

In optical modulator 1 of the first embodiment having the differential driving structure, the impedance of optical modulator 1 needs to be brought close to 100 ohms that is twice that of the single phase driving. Thus, the capacitance is preferably as small as possible. The capacitance is given by the following equation (3).

[Mathematical Formula 3]

$$C = \varepsilon \frac{S}{d} \quad (3)$$

Where $\varepsilon$ is a dielectric constant of the insulator between pole plates, S is an area of the plate, and d is a distance between the pole plates.

In optical modulator 1 of the first embodiment, the inductances and capacitances of modulation portion A, transition portion B, and non-modulation portion C are individually adjusted by adjusting widths of ground electrodes 112, 113, first electrode 114, and second electrode 116 in modulation portion A, transition portion B, and non-modulation portion C, the distance between first electrode 114 and ground electrode 112, and the distance between second electrode 116 and ground electrode 113.

The impedance of optical modulator 1 can be adjusted by adjusting a thickness of the optical waveguide layer (first optical waveguide 13a and second optical waveguide 13b). For example, when the thickness of the optical waveguide layer (first optical waveguide 13a and second optical waveguide 13b) is increased, the capacitance (capacitance $C_{13a}$ of the first optical waveguide 13a and capacitance $C_{13b}$ of second optical waveguide 13b) of the optical waveguide layer is decreased. Thus, in this case, the capacitance of modulation portion A is decreased.

As described above, the impedance of optical modulator 1 can be adjusted by adjusting the width of the electrode, the distance between the electrodes, and the thickness of the optical waveguide layer (first optical waveguide 13a and second optical waveguide 13b). As described above, the capacitance of non-modulation portion C and the capacitance of transition portion B are smaller than the capacitance of modulation portion A because not only the capacitance (capacitance $C_{13a}$ of first optical waveguide 13a and capacitance $C_{13b}$ of second optical waveguide 13b) of the optical waveguide layer but also the capacitance (capacitance $C_{24a}$ of first insulating layer 24a and capacitance $C_{24b}$ of first insulating layer 24b) of the surface layer and the capacitance (capacitance $C_{23a}$ of second insulating layer 23a and capacitance $C_{23b}$ of second insulating layer 23b) of the insulating layer exist in transition portion B and non-modulation portion C. Thus, an average impedance over an entire length of optical modulator 1 can easily be brought close to 100 ohms by repeating the structures of modulation portion A, transition portion B, and non-modulation portion C.

The light passing through the structures of transition portion B and non-modulation portion C is not modulated, so that the length in a longitudinal direction of modulation portion A in optical modulator 1 is preferably longer than the lengths in the longitudinal direction of transition portion B and non-modulation portion C in order to achieve desired optical modulation by optical modulator 1 having a compact size. For example, the length in the longitudinal direction of modulation portion A ranges from 50% to 70% of the length of unit structure 10 of optical modulator 1.

Preferably the length of unit structure 10 of optical modulator 1 is small, and a repetition period of unit structure 10 is small. This is because when the repetition period of unit structure 10 is small, the impedance does not greatly deviate from 100 ohms over the entire longitudinal direction of optical modulator 1 as compared with the large repetition period, and an electrical characteristic of optical modulator 1 is kept well. For example, the length in the longitudinal direction of one unit structure 10 ranges from 100 μm to 500 μm, but is not limited thereto, and may be less than or equal to 100 μm.

The length in the longitudinal direction of transition portion B ranges typically from 10% to 20% of the length in the longitudinal direction of modulation portion A. The widths of ground electrodes 112, 113, first electrode 114, and second electrode 116 in transition portion B, the distance between first electrode 114 and ground electrode 112, and the distance between second electrode 116 and ground electrode 113 are designed to decrease the reflection of the high-frequency electric signal.

As described above, in the first embodiment, the widths of ground electrodes 112, 113, first electrode 114, and second electrode 116 in modulation portion A, transition portion B, and non-modulation portion C, the distance between first electrode 114 and ground electrode 112, and the distance between second electrode 116 and ground electrode 113, and a ratio of modulation portion A, transition portion B, and non-modulation portion C in one unit structure 10 and the length in the longitudinal direction of one unit structure 10 are adjusted, so that the capacitance and inductance can finely be adjusted. Thus, the impedance of optical modulator 1 can be brought close to 100 ohms, and the microwave refractive index can be brought close to 3.6, so that widening the bandwidth of the optical signal can be achieved.

The effect of optical modulator 1 of the first embodiment will be described.

Optical modulator 1 includes a first Mach-Zehnder type optical waveguide, a first traveling wave electrode (first electrode 114), a second traveling wave electrode (second electrode 116), and the first ground electrode (ground electrode 112), the second ground electrode (ground electrode 113), and first insulating layers 24a, 24b. The first Mach-Zehnder type optical waveguide includes first optical input unit 11, first optical branch unit 12 connected to first optical input unit 11, first optical waveguide 13a connected to first optical branch unit 12, second optical waveguide 13b connected to first optical branch unit 12, first optical multiplex unit 14 connected to first optical waveguide 13a and second optical waveguide 13b, and first optical output unit 15 connected to first optical multiplex unit 14. The first traveling wave electrode (first electrode 114) is disposed above first optical waveguide 13a. The second traveling wave electrode (second electrode 116) is disposed above second optical waveguide 13b. The first ground electrode (ground electrode 112) is disposed on the opposite side to the second traveling wave electrode (second electrode 116) with respect to the first traveling wave electrode (first electrode 114), and disposed at a space from the first traveling wave electrode (first electrode 114). The second ground electrode (ground electrode 113) is disposed on the opposite side to the first traveling wave electrode (first electrode 114) with respect to the second traveling wave electrode (second electrode 116), and disposed at a space from the second traveling wave electrode (second electrode 116).

Optical modulator 1 includes unit structures 10 arrayed along first optical waveguide 13a and second optical waveguide 13b. Each of unit structures 10 includes a modulation region (modulation portion A) and a non-modulation region (non-modulation portion C). First width $W_1$ of the first ground electrode (ground electrode 112) in the non-modulation region (non-modulation portion C) is different from second width $W_2$ of the first ground electrode (ground electrode 112) in the modulation region (modulation portion A). Third width $W_3$ of the second ground electrode (ground electrode 113) in the non-modulation region (non-modulation portion C) is different from fourth width $W_4$ of the second ground electrode (ground electrode 113) in the modulation region (modulation portion A). In the non-modulation region (non-modulation portion C), first insulating layers 24a, 24b are disposed between first optical waveguide 13a and first traveling wave electrode (first electrode 114) and between second optical waveguide 13b and the second traveling wave electrode (second electrode 116).

In optical modulator 1, the capacitance of the non-modulation region (non-modulation portion C) is decreased, and capacitance C of optical modulator 1 is decreased. For this reason, impedance $Z_1$ of the first line of optical modulator 1 can be increased. Microwave refractive index $n_m$ of optical modulator 1 can be decreased. The bandwidth of optical modulator 1 can be widened.

In optical modulator 1, first width $W_1$ of the first ground electrode (ground electrode 112) in the non-modulation region (non-modulation portion C) is smaller than second width $W_2$ of the first ground electrode (ground electrode 112) in the modulation region (modulation portion A). Third width $W_3$ of the second ground electrode (ground electrode 113) in the non-modulation region (non-modulation portion C) is smaller than fourth width $W_4$ of the second ground electrode (ground electrode 113) in the modulation region (modulation portion A). The bandwidth of optical modulator 1 can be widened.

In optical modulator 1, each of unit structures 10 includes a transition region (transition portion B) disposed between the modulation region (modulation portion A) and the non-modulation region (non-modulation portion C). In the transition region (transition portion B), a first space between the first traveling wave electrode (first electrode 114) and the second traveling wave electrode (second electrode 116) gradually changes. In the transition region (transition portion B), the width of the first ground electrode (ground electrode 112) and the width of the second ground electrode (ground electrode 113) gradually change. The reflection of the microwave propagating through the first traveling wave electrode (first electrode 114) and the second traveling wave electrode (second electrode 116) between the modulation region (modulation portion A) and the non-modulation region (non-modulation portion C) can be decreased in the transition region (transition portion B). The bandwidth of optical modulator 1 can be widened.

Second Embodiment

Figure 9:
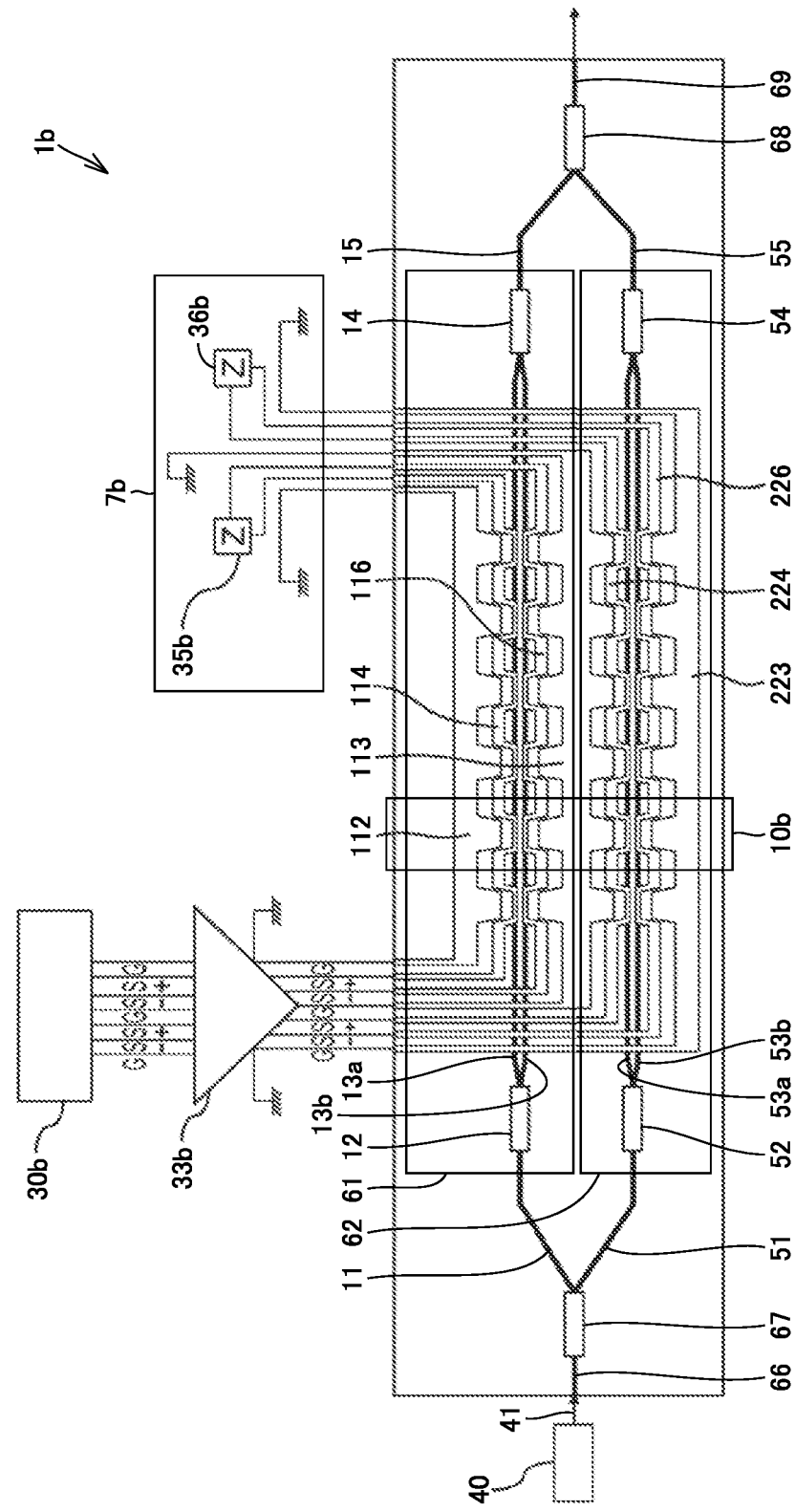
FIG. 9 is a schematic plan view of an optical modulator according to a second embodiment.

FIG. 9 schematically illustrates a configuration of an optical modulator 1b according to a second embodiment. In FIG. 9, the same reference numeral as that in FIG. 1 denotes the same or corresponding part. In the following description, generally a point different from the first embodiment will mainly be described, and overlapping descriptions for other portions will be omitted.

Optical modulator 1b further includes a second Mach-Zehnder type optical waveguide, a third electrode 224, a fourth electrode 226, a ground electrode 223, an optical input unit 66, an optical branch unit 67, an optical multiplex unit 68, and an optical output unit 69. The second Mach-Zehnder type optical waveguide is disposed in parallel with the first Mach-Zehnder type optical waveguide. The second Mach-Zehnder type optical waveguide has the same configuration as the first Mach-Zehnder type optical waveguide. Third electrode 224 is a third traveling wave electrode. Fourth electrode 226 is a fourth traveling wave electrode. Ground electrode 223 is a third ground electrode.

Specifically, the second Mach-Zehnder type optical waveguide includes a second optical input unit 51, a second optical branch unit 52, a third optical waveguide 53a, a fourth optical waveguide 53b, and a second optical multiplex unit 54, and a second optical output unit 55. Second optical branch unit 52 is connected to second optical input unit 51. Third optical waveguide 53a and fourth optical waveguide 53b are connected to second optical branch unit 52. Second optical multiplex unit 54 is connected to third optical waveguide 53a and fourth optical waveguide 53b. Second optical output unit 55 is connected to second optical multiplex unit 54.

Optical branch unit 67 is connected to optical input unit 66. Optical branch unit 67 is connected to first optical input unit 11 and second optical input unit 51. The first Mach-Zehnder type optical waveguide and the second Mach- Zehnder type optical waveguide are connected to optical branch unit 67. Optical multiplex unit 68 is connected to first optical output unit 15 and second optical output unit 55. The first Mach-Zehnder type optical waveguide and the second Mach-Zehnder type optical waveguide are connected to optical multiplex unit 68. Optical output unit 69 is connected to optical multiplex unit 68.

Third electrode 224 is disposed above third optical waveguide 53a. Fourth electrode 226 is disposed above fourth optical waveguide 53b. Ground electrode 113 is disposed on the opposite side to fourth electrode 226 with respect to third electrode 224, and disposed separately from third electrode 224. Ground electrode 223 is disposed on the opposite side to third electrode 224 with respect to fourth electrode 226, and disposed separately from fourth electrode 226. Third electrode 224 and fourth electrode 226 are disposed between ground electrode 113 and ground electrode 223.

Optical modulator 1b includes a first Mach-Zehnder optical modulator portion 61 and a second Mach-Zehnder optical modulator portion 62. First Mach-Zehnder optical modulator portion 61 is configured in the same manner as optical modulator 1 of the first embodiment. First Mach-Zehnder optical modulator portion 61 mainly includes the first Mach-Zehnder type optical waveguide, first electrode 114, second electrode 116, a first ground electrode 17a, and ground electrode 113.

Second Mach-Zehnder optical modulator portion 62 is configured in the same manner as first Mach-Zehnder optical modulator portion 61. Second Mach-Zehnder optical modulator portion 62 mainly includes the second Mach-Zehnder type optical waveguide, third electrode 224, fourth electrode 226, ground electrode 113, and ground electrode 223. Ground electrode 113 electrically separates third electrode 224 and fourth electrode 226 from first electrode 114 and second electrode 116. For this reason, crosstalk between first Mach-Zehnder optical modulator portion 61 and second Mach-Zehnder optical modulator portion 62 is decreased. In optical modulator 1b, ground electrode 113 is shared by first Mach-Zehnder optical modulator portion 61 and second Mach-Zehnder optical modulator portion 62. For this reason, optical modulator 1b can be downsized.

Ground electrode 113, third electrode 224, fourth electrode 226, and ground electrode 223 constitute a second line. The second line is a GSSG (Ground, Signal, Signal, Ground) type differential line (coplanar line). The GSSG type differential line can downsize optical modulator 1b. In the GSSG type differential line, third electrode 224 and fourth electrode 226 are adjacent to each other, so that the noise immunity can be improved.

One end of third electrode 224 and one end of fourth electrode 226 are electrically connected to a signal source 30b. Signal source 30b outputs a differential signal. The differential signal is not particularly limited, but may have a high frequency of 20 Gbit/s or higher. A voltage having an opposite phase to that of fourth optical waveguide 53b is applied to third optical waveguide 53a (push-pull configuration). An electric amplifier 33b is disposed between signal source 30b and one end of third electrode 224 and between signal source 30b and one end of fourth electrode 226. Electric amplifier 33b amplifies the differential signal output from signal source 30b, and outputs the amplified differential signal to one end of third electrode 224 and one end of fourth electrode 226.

Optical modulator 1b may be an IQ optical modulator. First Mach-Zehnder optical modulator portion 61 is called an Ich modulator, and second Mach-Zehnder optical modulator portion 62 is called a Qch modulator. For example, first Mach-Zehnder optical modulator portion 61 includes ground electrodes 112, 113 connected to the ground, first electrode 114 that transmits a positive signal S1+ of a first differential electric signal, and second electrode 116 that transmits a negative signal of the first differential electric signal. Second Mach-Zehnder optical modulator portion 62 includes ground electrodes 113, 223 connected to the ground, third electrode 224 that transmits a positive signal S2+ of a second differential electric signal, and fourth electrode 226 that transmits a negative signal S2− of the second differential electric signal. As described above, optical modulator 1b has what is called a GSSGSSG type structure.

In FIG. 9, ground electrodes 112, 113, 223 are connected to the ground. Positive signal S1+ of the first differential electric signal is input to an input side (left side in FIG. 9) of first electrode 114. Negative signal of the first differential electric signal is input to the input side of second electrode 116. Positive signal S2+ of the second differential electric signal is input to third electrode 224. Negative signal S2− of the second differential electric signal is input to fourth electrode 226. These two sets of differential electric signals are output by signal source 30b, and amplified by electric amplifier 33b.

A termination 7b is connected to the output sides (right side in FIG. 9) of first electrode 114, second electrode 116, third electrode 224, and fourth electrode 226. Thus, positive signal S1+ of the first differential electric signal output from first electrode 114 of optical modulator 1b, negative signal of the first differential electric signal output from second electrode 116, positive signal S2+ of the second differential electric signal output from third electrode 224, and negative signal S2− of the second differential electric signal output from fourth electrode 226 are input to termination 7b. In the example of FIG. 9, in termination 7b, a 100-ohm resistor is connected between positive signal S1+ of the first differential electric signal and negative signal S1− of the first differential electric signal and between positive signal S2+ of the second differential electric signal and negative signal S2− of the second differential electric signal.

Termination 7b includes a first termination resistor 35b and a second termination resistor 36b. The other end of first electrode 114 and the other end of second electrode 116 may be connected to first termination resistor 35b. First termination resistor 35b may have a resistance of 100Ω. The other end of third electrode 224 and the other end of fourth electrode 226 may be connected to second termination resistor 36b. Second termination resistor 36b may have a resistance of 100Ω. One end of ground electrode 112, one end of ground electrode 113, and one end of ground electrode 223 are connected to the grounding potential. The other end of ground electrode 112, the other end of ground electrode 113, and the other end of ground electrode 223 are connected to the grounding potential.

Optical modulator 1b includes unit structures 10b. Optical modulator 1b has a periodic structure along first optical waveguide 13a and second optical waveguide 13b, and has a periodic structure along third optical waveguide 53a and fourth optical waveguide 53b. Similarly to the first embodiment, optical modulator 1b of the second embodiment has a configuration in which modulation portion A, transition portion B, and non-modulation portion C are repeated in the longitudinal direction.

Figure 10:
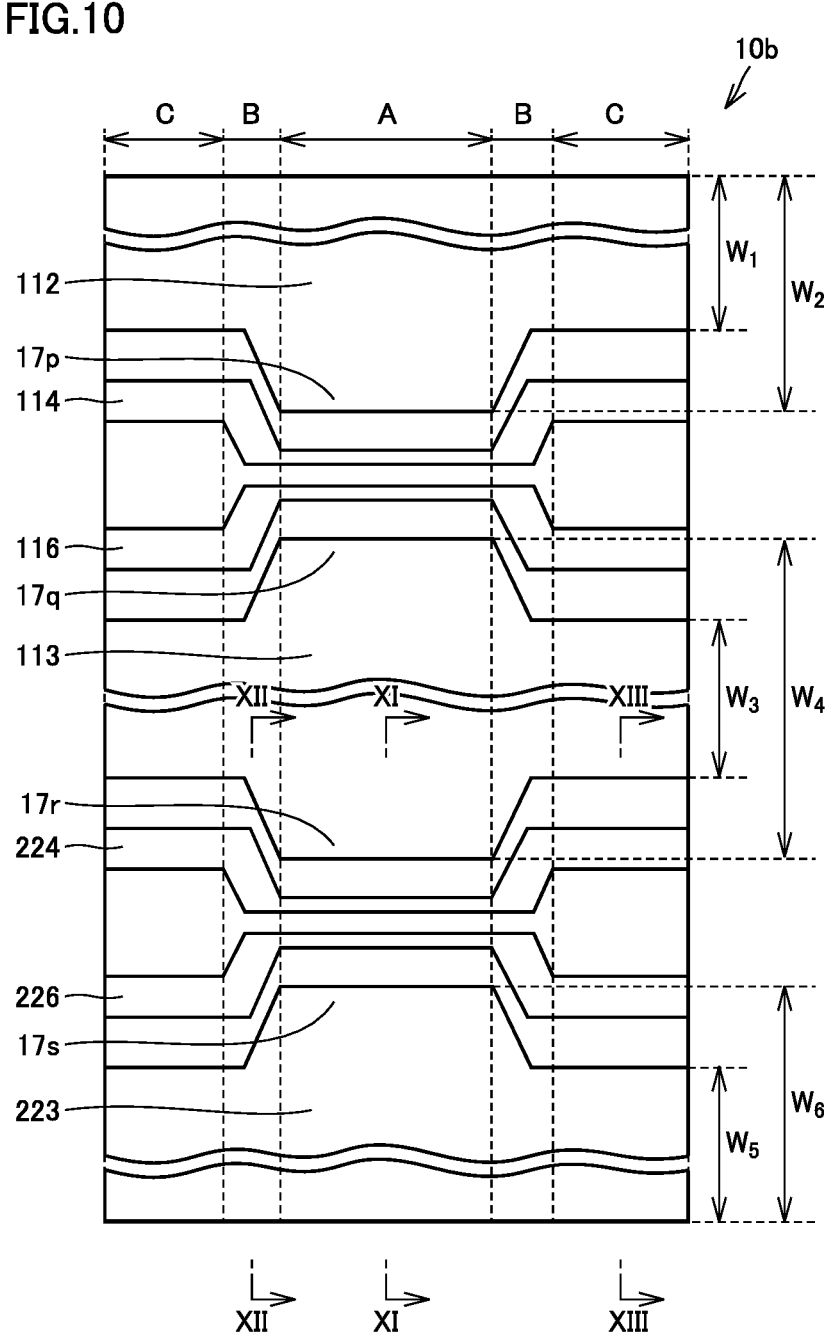
FIG. 10 is a partially enlarged plan view schematically illustrating the optical modulator of the second embodiment.

Unit structures 10b are arrayed along third optical waveguide 53a and fourth optical waveguide 53b. As illustrated in FIG. 10, each of unit structures 10b includes modulation portion A. non-modulation portion C, and transition portion B formed between modulation portion A and non-modulation portion C. Transition portion B is configured such that the electric signal is reflected as small as possible between modulation portion A and non-modulation portion C.

A first width $W_1$ of ground electrode 112 in non-modulation portion C is different from a second width $W_2$ of ground electrode 112 in modulation portion A. Specifically, first width $W_1$ of ground electrode 112 in non-modulation portion C is smaller than second width $W_2$ of ground electrode 112 in modulation portion A. A third width $W_3$ of ground electrode 113 in non-modulation portion C is different from a fourth width $W_4$ of ground electrode 113 in modulation portion A. Specifically, third width $W_3$ of ground electrode 113 in non-modulation portion C is smaller than fourth width $W_4$ of ground electrode 113 in modulation portion A. A fifth width $W_5$ of ground electrode 223 in non-modulation portion C is different from a sixth width $W_6$ of ground electrode 223 in modulation portion A. Specifically, fifth width $W_5$ of ground electrode 223 in non-modulation portion C is smaller than sixth width $W_6$ of ground electrode 223 in modulation portion A.

A space between first electrode 114 and second electrode 116 in modulation portion A is smaller than a space between first electrode 114 and second electrode 116 in non-modulation portion C. In transition portion B, the space between first electrode 114 the second electrode 116 decreases gradually as it goes from non-modulation portion C to modulation portion A. In transition portion B, the width of ground electrode 112 gradually increases from non-modulation portion C to modulation portion A. In transition portion B, the width of ground electrode 113 gradually increases from non-modulation portion C toward modulation portion A.

In modulation portion A, ground electrode 112 may include a first protrusion 17$p$. First protrusion 17$p$ is formed on a first side surface of ground electrode 112 facing first electrode 114, and may protrude toward first electrode 114. In non-modulation portion C, ground electrode 113 may include a second protrusion 17$q$. Second protrusion 17$q$ is formed on a second side surface of ground electrode 113 facing second electrode 116, and may protrude toward second electrode 116.

The space between third electrode 224 and fourth electrode 226 in modulation portion A is smaller than a space between third electrode 224 and fourth electrode 226 in non-modulation portion C. In transition portion B, the space between third electrode 224 and fourth electrode 226 decreases gradually from non-modulation portion C toward modulation portion A. In transition portion B, the width of ground electrode 113 gradually increases from non-modulation portion C toward modulation portion A. In the transition portion B, the width of the ground electrode 223 gradually increases from non-modulation portion C toward modulation portion A.

In modulation portion A, ground electrode 113 may include a third protrusion 17$r$. Third protrusion 17$r$ is formed on a third side surface of ground electrode 113 facing third electrode 224, and may protrude toward third electrode 224. In non-modulation portion C, ground electrode 223 may include a fourth protrusion 17$s$. Fourth protrusion 17$s$ is formed on a fourth side surface of ground electrode 223 facing fourth electrode 226, and may protrude toward fourth electrode 226.

Figure 11:
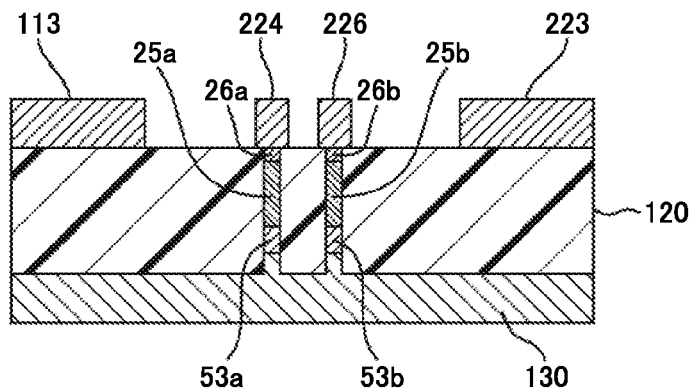
FIG. 11 is a partially sectional view schematically illustrating the optical modulator of the second embodiment taken along a sectional line XI-XI in FIG. 10.
Figure 12:
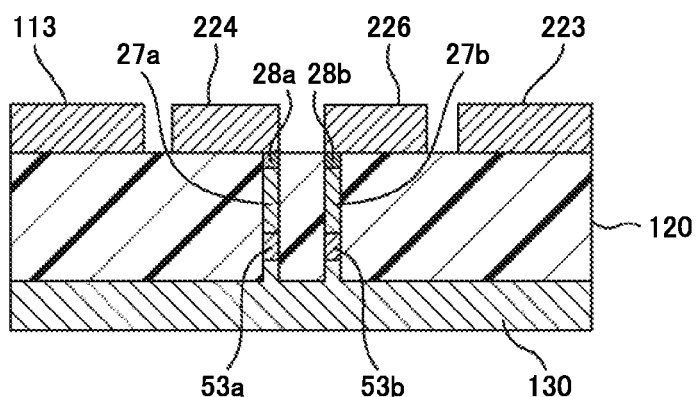
FIG. 12 is a partially sectional view schematically illustrating the optical modulator of the second embodiment taken along a sectional line XII-XII in FIG. 10.
Figure 13:
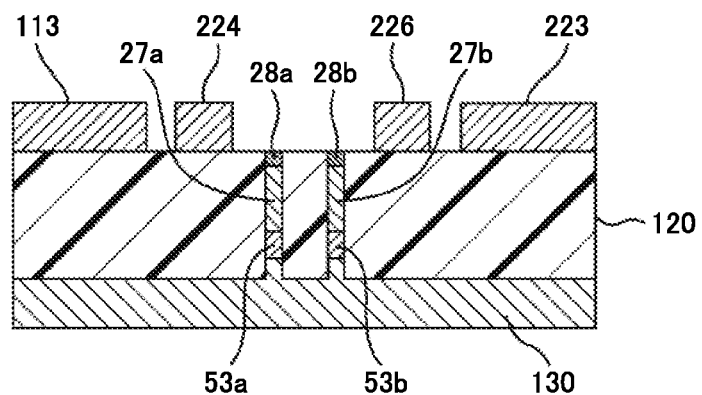
FIG. 13 is a partially sectional view schematically illustrating the optical modulator of the second embodiment taken along a sectional line XIII-XIII in FIG. 10.

As illustrated in FIGS. 11 to 13, the second Mach-Zehnder type optical waveguide has the same sectional structure as that of the first Mach-Zehnder type optical waveguide. Specifically, as illustrated in FIG. 11, modulation portion A includes n layer 130 made of an n-type semiconductor such as n-type indium phosphide (n-InP). n layer 130 is a first semiconductor layer. A portion constituting an optical path on n layer 130 rises up in a convex shape, and therefore has a shape capable of forming what is called a high mesa type optical waveguide on the convex shape. An optical waveguide layer (third optical waveguide 53$a$, fourth optical waveguide 53$b$) made of a multiple quantum well (MQW) and an undoped semiconductor such as i-type (intrinsic) indium phosphide (i-InP) is formed in a portion above n layer 130.

A p layer (second semiconductor layers 25$a$, 25$b$) made of a p-type semiconductor such as p-type indium phosphide (p-InP) is formed on the optical waveguide layer (third optical waveguide 53$a$, fourth optical waveguide 53$b$). Contact layers 26$a$, 26$b$ made of, for example, a p-type indium gallium arsenide (p-InGaAs) are formed on the p layer (second semiconductor layers 25$a$, 25$b$). Third electrode 224 and fourth electrode 226 are formed on contact layers 26$a$, 26$b$ with a space interposed therebetween. Contact layers 26$a$, 26$b$ and third electrode 224 and fourth electrode 226 are in ohmic contact with each other through a high temperature treatment.

A portion located above n layer 130 and below third electrode 224 and fourth electrode 226, the optical waveguide layer (third optical waveguide 53$a$, fourth optical waveguide 53$b$), the p layer (second semiconductor layers 25$a$, 25$b$), and contact layers 26$a$, 26$b$ being not formed in the portion, is filled with low-dielectric constant material layer 120. Low-dielectric constant material layer 120 is a buried layer. Ground electrodes 113, 223 are formed on low-dielectric constant material layer 120 at a space from third electrode 224 and fourth electrode 226, respectively.

When the electric signal flows through third electrode 224 and fourth electrode 226, and thus the voltage is applied to third electrode 224 and fourth electrode 226, the electric field is generated in the p-i-n junction including the p layer (second semiconductor layers 25$a$, 25$b$), the optical waveguide layer (third optical waveguide 53$a$, fourth optical waveguide 53$b$), and n layer 130 through contact layers 26$a$, 26$b$ that are in ohmic contact with third electrode 224 and fourth electrode 226 in modulation section A. An optical confinement factor in the optical waveguide layer (first optical waveguide 13$a$, second optical waveguide 13$b$) is changed by the electric field, and a refractive index of the optical waveguide layer (first optical waveguide 13$a$, second optical waveguide 13$b$) is changed. A phase of the light input to the optical waveguide layer (first optical waveguide 13$a$, second optical waveguide 13$b$) is modulated due to the refractive index change. Optical modulator 1$b$ is a semiconductor optical modulator.

As illustrated in Fig, similarly to modulation portion A, transition portion B includes n layer 130, the optical waveguide layer (third optical waveguide 53$a$, fourth optical waveguide 53$b$) on n layer 130, and low-dielectric constant material layer 120 filling surroundings of n layer 130 and the optical waveguide layer. However, in transition portion B, unlike modulation portion A, the insulating layer (second insulating layers 27$a$, 27$b$) is formed on the optical waveguide layer (third optical waveguide 53$a$, fourth optical waveguide 53$b$).

The insulating layers (second insulating layers 27$a$, 27$b$) are made of, for example, i-InP or Fe—InP, but are not limited thereto, and include all dielectric materials. The surface layer (first insulating layers 28$a$, 28$b$) made of a dielectric, typically an insulator such as $SiO_2$, is formed on the insulating layer (second insulating layers 27$a$, 27$b$). Third electrode 224 and fourth electrode 226 are formed on the surface layer (first insulating layers 28a, 28b) with a space interposed therebetween. Ground electrodes 113, 223 are formed on low-dielectric constant material layer 120 at a space from third electrode 224 and fourth electrode 226, respectively.

In this way, unlike modulation portion A, the p-i-n junction does not exist in transition portion B. Even when the electric signal flows through third electrode 224 and fourth electrode 226, and thus even when the voltage is applied to third electrode 224 and fourth electrode 226, the electric field is hardly changed in the optical waveguide layer (first optical waveguide 13a, second optical waveguide 13b), and the phase modulation of the light is hardly generated.

As illustrated in FIG. 13, the structure of non-modulation portion C is the same as that of transition portion B except for the shapes and positions of ground electrodes 113, 223, third electrode 224, and fourth electrode 226. Because the p-i-n junction does not exist in non-modulation portion C, the phase modulation of the light is hardly generated even if the electric signal flows through third electrode 224 and fourth electrode 226.

The operation of optical modulator 1b will be described.

Light 41 is input from laser light source 40 to optical input unit 66. Light 41 is branched into the first partial light propagating through first optical waveguide 13a, the second partial light propagating through second optical waveguide 13b, third partial light propagating through third optical waveguide 53a, and fourth partial light propagating through fourth optical waveguide 53b by optical branch unit 67, first optical branch unit 12, and second optical branch unit 52.

A first microwave propagating through first electrode 114 changes the refractive index of first optical waveguide 13a in modulation portion A. The first partial light propagating through first optical waveguide 13a is modulated by the first microwave propagating through first electrode 114. A second microwave propagating through second electrode 116 changes the refractive index of second optical waveguide 13b in modulation portion A. The second partial light propagating through second optical waveguide 13b is modulated by the second microwave propagating through second electrode 116.

A third microwave propagating through third electrode 224 changes the refractive index of third optical waveguide 53a in modulation portion A. The third partial light propagating through third optical waveguide 53a is modulated by the third microwave propagating through third electrode 224. A fourth microwave propagating through fourth electrode 226 changes the refractive index of fourth optical waveguide 53b in modulation portion A. The fourth partial light propagating through fourth optical waveguide 53b is modulated by the fourth microwave propagating through fourth electrode 226.

The modulated first partial light, the modulated second partial light, the modulated third partial light, and the modulated fourth partial light are multiplexed by first optical multiplex unit 14, second optical multiplex unit 54, and optical multiplex unit 68 to become modulated light 42. Modulated light 42 is output from optical output unit 69.

In order to widen the bandwidth of optical modulator 1b, it is necessary to decrease the reflection of the microwave signal as much as possible, and to match the phase velocity between the microwave signal and the light. When the differential driving of optical modulator 1b is performed, it is necessary to bring impedance $Z_1$ of the first line and an impedance $Z_2$ of the second line of optical modulator 1b close to 100Ω, and to bring microwave refractive index $n_m$ close to 3.6.

For the same reason as the first embodiment, the capacitance of non-modulation portion C decreases, and capacitance C of optical modulator 1b also decreases. A fourth impedance of the second line in non-modulation portion C increases, and becomes larger than a third impedance of the second line in a modulation region 19a, and impedance $Z_2$ of the second line increases. In this way, impedance $Z_2$ of the second line of optical modulator 1b can be brought close to 100Ω. Microwave refractive index $n_m$ in non-modulation portion C decreases, and becomes smaller than microwave refractive index $n_m$ in modulation region 19a, and microwave refractive index $n_m$ of optical modulator 1b decreases. In this way, microwave refractive index $n_m$ of optical modulator 1b can be brought close to 3.6.

In the second embodiment, similarly to the first embodiment, the width of each electrode and the distance between the electrodes in modulation portion A, transition portion B, and non-modulation portion C are adjusted, and the ratio of modulation portion A, transition portion B, and non-modulation portion c in one unit structure 10b and the length in the longitudinal direction of one unit structure 10b are adjusted, so that the capacitance and inductance can finely be adjusted. Thus, the impedance of first Mach-Zehnder optical modulator portion 61 and the impedance of second Mach-Zehnder optical modulator portion 62 are brought close to 100 ohms, and the microwave refractive index of first Mach-Zehnder optical modulator portion 61 and the microwave refractive index of second Mach-Zehnder optical modulator portion 62 are brought close to 3.6, and therefore the bandwidth can be widened.

Furthermore, in the second embodiment, optical modulator 1b includes two MZ type optical modulators (first Mach-Zehnder optical modulator portion 61 and second Mach-Zehnder optical modulator portion 62), so that QPSK modulation can be performed.

In the configuration including at least two MZ type optical modulators as in the second embodiment, it is necessary to decrease the crosstalk between first Mach-Zehnder optical modulator portion 61 and second Mach-Zehnder optical modulator portion 62 (between Ich and Qch). A method for shortening the distance between the signal line and the ground electrode or a method for enlarging an area of the ground by forming a sectional shape perpendicular to the longitudinal direction of the ground electrode into a convex shape may be adopted in order to decrease the crosstalk.

The configuration in which optical modulator 1b includes the two MZ type optical modulators (first Mach-Zehnder optical modulator portion 61 and second Mach-Zehnder optical modulator portion 62) is described in the above description, but optical modulator 1b may include at least three MZ type optical modulators.

The effect of optical modulator 1b of the second embodiment will be described. Optical modulator 1b of the second embodiment has the same effects as those of optical modulator 1 of the first embodiment.

In addition to the configuration of optical modulator 1, optical modulator 1b includes the second Mach-Zehnder type optical waveguide, the third traveling wave electrode (third electrode 224), the fourth traveling wave electrode (fourth electrode 226), the third ground electrode (ground electrode 223), optical input unit 66, optical branch unit 67 connected to optical input unit 66, optical multiplex unit 68, and optical output unit 69 connected to optical multiplex unit 68. The second Mach-Zehnder type optical waveguide includes second optical input unit 51, second optical branch unit 52 connected to second optical input unit 51, third optical waveguide 53a connected to second optical branch unit 52, fourth optical waveguide 53b connected to second optical branch unit 52, second optical multiplex unit 54 connected to third optical waveguide 53a and fourth optical waveguide 53b, and second optical output unit 55 connected to second optical multiplex unit 54.

The third traveling wave electrode (third electrode 224) is disposed above third optical waveguide 53a. The fourth traveling wave electrode (fourth electrode 226) is disposed above fourth optical waveguide 53b. The second ground electrode (ground electrode 113) is disposed on the opposite side to the fourth traveling wave electrode (fourth electrode 226) with respect to the third traveling wave electrode (third electrode 224), and disposed at a space from the third traveling wave electrode (third electrode 224). The third ground electrode (ground electrode 223) is disposed on the opposite side to the third traveling wave electrode (third electrode 224) with respect to the fourth traveling wave electrode (fourth electrode 226), and disposed at a space from the fourth traveling wave electrode (fourth electrode 226). Optical branch unit 67 is connected to first optical input unit 11 and second optical input unit 51. Optical multiplex unit 68 is connected to first optical output unit 15 and second optical output unit 55. Unit structures 10b are arrayed along third optical waveguide 53a and fourth optical waveguide 53b. Fifth width $W_5$ of the third ground electrode (ground electrode 223) in the non-modulation region (non-modulation portion C) is smaller than sixth width $W_6$ of the third ground electrode (ground electrode 223) in the modulation region (modulation portion A). In the non-modulation region (non-modulation portion C), first insulating layers 28a, 28b are disposed between third optical waveguide 53a and third traveling wave electrode (third electrode 224) and between fourth optical waveguide 53b and the fourth traveling wave electrode (fourth electrode 226).

In optical modulator 1b, the capacitance of the non-modulation region (non-modulation portion C) is decreased, and capacitance C of optical modulator 1b is decreased. For this reason, impedance $Z_1$ of the first line and impedance $Z_2$ of the second line of optical modulator 1b can be increased. Microwave refractive index $n_m$ of optical modulator 1b can be decreased. The bandwidth of optical modulator 1b can be widened.

In optical modulator 1b, each of unit structures 10b may include the transition region (transition portion B) disposed between the modulation region (modulation portion A) and the non-modulation region (non-modulation portion C). In the transition region (transition portion B), a first space between the first traveling wave electrode (first electrode 114) and the second traveling wave electrode (second electrode 116) gradually changes. In the transition region (transition portion B), the width of the first ground electrode (ground electrode 112) and the width of the second ground electrode (ground electrode 113) gradually change. In the transition region (transition portion B), a second space between the third traveling wave electrode (third electrode 224) and the fourth traveling wave electrode (fourth electrode 226) gradually changes. In the transition region (transition portion B), the width of the second ground electrode (ground electrode 113) and the width of the third ground electrode (ground electrode 223) gradually changes. The reflection of the microwave propagating through the first traveling wave electrode (first electrode 114), the second traveling wave electrode (second electrode 116), the third traveling wave electrode (third electrode 224), and the fourth traveling wave electrode (fourth electrode 226) between the modulation region (modulation portion A) and the non-modulation region (non-modulation portion C) can be decreased in the transition region (transition portion B). The bandwidth of optical modulator 1b can be widened.

In optical modulator 1b, a first length of the modulation region (modulation portion A) along first optical waveguide 13a and second optical waveguide 13b ranges from 0.50 times to 0.95 times a first entire length of unit structure 10b along first optical waveguide 13a and second optical waveguide 13b. A second length of the non-modulation region (non-modulation portion C) along first optical waveguide 13a and second optical waveguide 13b may range from 0.04 times to 0.48 times the first entire length of unit structure 10b. A third length of the modulation region (modulation portion A) along third optical waveguide 53a and fourth optical waveguide 53b may range from 0.50 times to 0.95 times the second entire length of unit structure 10b along third optical waveguide 53a and fourth optical waveguide 53b. A fourth length of the non-modulation region (non-modulation portion C) along third optical waveguide 53a and fourth optical waveguide 53b may range from 0.04 times to 0.48 times the second entire length of unit structure 10b. The ratio of the modulation region (modulation portion A) to unit structure 10b is made larger than the ratio of the non-modulation region (non-modulation portion C) to unit structure 10b, thereby suppressing the increase in the size of optical modulator 1b and widening the bandwidth of optical modulator 1b.

Third Embodiment

Figure 14:
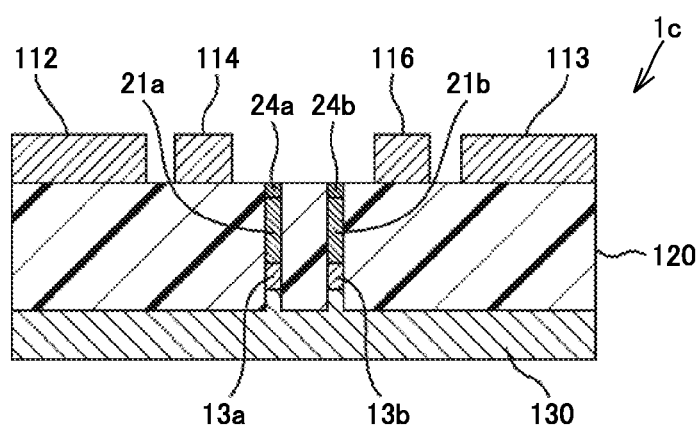
FIG. 14 is a schematic sectional view of a non-modulation region of an optical modulator according to a third embodiment.

FIG. 14 is a sectional view of an optical modulator 1c according to a third embodiment. FIG. 14 illustrates a section (section viewed in the direction V-V of FIG. 2) of non-modulation portion C of optical modulator 1c. The configuration of optical modulator 1c of the third embodiment is the same as optical modulator 1 of the first embodiment except that the structure of non-modulation portion C is different from non-modulation portion C of optical modulator 1 of the first embodiment. FIG. 14 corresponds to FIG. 5. In FIG. 14, the same reference numeral as that in FIG. 5 denotes the same or corresponding part. In the following description, generally a point different from the first embodiment will mainly be described, and overlapping descriptions for other portions will be omitted.

In non-modulation portion C of the third embodiment, similarly to non-modulation portion C of the first embodiment, the optical waveguide layer (first optical waveguide 13a, second optical waveguide 13b) is formed on a part of n layer 130. However, unlike the insulating layer (second insulating layers 23a, 23b) of non-modulation portion C of the first embodiment, the p layer (second semiconductor layers 21a, 21b) is formed on the optical waveguide layer (first optical waveguide 13a, second optical waveguide 13b). The structure on the p layer (second semiconductor layers 21a, 21b) is the same as that of non-modulation portion C of the first embodiment, the surface layer (first insulating layers 24a, 24b) is formed, and first electrode 114 and second electrode 116 are formed on the surface layer (first insulating layers 24a, 24b) with a space interposed therebetween. Ground electrodes 112, 113 are formed on low-dielectric constant material layer 120 at a space from first electrode 114 and second electrode 116, respectively.

In both optical modulator 1 of the first embodiment and optical modulator 1c of the third embodiment, the p layer (second semiconductor layers 21a, 21b) and the insulating layer (second insulating layers 23a, 23b) are alternately formed in the longitudinal direction (light traveling direction) in the layer immediately above the optical waveguide layer (first optical waveguide 13a, second optical waveguide 13b). In optical modulator 1 of the first embodiment, in the layer immediately above the optical waveguide layer (first optical waveguide 13a, second optical waveguide 13b), only modulation portion A is the p-layer (second semiconductor layers 21a, 21b), and transition portion B and non-modulation portion C are the insulating layer (second insulating layers 23a, 23b). On the other hand, in optical modulator 1c of the third embodiment, in the layer immediately above the optical waveguide layer (first optical waveguide 13a, second optical waveguide 13b), modulation portion A and non-modulation portion C are the p layer (second semiconductor layers 21a, 21b), and only transition portion B is the insulating layer (second insulating layers 23a, 23b).

There are mainly two kinds of methods for alternately forming the p layer (second semiconductor layers 21a, 21b) and the insulating layer (second insulating layers 23a, 23b) in the longitudinal direction (light traveling direction). In one of the methods, after the p layer (second semiconductor layers 21a, 21b) (or the insulating layer (second insulating layers 23a, 23b)) is thoroughly formed, the p layer (second semiconductor layers 21a, 21b) (or the insulating layer (second insulating layers 23a, 23b)) is partially cut, and the insulating layer (second insulating layers 23a, 23b) (or the p layer (second semiconductor layers 21a, 21b)) is buried in the partially cut portion. In the other method, after the p-layer (second semiconductor layers 21a, 21b) (or the insulating layer (second insulating layers 23a, 23b)) is thoroughly formed, the p layer is changed into the insulating layer (second insulating layers 23a, 23b) (or the p layer (second semiconductor layers 21a, 21b)) by ion implantation or the like. The former method has a problem in that heights of the buried portion and the other portions are not uniform. The latter method has a problem in that the p layer (second semiconductor layers 21a, 21b) and the insulating layer (second insulating layers 23a, 23b) cannot accurately be switched at a desired position in the longitudinal direction.

For this reason, as described above, the structure in which in the layer immediately above the optical waveguide layer (first optical waveguide 13a, second optical waveguide 13b), modulation portion A and non-modulation portion C are the p-layer (second semiconductor layers 21a, 21b) while only transition portion B is the insulating layer (second insulating layers 23a, 23b) is adopted in the third embodiment. As described above, typically the length in the longitudinal direction of transition portion B ranges from 10% to 20% of the length in the longitudinal direction of modulation portion A. Thus, the switching portion between the p layer (second semiconductor layers 21a, 21b) and the insulating layer (second insulating layers 23a, 23b) in the longitudinal direction becomes only short transition portion B, so that the portion to be processed can be decreased. Thus, the portion where the problem in that the height is not uniform and the problem in that the switching cannot be performed at the desired position are generated can be reduced, and a design error can be reduced as a whole of optical modulator 1c.

Fourth Embodiment

Figure 15:
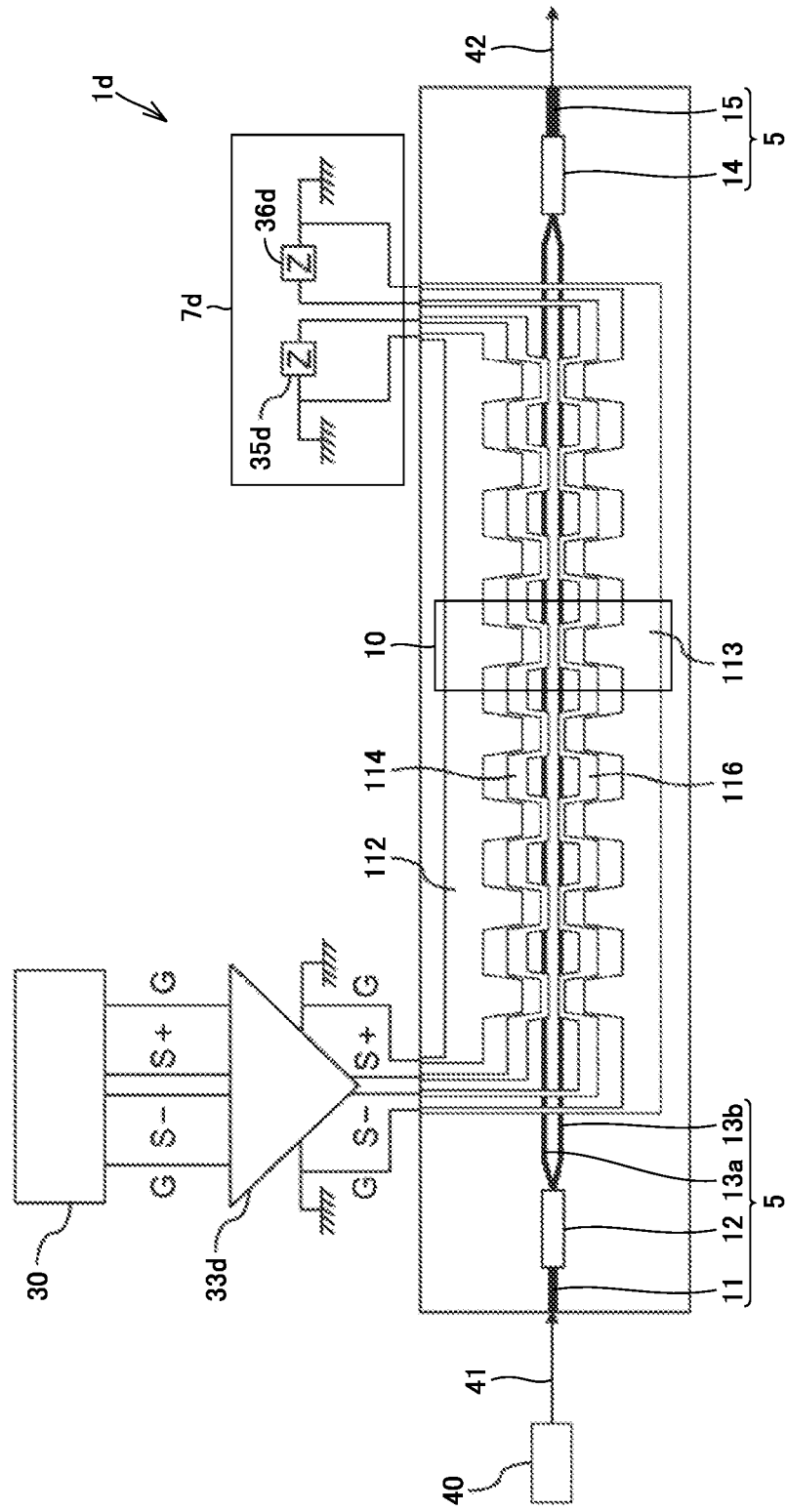
FIG. 15 is a schematic plan view of an optical modulator according to a fourth embodiment.

With reference to FIG. 15, optical modulator 1d according to a fourth embodiment will be described. Optical modulator 1d of the fourth embodiment has the same configuration as optical modulator 1 of the first embodiment, but is mainly different from optical modulator 1 in the following point.

In optical modulator 1d, a differential impedance of a termination 7d is less than 100Ω. The differential impedance of termination 7d may be greater than or equal to 25Ω, or be greater than or equal to 50Ω. The impedance of non-modulation portion C is larger than a first impedance of modulation portion A. The impedance of transition portion B is larger than the impedance of modulation portion A, and is smaller than the impedance of non-modulation portion C. For example, the differential impedance of termination 7d has the impedance of 70Ω, and each of a first termination resistor 35d and a second termination resistor 36d has the impedance of 35Ω. Modulation portion A has the impedance less than 70Ω, and non-modulation portion C has the impedance more than 70Ω. In this way, the impedance of entire optical modulator 1d can be brought close to 70Ω.

For example, MAOM-06408 or MAOM-06412 manufactured by MACOM can be used as an electric amplifier 33d that enables the differential impedance of termination 7d to set less than 100Ω.

The effect of optical modulator 1d of the fourth embodiment will be described. In addition to the effects of optical modulator 1 of the first embodiment, optical modulator 1d of the fourth embodiment has the following effect.

In optical modulator 1d of the fourth embodiment, the differential impedance of termination 7d is less than 100Ω. For this reason, impedance matching between optical modulator 1d and termination 7d can easily be performed without particularly decreasing capacitance C of optical modulator 1d as compared with an optical modulator in which the differential impedance of the termination has 100Ω. In this way, the bandwidth of optical modulator 1d can easily be widened. Optical modulator 1d can be downsized.

Fifth Embodiment

With reference to FIGS. 16 to 23 and FIGS. 25 to 28, a semiconductor optical modulator 1e according to a fifth embodiment will be described. Semiconductor optical modulator 1e of the fifth embodiment has the same configuration as optical modulator 1 of the first embodiment, but is mainly different from optical modulator 1 in the configuration of the electrode.

The semiconductor optical modulator 1e includes the first Mach-Zehnder type optical waveguide, a first traveling wave electrode 16a, a second traveling wave electrode 16b, first ground electrode 17a, a second ground electrode 17b, and first insulating layers 24a, 24b. Semiconductor optical modulator 1e may further include a first semiconductor layer 20, second semiconductor layers 21a, 21b, contact layers 22a, 22b, and a buried layer 29. Semiconductor optical modulator 1e may further include second insulating layers 23a, 23b.

The first Mach-Zehnder type optical waveguide includes first optical input unit 11, first optical branch unit 12, first optical waveguide 13a, second optical waveguide 13b, first optical multiplex unit 14, and first optical output unit 15. First optical branch unit 12 is connected to first optical input unit 11. First optical waveguide 13a and second optical waveguide 13b are connected to first optical branch unit 12. First optical multiplex unit 14 is connected to first optical waveguide 13a and second optical waveguide 13b. First optical output unit 15 is connected to first optical multiplex unit 14. Each of first optical branch unit 12 and first optical multiplex unit 14 is not particularly limited, but may be a multimode interference (MMI) waveguide, a Y-branch waveguide, or a directivity coupler.

The first Mach-Zehnder type optical waveguide may be formed by an i-type semiconductor layer such as an undoped semiconductor layer. The first Mach-Zehnder type optical waveguide may be formed by, for example, an i-type InP layer. The first Mach-Zehnder type optical waveguide may have a multiple quantum well (MQW) structure.

Figure 18:
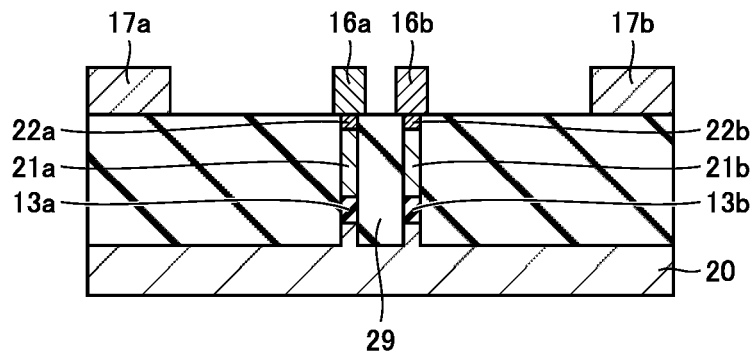
FIG. 18 is a schematic sectional view of the semiconductor optical modulator of the fifth and seventh embodiments taken along a sectional line XVIII-XVIII in FIGS. 17, 30, and 36.
Figure 19:
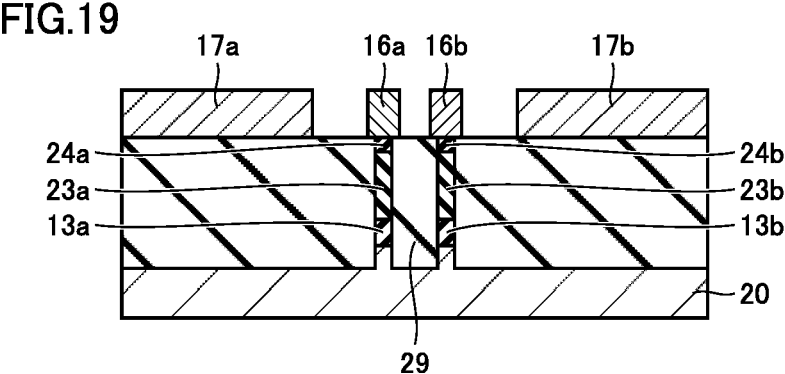
FIG. 19 is a schematic sectional view of the semiconductor optical modulator of the fifth embodiment taken along a sectional line XIX-XIX in FIGS. 17 and 30.
Figure 20:
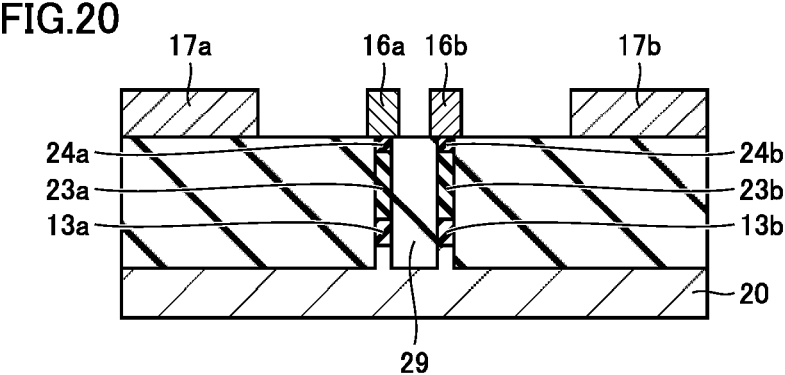
FIG. 20 is a schematic sectional view of the semiconductor optical modulator of the fifth embodiment taken along a sectional line XX-XX illustrated in FIG. 17.

First traveling wave electrode 16a is disposed above first optical waveguide 13a. Second traveling wave electrode 16b is disposed above second optical waveguide 13b. As illustrated in FIGS. 18 to 20, first ground electrode 17a is disposed on the opposite side to second traveling wave electrode 16b with respect to first traveling wave electrode 16a, and disposed at a space from first traveling wave electrode 16a. Second ground electrode 17b is disposed on the opposite side to first traveling wave electrode 16a with respect to second traveling wave electrode 16b, and disposed at a space from second traveling wave electrode 16b. First traveling wave electrode 16a and second traveling wave electrode 16b are disposed between first ground electrode 17a and second ground electrode 17b. First traveling wave electrode 16a, second traveling wave electrode 16b, first ground electrode 17a, and second ground electrode 17b are not particularly limited, but may be made of conductive metal such as gold (Au) or platinum (Pt).

First ground electrode 17a, first traveling wave electrode 16a, second traveling wave electrode 16b, and second ground electrode 17b constitute the first line. The first line is a GSSG (Ground, Signal, Signal, Ground) type differential line (coplanar line). The GSSG type differential line can downsize semiconductor optical modulator 1e. In the GSSG type differential line, first traveling wave electrode 16a and second traveling wave electrode 16b are adjacent to each other, so that the noise immunity can be improved.

One end of first traveling wave electrode 16a and one end of second traveling wave electrode 16b are electrically connected to signal source 30. Signal source 30 outputs a differential signal. The differential signal is not particularly limited, but may have a high frequency of 20 Gbit/s or higher. A voltage having an opposite phase to second optical waveguide 13b is applied to first optical waveguide 13a (push-pull configuration). Electric amplifier 33 may be disposed between signal source 30 and one end of first traveling wave electrode 16a and between signal source 30 and one end of second traveling wave electrode 16b. Electric amplifier 33 amplifies the differential signal output from signal source 30, and outputs the amplified differential signal to one end of first traveling wave electrode 16a and one end of second traveling wave electrode 16b.

Termination 7 is connected to the output sides (right side in FIG. 16) of first traveling wave electrode 16a and second traveling wave electrode 16b. Termination 7 includes a first termination resistor 35 and a second termination resistor 36. The other end of first traveling wave electrode 16a and first ground electrode 17a may be connected to first termination resistor 35. First termination resistor 35 may have a resistance of 50Ω. The other end of second traveling wave electrode 16b and second ground electrode 17b may be connected to second termination resistor 36. Second termination resistor 36 may have a resistance of 50Ω Instead of first termination resistor 35 and second termination resistor 36, a termination resistor having a resistance of 100Ω may be connected to the other end of first traveling wave electrode 16a and the other end of second traveling wave electrode 16b. One end of first ground electrode 17a and one end of second ground electrode 17b are connected to the grounding potential. The other end of first ground electrode 17a and the other end of second ground electrode 17b are connected to the grounding potential.

Figure 17:
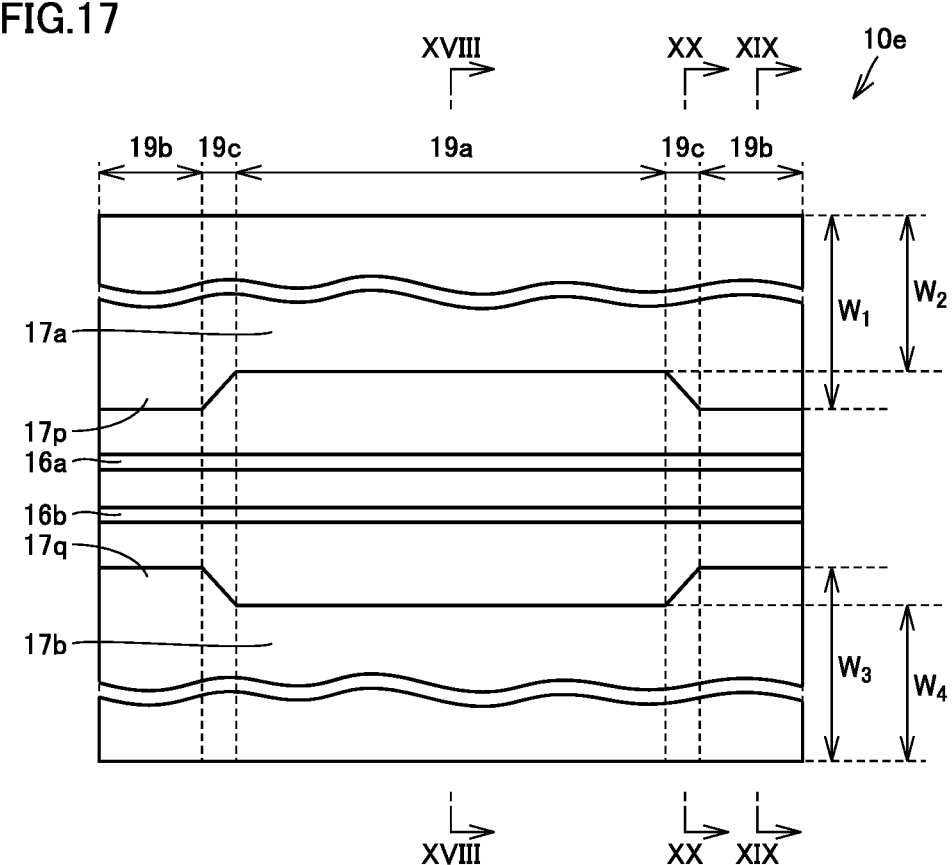
FIG. 17 is a partially enlarged plan view schematically illustrating the semiconductor optical modulator of the fifth embodiment.

Semiconductor optical modulator 1e includes unit structures 10e arrayed along first optical waveguide 13a and second optical waveguide 13b. Semiconductor optical modulator 1e has a periodic structure along first optical waveguide 13a and second optical waveguide 13b. As illustrated in FIG. 17, each of unit structures 10e includes modulation region 19a and non-modulation region 19b. First width $W_1$ of first ground electrode 17a in non-modulation region 19b is different from second width $W_2$ of first ground electrode 17a in modulation region 19a. Specifically, first width $W_1$ of first ground electrode 17a in non-modulation region 19b is larger than second width $W_2$ of first ground electrode 17a in modulation region 19a. Third width $W_3$ of second ground electrode 17b in non-modulation region 19b is different from fourth width $W_4$ of second ground electrode 17b in modulation region 19a. Specifically, third width $W_3$ of second ground electrode 17b in non-modulation region 19b is larger than fourth width $W_4$ of second ground electrode 17b in modulation region 19a.

Specifically, first traveling wave electrode 16a may have a constant width in modulation region 19a and non-modulation region 19b. More specifically, first traveling wave electrode 16a may have a constant width in modulation region 19a, non-modulation region 19b, and transition region 19c. Second traveling wave electrode 16b may have a constant width in modulation region 19a and non-modulation region 19b. More specifically, second traveling wave electrode 16b may have a constant width in modulation region 19a, non-modulation region 19b, and transition region 19c.

In non-modulation region 19b, first ground electrode 17a may include first protrusion 17p. First protrusion 17p is formed on the first side surface of first ground electrode 17a facing first traveling wave electrode 16a, and may protrude toward first traveling wave electrode 16a. In non-modulation region 19b, second ground electrode 17b may include second protrusion 17q. Second protrusion 17q is formed on the second side surface of second ground electrode 17b facing second traveling wave electrode 16b, and may protrude toward second traveling wave electrode 16b. The first space between first ground electrode 17a and first traveling wave electrode 16a may be the narrowest in non-modulation region 19b, and be the widest in modulation region 19a. The second space between second ground electrode 17b and second traveling wave electrode 16b may be the narrowest in non-modulation region 19b, and be the widest in modulation region 19a. The space between first traveling wave electrode 16a and second traveling wave electrode 16b may be constant in modulation region 19a, non-modulation region 19b, and transition region 19c.

In unit structure 10e, the first length of modulation region 19a along first optical waveguide 13a and second optical waveguide 13b may range from 0.50 times to 0.95 times the first entire length of unit structure 10e along first optical waveguide 13a and second optical waveguide 13b. In unit structure 10e, the second length of non-modulation region 19b along first optical waveguide 13a and second optical waveguide 13b may range from 0.04 times to 0.48 times the first entire length of unit structure 10e. In semiconductor optical modulator 1e of the fifth embodiment, the second length of non-modulation region 19b is defined as a total length of two portions of non-modulation region 19b along first optical waveguide 13a and second optical waveguide 13b in unit structure 10e. For example, the first entire length of unit structure 10e may range from 100 μm to 500 μm.

Each of unit structures 10e may include transition region 19c disposed between modulation region 19a and non-modulation region 19b. In transition region 19c, the first space between first ground electrode 17a and first traveling wave electrode 16a decreases gradually from modulation region 19a toward non-modulation region 19b. In transition region 19c, the second space between second ground electrode 17b and second traveling wave electrode 16b decreases gradually from modulation region 19a toward non-modulation region 19b.

As illustrated in FIGS. 18 to 20, first semiconductor layer 20 extends to modulation region 19a and non-modulation region 19b. First semiconductor layer 20 may further extend to transition region 19c. First semiconductor layer 20 has a first conductivity type. For example, the first conductivity type may be an n-type. First semiconductor layer 20 may be a semiconductor substrate having the first conductivity type. For example, first semiconductor layer 20 may be an n-type InP layer.

First optical waveguide 13a and second optical waveguide 13b may be provided on first semiconductor layer 20. First optical waveguide 13a and second optical waveguide 13b extend to modulation region 19a and non-modulation region 19b. First optical waveguide 13a and second optical waveguide 13b may further extend to transition region 19c.

As illustrated in FIG. 18, second semiconductor layer 21a may be provided on first optical waveguide 13a. Second semiconductor layer 21b may be provided on second optical waveguide 13b. Second semiconductor layers 21a, 21b extend to the modulation region 19a. Second semiconductor layers 21a, 21b have a second conductivity type different from the first conductivity type. For example, the second conductivity type may be a p-type. For example, second semiconductor layers 21a, 21b may be a p-type InP layer. First optical waveguide 13a and second optical waveguide 13b may be a core layer, and first semiconductor layer 20 and second semiconductor layers 21a, 21b sandwiching first optical waveguide 13a and second optical waveguide 13b may be a clad layer. First semiconductor layer 20, first optical waveguide 13a, and second semiconductor layer 21a may have a p-i-n junction structure. First semiconductor layer 20, second optical waveguide 13b, and second semiconductor layer 21b may have a p-i-n junction structure. First semiconductor layer 20, first optical waveguide 13a, and second semiconductor layer 21a may have a high-mesa optical waveguide structure. First semiconductor layer 20, second optical waveguide 13b, and second semiconductor layer 21b may have a high-mesa optical waveguide structure.

Contact layer 22a may be provided on second semiconductor layer 21a. Contact layer 22b may be provided on second semiconductor layer 21b. Contact layers 22a, 22b extend to modulation region 19a. Contact layers 22a, 22b may be a semiconductor layer having the second conductivity type. For example, contact layers 22a, 22b may be a p$^+$ type InGaAs layer. Contact layer 22a is in ohmic contact with first traveling wave electrode 16a. Contact layer 22b is in ohmic contact with second traveling wave electrode 16b.

As illustrated in FIG. 19, second semiconductor layers 21a, 21b and contact layers 22a, 22b may not extend to non-modulation region 19b. Second insulating layer 23a may be provided on first optical waveguide 13a. Second insulating layer 23b may be provided on second optical waveguide 13b. Second insulating layers 23a, 23b extend to non-modulation region 19b. Second insulating layer 23a is disposed between first optical waveguide 13a and first traveling wave electrode 16a in non-modulation region 19b. Second insulating layer 23b is disposed between second optical waveguide 13b and second traveling wave electrode 16b in non-modulation region 19b. Second insulating layers 23a, 23b may be an i-type semiconductor layer such as an i-type InP layer or a semi-insulating semiconductor layer such as an Fe—InP layer. First optical waveguide 13a and second optical waveguide 13b may be a core layer, and first semiconductor layer 20 and second insulating layers 23a, 23b sandwiching first optical waveguide 13a and second optical waveguide 13b may be a clad layer. First semiconductor layer 20, first optical waveguide 13a, and second insulating layer 23a may have a high-mesa optical waveguide structure. First semiconductor layer 20, second optical waveguide 13b, and second insulating layer 23b may have a high-mesa optical waveguide structure.

First insulating layer 24a is disposed between first optical waveguide 13a and first traveling wave electrode 16a in non-modulation region 19b. First insulating layer 24b is disposed between second optical waveguide 13b and second traveling wave electrode 16b in non-modulation region 19b. First insulating layer 24a may be provided on second insulating layer 23a. First insulating layer 24b may be provided on second insulating layer 23b. First insulating layer 24a may be in contact with first traveling wave electrode 16a. First insulating layer 24b may be in contact with second traveling wave electrode 16b. First insulating layers 24a, 24b extend to non-modulation region 19b. First insulating layers 24a, 24b may be made of a low-dielectric constant material such as silicon dioxide, benzocyclobutene (BCB), polyimide, and epoxy. Even when the microwave propagates to first traveling wave electrode 16a and second traveling wave electrode 16b, the first partial light traveling through first optical waveguide 13a and the second partial light traveling through second optical waveguide 13b are hardly phase-modulated in non-modulation region 19b because of first insulating layers 24a, 24b.

As illustrated in FIG. 20, second semiconductor layers 21a, 21b and contact layers 22a, 22b may not extend to transition region 19c. Transition region 19c may have the same sectional structure as that of non-modulation region 19b. Specifically, second insulating layer 23a may be provided on first optical waveguide 13a. Second insulating layer 23b may be provided on second optical waveguide 13b. First insulating layer 24a may be provided on second insulating layer 23a. First insulating layer 24b may be provided on second insulating layer 23b.

First insulating layers 24a, 24b and second insulating layers 23a, 23b extend to transition region 19c. First insulating layer 24a and second insulating layer 23a are disposed between first optical waveguide 13a and first traveling wave electrode 16a in transition region 19c. First insulating layer 24b and second insulating layer 23b are disposed between second optical waveguide 13b and second traveling wave electrode 16b in transition region 19c. First insulating layer 24a may be in contact with first traveling wave electrode 16a. First insulating layer 24b may be in contact with second traveling wave electrode 16b. Even when the microwave propagates to first traveling wave electrode 16a and second traveling wave electrode 16b, the first partial light traveling through first optical waveguide 13a and the second partial light traveling through second optical waveguide 13b are hardly phase-modulated in transition region 19c because of first insulating layers 24a, 24b.

Buried layer 29 may be made of a low-dielectric constant material such as silicon dioxide, benzocyclobutene (BCB), polyimide, and epoxy. Buried layer 29 may be formed by a semi-insulating semiconductor layer. As illustrated in FIG. 18, in modulation region 19a, the high-mesa optical waveguide structure including first semiconductor layer 20, first optical waveguide 13a, and second semiconductor layer 21a may be buried in buried layer 29. In modulation region 19a, the high-mesa optical waveguide structure including first semiconductor layer 20, second optical waveguide 13b, and second semiconductor layer 21b may be buried in buried layer 29.

As illustrated in FIG. 19, in non-modulation region 19b, the high-mesa optical waveguide structure including first semiconductor layer 20, first optical waveguide 13a, and second insulating layer 23a may be buried in buried layer 29. In non-modulation region 19b, the high-mesa optical waveguide structure including first semiconductor layer 20, second optical waveguide 13b, and second insulating layer 23b may be buried in buried layer 29. As illustrated in FIG. 20, in transition region 19c, the high-mesa optical waveguide structure including first semiconductor layer 20, first optical waveguide 13a, and second insulating layer 23a may be buried in buried layer 29. In transition region 19c, the high-mesa optical waveguide structure including first semiconductor layer 20, second optical waveguide 13b, and second insulating layer 23b may be buried in buried layer 29.

The operation of semiconductor optical modulator 1e will be described.

Figure 16:
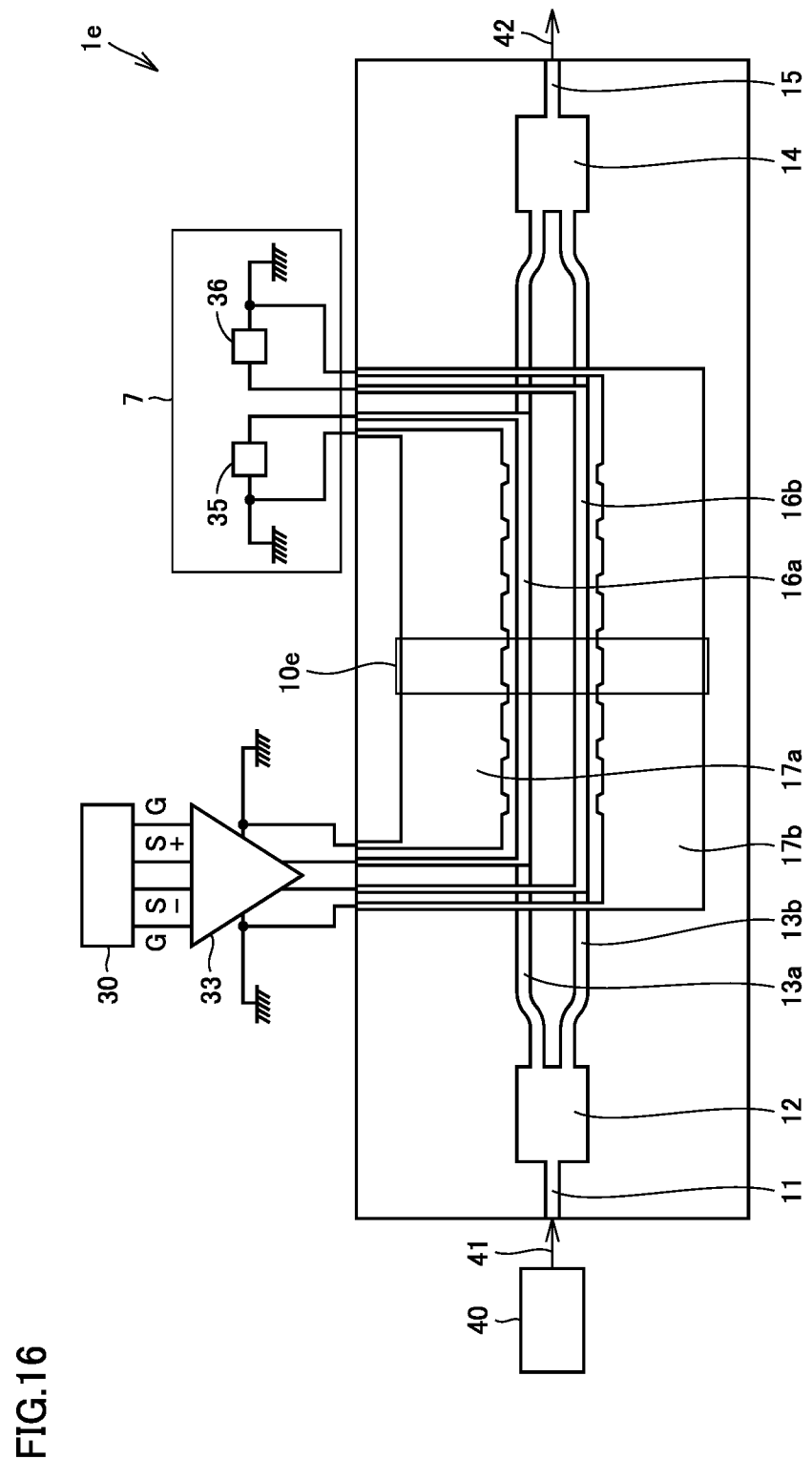
FIG. 16 is a schematic plan view of a semiconductor optical modulator according to a fifth embodiment.

As illustrated in FIG. 16, light 41 is input to first optical input unit 11 from laser light source 40 such as a semiconductor laser. Light 41 is input from first optical input unit 11 to first optical branch unit 12. In first optical branch unit 12, light 41 is branched into first partial light propagating through first optical waveguide 13a and second partial light propagating through second optical waveguide 13b.

The first microwave propagating through first traveling wave electrode 16a changes the refractive index of first optical waveguide 13a in modulation region 19a. The first partial light propagating through first optical waveguide 13a is modulated by the first microwave propagating through first traveling wave electrode 16a. The second microwave propagating through second traveling wave electrode 16b changes the refractive index of second optical waveguide 13b in modulation region 19a. The second partial light propagating through second optical waveguide 13b is modulated by the second microwave propagating through second traveling wave electrode 16b.

The modulated first partial light and the modulated second partial light are multiplexed by first optical multiplex unit 14 to become modulated light 42. Modulated light 42 is output from first optical output unit 15.

Figure 21:
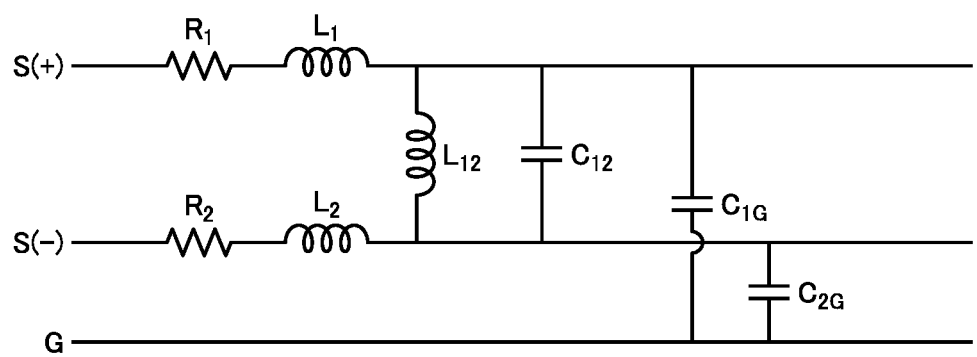
FIG. 21 is a view illustrating an electric circuit model of the semiconductor optical modulator of the fifth embodiment.

As illustrated in FIG. 21, semiconductor optical modulator 1e includes first resistance $R_1$ of first traveling wave electrode 16a, first inductance $L_1$ of first traveling wave electrode 16a, second resistance $R_2$ of second traveling wave electrode 16b, second inductance $L_2$ of second traveling wave electrode 16b, and mutual inductance $L_{12}$ between first traveling wave electrode 16a and second traveling wave electrode 16b. Semiconductor optical modulator 1e further includes first mutual capacitance $C_{1G}$ between first traveling wave electrode 16a and first ground electrode 17a, second mutual capacitance $C_{2G}$ between second traveling wave electrode 16b and second ground electrode 17b, and third mutual capacitance $C_{12}$ between first traveling wave electrode 16a and second traveling wave electrode 16b.

Figure 22:
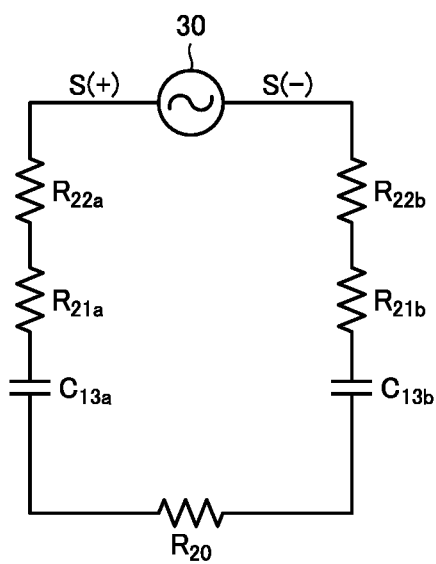
FIG. 22 is a view illustrating an electric circuit model in a modulation region of the semiconductor optical modulator of the fifth embodiment.

As illustrated in FIG. 22, modulation region 19a of semiconductor optical modulator 1e includes a resistance $R_{20}$ of first semiconductor layer 20, capacitance $C_{13a}$ of first optical waveguide 13a, capacitance $C_{13b}$ of second optical waveguide 13b, resistance $R_{21a}$ of second semiconductor layer 21a, resistance $R_{21b}$ of second semiconductor layer 21b, resistance $R_{22a}$ of contact layer 22a, and resistance $R_{22b}$ of contact layer 22b. Resistances $R_{20}$, $R_{21a}$, $R_{21b}$, $R_{22a}$, $R_{22b}$ and capacitances $C_{13a}$, $C_{13b}$ are connected in series.

Figure 23:
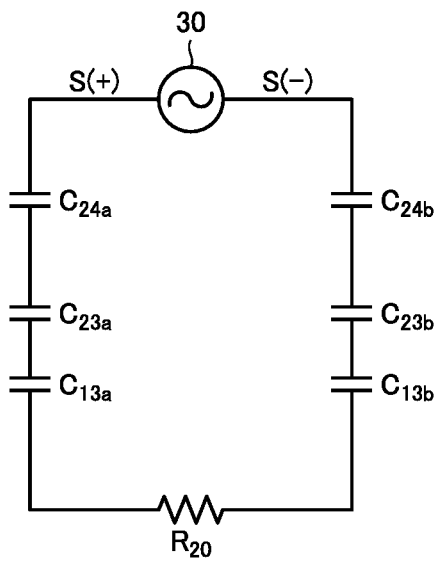
FIG. 23 is a diagram illustrating an electric circuit model of a non-modulation region and a transition unit in the semiconductor optical modulator of the fifth embodiment.

As illustrated in FIG. 23, non-modulation region 19b and transition region 19c of semiconductor optical modulator 1e include resistance $R_{20}$ of first semiconductor layer 20, capacitance $C_{13a}$ of first optical waveguide 13a, capacitance $C_{13b}$ of second optical waveguide 13b, capacitance $C_{23a}$ of second insulating layer 23a, capacitance $C_{23b}$ of second insulating layer 23b, capacitance $C_{24a}$ of first insulating layer 24a, and capacitance $C_{24b}$ of first insulating layer 24b. Resistance $R_{20}$ and the capacitances $C_{13a}$, $C_{13b}$, $C_{23a}$, $C_{23b}$, $C_{24a}$, $C_{24b}$ are connected in series.

Figure 24:
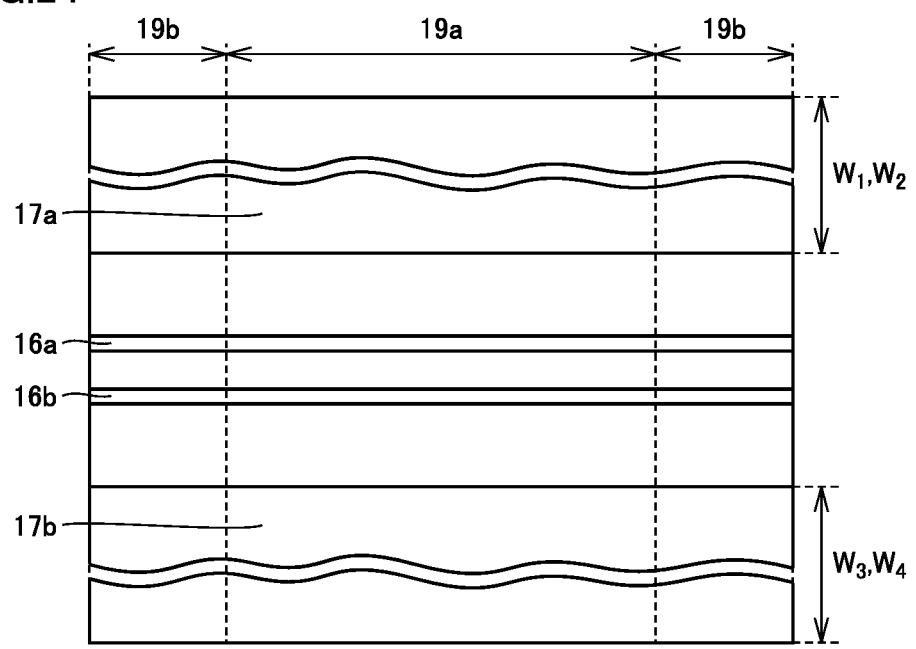
FIG. 24 is a partially enlarged plan view schematically illustrating a semiconductor optical modulator according to a comparative example.
Figure 25:
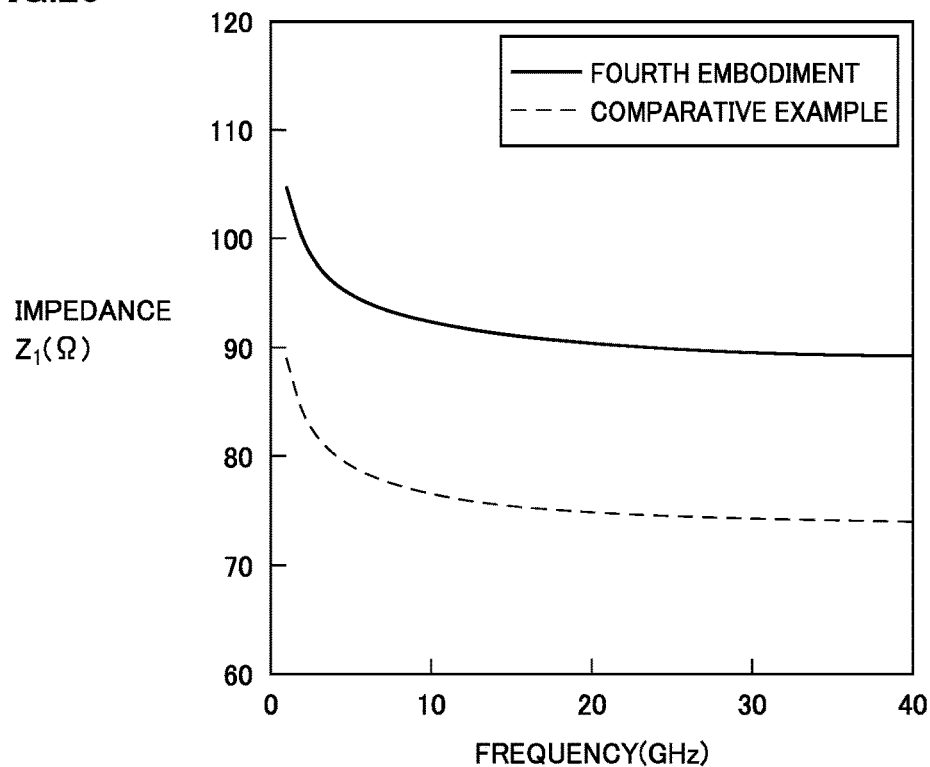
FIG. 25 is a graph illustrating a relationship between a microwave frequency and an impedance of a first line of the semiconductor optical modulator in the semiconductor optical modulators of the fifth embodiment and the comparative example.
Figure 26:
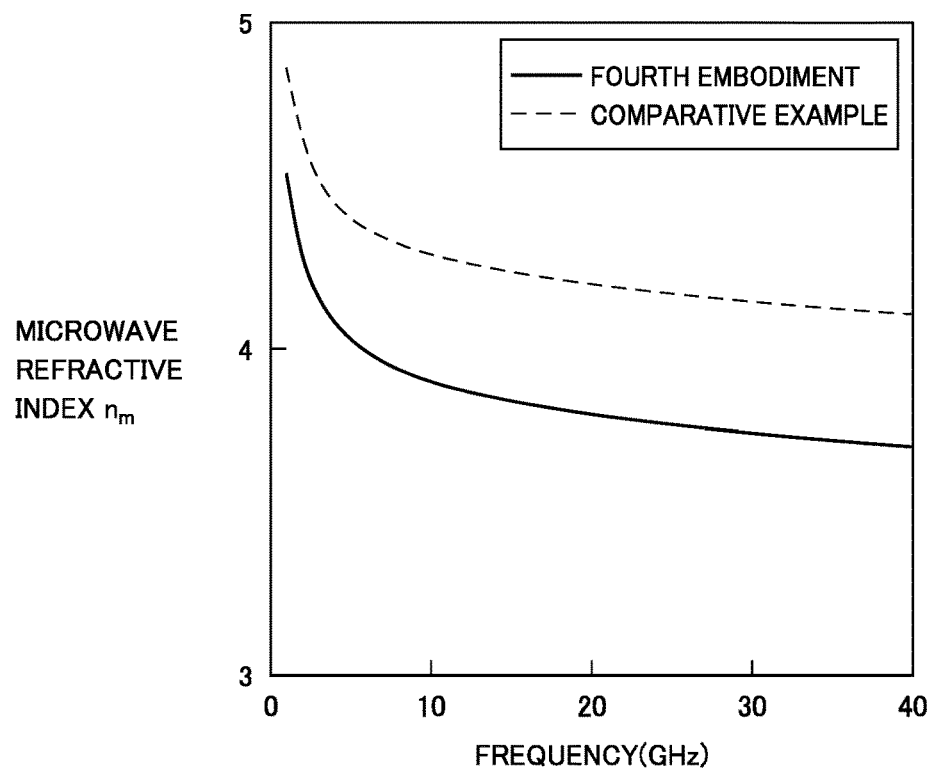
FIG. 26 is a graph illustrating a relationship between the microwave frequency and a microwave refractive index of the semiconductor optical modulator in the semiconductor optical modulators of the fifth embodiment and the comparative example.

In order to widen the bandwidth of semiconductor optical modulator 1e, it is necessary to decrease the reflection of the microwave on the first line of semiconductor optical modulator 1e as much as possible, and to match the phase velocity between the microwave and the light. When the differential driving of semiconductor optical modulator 1e is performed, it is necessary to bring impedance $Z_1$ of the first line of semiconductor optical modulator 1e close to 100Ω, and to bring microwave refractive index $n_m$ of semiconductor optical modulator 1e close to 3.6. As compared with a semiconductor optical modulator according to a comparative example in FIG. 24, the reason why semiconductor optical modulator 1e of the fifth embodiment can bring impedance $Z_1$ of the first line of semiconductor optical modulator 1e close to 100Ω while bringing microwave refractive index $n_m$ close to 3.6 will be described below. In the semiconductor optical modulator of the comparative example in FIG. 24, non-modulation region 19b and transition region 19c of semiconductor optical modulator 1e of the fifth embodiment are replaced with modulation region 19a. The semiconductor optical modulator of the comparative example includes only modulation region 19a, but does not include non-modulation region 19b and transition region 19c.

Impedance $Z_1$ of the first line of semiconductor optical modulator 1e is given by the following equation (4). In the equation (4), C represents the capacitance of semiconductor optical modulator 1e, and L represents the inductance of semiconductor optical modulator 1e.

[Mathematical Formula 4]

$$Z_1 = \sqrt{\frac{L}{C}} \qquad (4)$$

The capacitance C of semiconductor optical modulator 1e includes first mutual capacitance $C_{1G}$ between first traveling wave electrode 16a and first ground electrode 17a, second mutual capacitance $C_{2G}$ between second traveling wave electrode 16b and second ground electrode 17b, third mutual capacitance $C_{12}$ between first traveling wave electrode 16a and second traveling wave electrode 16b, capacitance $C_{13a}$ of first optical waveguide 13a, capacitance $C_{13b}$ of second optical waveguide 13b, capacitance $C_{23a}$ of second insulating layer 23a, capacitance $C_{23b}$ of second insulating layer 23b, capacitance $C_{24a}$ of first insulating layer 24a, and capacitance $C_{24b}$ of first insulating layer 24b. Inductance L of semiconductor optical modulator 1e includes first inductance $L_1$ of first traveling wave electrode 16a, second inductance $L_2$ of second traveling wave electrode 16b, and mutual inductance $L_{12}$ between first traveling wave electrode 16a and second traveling wave electrode 16b.

Semiconductor optical modulator 1e includes non-modulation region 19b. In non-modulation region 19b, first insulating layers 24a, 24b are disposed between first optical waveguide 13a and first traveling wave electrode 16a and between second optical waveguide 13b and second traveling wave electrode 16b. As illustrated in FIGS. 22 and 23, in non-modulation region 19b, capacitances $C_{24a}$, $C_{24b}$ of first insulating layers 24a, 24b are added in addition to capacitances $C_{13a}$, $C_{13b}$ of first optical waveguide 13a. Capacitances $C_{24a}$, $C_{24b}$ of first insulating layers 24a, 24b are connected in series to capacitances $C_{13a}$, $C_{13b}$ of first optical waveguide 13a. For this reason, the capacitance of non-modulation region 19b decreases, and capacitance C of semiconductor optical modulator 1e also decreases. From the equation (4), the second impedance of the first line in non-modulation region 19b increases and becomes larger than the first impedance of the first line in modulation region 19a (see FIG. 27), and impedance $Z_1$ of the first line increases (see FIG. 25). In this way, impedance $Z_1$ of the first line of semiconductor optical modulator 1e can be brought close to 100Ω.

Capacitances $C_{24a}$, $C_{24b}$ of first insulating layers 24a, 24b are connected in series to capacitances $C_{13a}$, $C_{13b}$ of first optical waveguide 13a, so that capacitance C of semiconductor optical modulator 1e further decreases as the dielectric constants of first insulating layers 24a, 24b decrease. Capacitances $C_{24a}$, $C_{24b}$ of first insulating layers 24a, 24b may be smaller than capacitances $C_{13a}$, $C_{13b}$ of first optical waveguide 13a and capacitances $C_{23a}$, $C_{23b}$ of second insulating layers 23a, 23b. First insulating layers 24a, 24b may be made of a low-dielectric constant material such as silicon dioxide, benzocyclobutene (BCB), polyimide, and epoxy.

In semiconductor optical modulator 1e, first width $W_1$ of first ground electrode 17a in non-modulation region 19b is larger than second width $W_2$ of first ground electrode 17a in modulation region 19a. Third width $W_3$ of second ground electrode 17b in non-modulation region 19b is larger than fourth width $W_4$ of second ground electrode 17b in modulation region 19a. For this reason, as illustrated in FIG. 21, first mutual capacitance $C_{1G}$ between first traveling wave electrode 16a and first ground electrode 17a and second mutual capacitance $C_{2G}$ between second traveling wave electrode 16b and second ground electrode 17b decrease. The capacitance of non-modulation region 19b decreases, and capacitance C of semiconductor optical modulator 1e also decreases. From the equation (4), the second impedance of the first line in non-modulation region 19b increases and becomes larger than the first impedance of the first line in modulation region 19a (see FIG. 27), and impedance $Z_1$ of the first line increases (see FIG. 25). In this way, impedance $Z_1$ of the first line of semiconductor optical modulator 1e can be brought close to 100Ω.

In non-modulation region 19b, second insulating layers 23a, 23b are disposed between first optical waveguide 13a and first traveling wave electrode 16a and between second optical waveguide 13b and second traveling wave electrode 16b. As illustrated in FIGS. 22 and 23, in non-modulation region 19b, capacitances $C_{23a}$, $C_{23b}$ of second insulating layers 23a, 23b are added in addition to capacitances $C_{13a}$, $C_{13b}$ of first optical waveguide 13a. Capacitances $C_{23a}$, $C_{23b}$ of second insulating layers 23a, 23b are connected in series to capacitances $C_{13a}$, $C_{13b}$ of first optical waveguide 13a. For this reason, the capacitance of non-modulation region 19b decreases, and capacitance C of semiconductor optical modulator 1e also decreases. From the equation (4), the second impedance of the first line in non-modulation region 19b increases and becomes larger than the first impedance of the first line in modulation region 19a (see FIG. 27), and impedance $Z_1$ of the first line increases (see FIG. 25). In this way, impedance $Z_1$ of the first line of semiconductor optical modulator 1e can be brought close to 100Ω.

Figure 27:
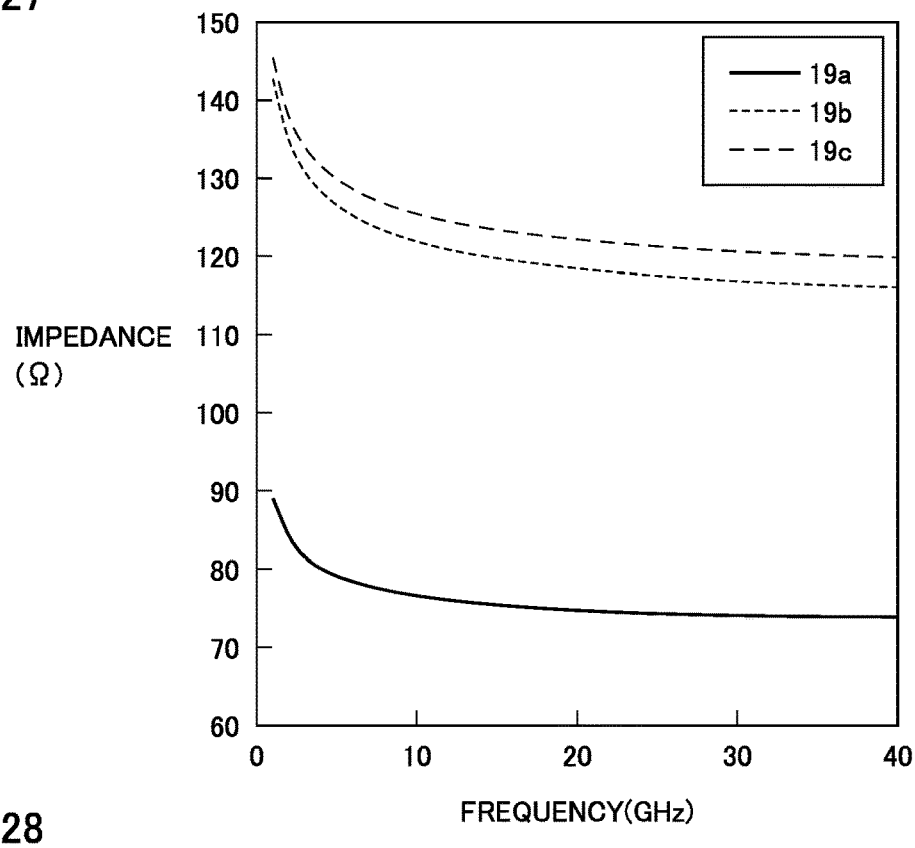
FIG. 27 is a graph illustrating a relationship between the microwave frequency and the impedance of the first line of the semiconductor optical modulator in the modulation region, the transition region, and the non-modulation region of the semiconductor optical modulator of the fifth embodiment.

As illustrated in FIG. 27, the first impedance of first line in the modulation region 19a may be smaller than 100Ω at a microwave frequency of 20 Gbit/s or more. The second impedance of the first line in non-modulation region 19b may be greater than 100Ω, be greater than 110Ω, or be greater than 115Ω at a microwave frequency of 20 Gbit/s or more.

Microwave refractive index $n_m$ of semiconductor optical modulator 1e is given by the following equation (5). In the equation (5), c represents the speed of light in vacuum.

[Mathematical Formula 5]

$$n_m = c\sqrt{CL} \qquad (5)$$

Figure 28:
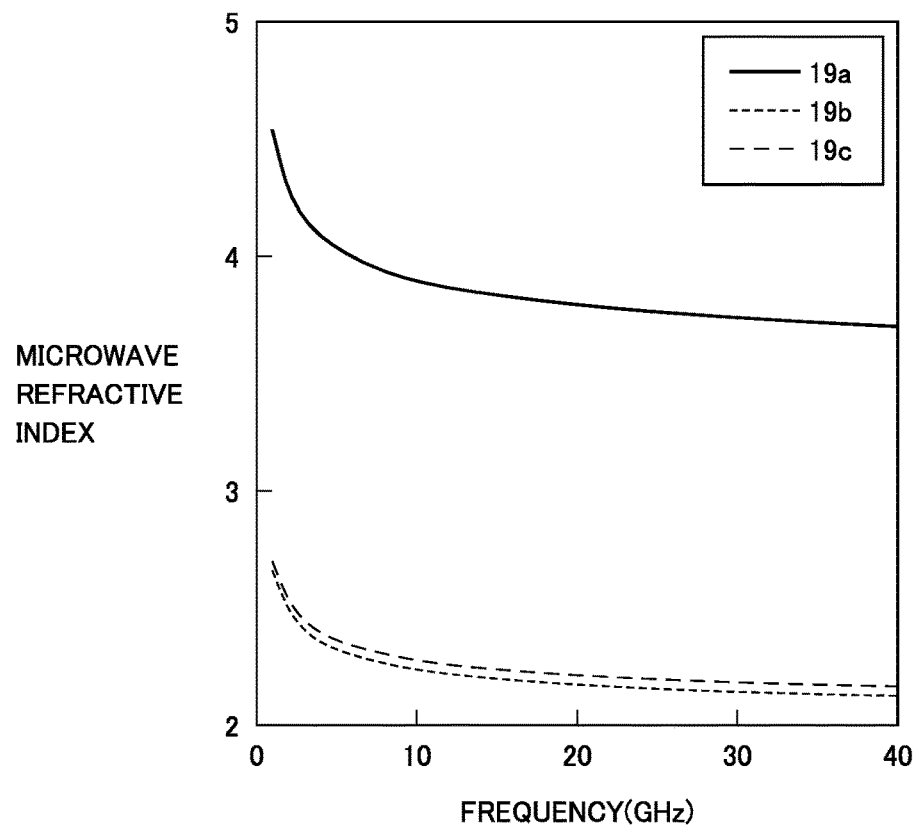
FIG. 28 is a graph illustrating a relationship between the microwave frequency and the microwave refractive index of the semiconductor optical modulator in the modulation region, the transition region, and the non-modulation region of the semiconductor optical modulator of the fifth embodiment.

As described above, the capacitance of non-modulation region 19b decreases, and capacitance C of semiconductor optical modulator 1e also decreases. From the equation (5), microwave refractive index $n_m$ in non-modulation region 19b decreases and becomes smaller than microwave refractive index $n_m$ in modulation region 19a (see FIG. 28), and microwave refractive index $n_m$ of semiconductor optical modulator 1e decreases (see FIG. 26). In this way, microwave refractive index $n_m$ of semiconductor optical modulator 1e can be brought close to 3.6. As illustrated in FIG. 28, the microwave refractive index in modulation region 19a may be larger than 3.6 at a microwave frequency of 20 Gbit/s or more. The second impedance of the first line in non-modulation region 19b may be smaller than 3.6, be smaller than 3.2, or be smaller than 2.8 at a microwave frequency of 20 Gbit/s or more.

Impedance $Z_1$ of the first line of semiconductor optical modulator 1e and microwave refractive index $n_m$ of semiconductor optical modulator 1e can be adjusted by changing at least one of the ratio of the second length of non-modulation region 19b to first width $W_1$ of first ground electrode 17a in non-modulation region 19b, the ratio of the second length of non-modulation region 19b to third width $W_3$ of second ground electrode 17b in non-modulation region 19b, and the ratio of the second length of non-modulation region 19b to the first entire length of unit structure 10e.

Semiconductor optical modulator 1e may include transition region 19c. First insulating layer 24a is disposed between first optical waveguide 13a and first traveling wave electrode 16a in transition region 19c. First insulating layer 24b is disposed between second optical waveguide 13b and second traveling wave electrode 16b in transition region 19c. The width of first ground electrode 17a in transition region 19c is larger than second width $W_2$ of first ground electrode 17a in modulation region 19a. The width of second ground electrode 17b in transition region 19c is larger than fourth width $W_4$ of second ground electrode 17b in modulation region 19a. For this reason, even in transition region 19c, the capacitance and microwave refractive index $n_m$ decrease similarly to non-modulation region 19b. In this way, impedance $Z_1$ of the first line of semiconductor optical modulator 1e can be brought close to 100Ω, and microwave refractive index $n_m$ of semiconductor optical modulator 1e can be brought close to 3.6.

Second insulating layer 23a is disposed between first optical waveguide 13a and first traveling wave electrode 16a in transition region 19c. Second insulating layer 23b is disposed between second optical waveguide 13b and second traveling wave electrode 16b in transition region 19c. The width of first ground electrode 17a in transition region 19c is larger than second width $W_2$ of first ground electrode 17a in modulation region 19a. The width of second ground electrode 17b in transition region 19c is larger than fourth width $W_4$ of second ground electrode 17b in modulation region 19a. For this reason, even in transition region 19c, the capacitance and microwave refractive index $n_m$ decrease similarly to non-modulation region 19b. In this way, impedance $Z_1$ of the first line of semiconductor optical modulator 1e can be brought close to 100Ω, and microwave refractive index $n_m$ of semiconductor optical modulator 1e can be brought close to 3.6.

As illustrated in FIG. 27, the impedance of the first line in transition region 19c may be greater than 100Ω, be greater than 110Ω, or be greater than 115Ω at a microwave frequency of 20 Gbit/s or more. As illustrated in FIG. 28, the second impedance of the first line in transition region 19c may be smaller than 3.6, be smaller than 3.2, or be smaller than 2.8 at a microwave frequency of 20 Gbit/s or more.

Impedance $Z_1$ of the first line of semiconductor optical modulator 1e and microwave refractive index $n_m$ of semiconductor optical modulator 1e can be adjusted by changing at least one of the ratio of the length of transition region 19c to the width of first ground electrode 17a in transition region 19c, the ratio of the length of transition region 19c to the width of second ground electrode 17b in transition region 19c, and the ratio of the length of transition region 19c to the first entire length of unit structure 10e.

Figure 29:
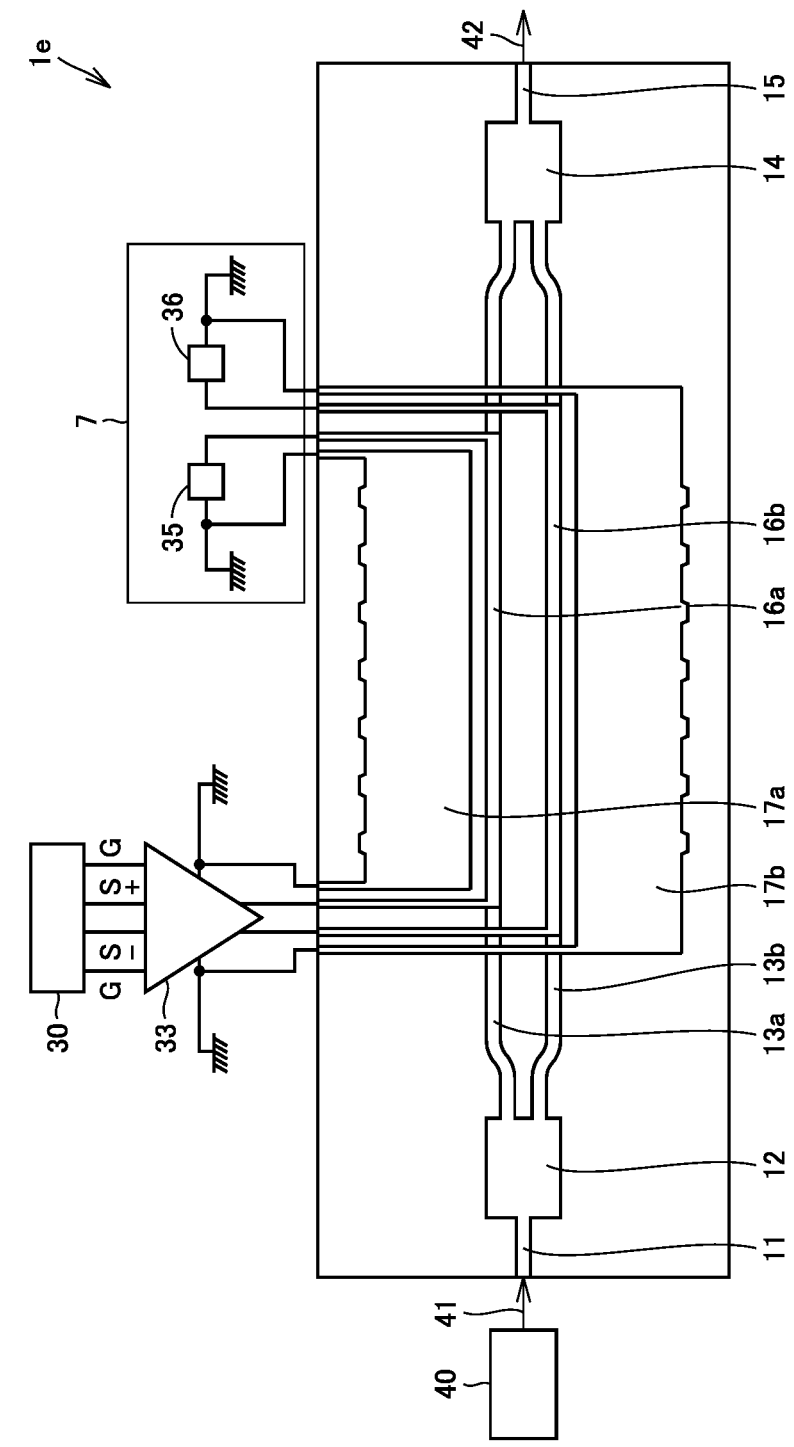
FIG. 29 is a schematic plan view of a semiconductor optical modulator according to a modification of the fifth embodiment.

With reference to FIG. 29, semiconductor optical modulator 1e according to a modification of the fifth embodiment will be described. As illustrated in FIG. 29, first protrusion 17p of first ground electrode 17a is formed on the third side surface of first ground electrode 17a, and may protrude toward the opposite side to first traveling wave electrode 16a. The third side surface of first ground electrode 17a is a side surface on the opposite side to the first side surface of first ground electrode 17a facing first traveling wave electrode 16a. Second protrusion 17q of second ground electrode 17b is formed on the fourth side surface of second ground electrode 17b facing second traveling wave electrode 16b, and may protrude toward the opposite side to second traveling wave electrode 16b. The fourth side surface of second ground electrode 17b is a side surface on the opposite side to the second side surface of second ground electrode 17b facing second traveling wave electrode 16b.

Figure 30:
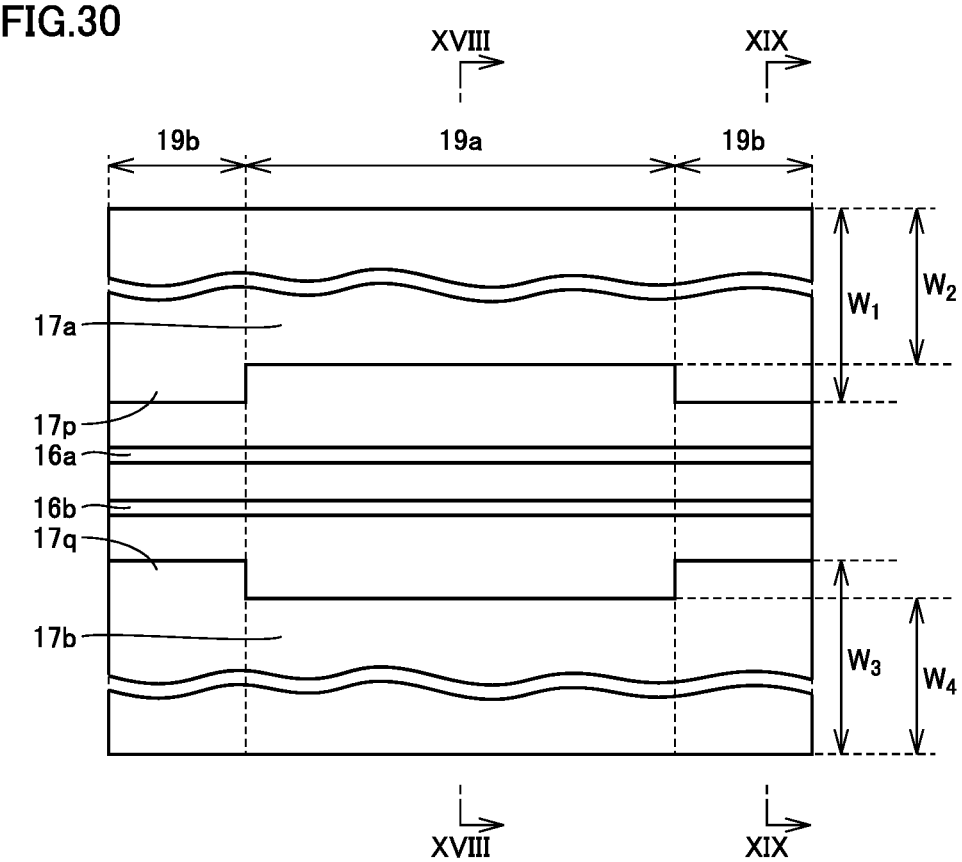
FIG. 30 is a partially enlarged plan view schematically illustrating a semiconductor optical modulator according to another modification of the fifth embodiment.
Figure 31:
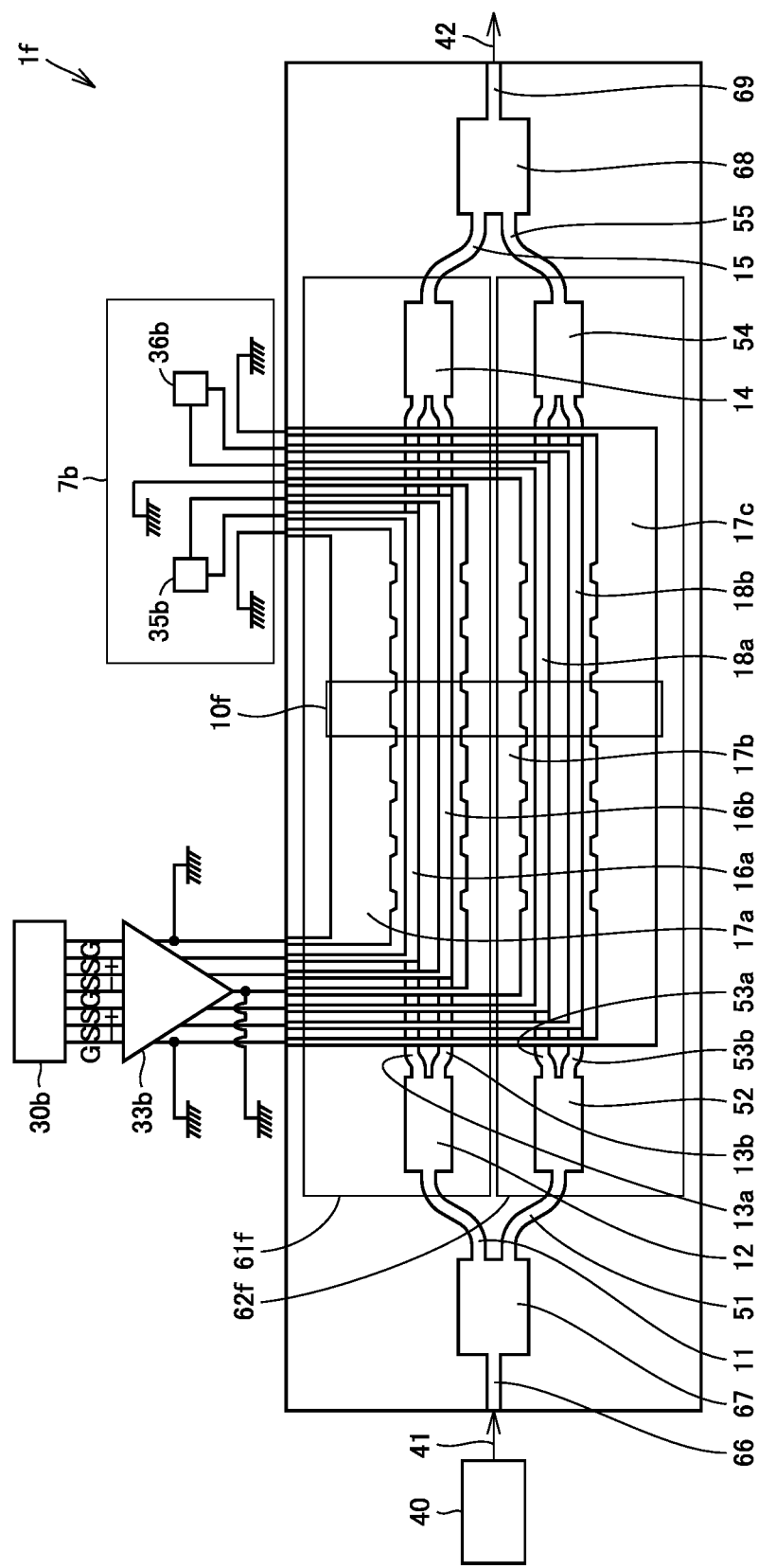
FIG. 31 is a schematic plan view of a semiconductor optical modulator according to a sixth embodiment.

With reference to FIG. 30, semiconductor optical modulator 1e according to another modification of the fifth embodiment will be described. As illustrated in FIG. 30, transition region 19c may be omitted.

The effect of semiconductor optical modulator 1e of the fifth embodiment will be described.

Semiconductor optical modulator 1e includes the first Mach-Zehnder type optical waveguide, first traveling wave electrode 16a, second traveling wave electrode 16b, first ground electrode 17a, second ground electrode 17b, and first insulating layers 24a, 24b. The first Mach-Zehnder type optical waveguide includes first optical input unit 11, first optical branch unit 12 connected to first optical input unit 11, first optical waveguide 13a connected to first optical branch unit 12, second optical waveguide 13b connected to first optical branch unit 12, first optical multiplex unit 14 connected to first optical waveguide 13a and second optical waveguide 13b, and first optical output unit 15 connected to first optical multiplex unit 14. First traveling wave electrode 16a is disposed above first optical waveguide 13a. Second traveling wave electrode 16b is disposed above second optical waveguide 13b. First ground electrode 17a is disposed on the opposite side to second traveling wave electrode 16b with respect to first traveling wave electrode 16a, and disposed at a space from first traveling wave electrode 16a. Second ground electrode 17b is disposed on the opposite side to first traveling wave electrode 16a with respect to second traveling wave electrode 16b, and disposed at a space from second traveling wave electrode 16b.

Semiconductor optical modulator 1e includes unit structures 10e arrayed along first optical waveguide 13a and second optical waveguide 13b. Each of unit structures 10e includes modulation region 19a and non-modulation region 19b. First width $W_1$ of first ground electrode 17a in non-modulation region 19b is larger than second width $W_2$ of first ground electrode 17a in modulation region 19a. Third width $W_3$ of second ground electrode 17b in non-modulation region 19b is larger than fourth width $W_4$ of second ground electrode 17b in modulation region 19a. In non-modulation region 19b, first insulating layers 24a, 24b are disposed between first optical waveguide 13a and first traveling wave electrode 16a and between second optical waveguide 13b and second traveling wave electrode 16b.

In semiconductor optical modulator 1e, the capacitance of non-modulation region 19b is decreased, and capacitance C of semiconductor optical modulator 1e is decreased. For this reason, impedance $Z_1$ of the first line of semiconductor optical modulator 1e can be increased. Microwave refractive index $n_m$ of semiconductor optical modulator 1e can be decreased. Semiconductor optical modulator 1e in which the bandwidth is widened can be provided.

In semiconductor optical modulator 1e, first traveling wave electrode 16a has a constant width in modulation region 19a, non-modulation region 19b, and modulation region 19a. Second traveling wave electrode 16b has a constant width in modulation region 19a, non-modulation region 19b, and modulation region 19a. Each of first traveling wave electrode 16a and second traveling wave electrode 16b has a simple shape. For this reason, degradation of a microwave propagation characteristic can be prevented in first traveling wave electrode 16a and second traveling wave electrode 16b. Semiconductor optical modulator 1e in which the bandwidth is widened can be provided. Furthermore, the increase in the size of semiconductor optical modulator 1e and the increase of manufacturing cost of semiconductor optical modulator 1e can be prevented.

In semiconductor optical modulator 1e, each of unit structures 10e includes transition region 19c disposed between modulation region 19a and non-modulation region 19b. The first space between first ground electrode 17a and first traveling wave electrode 16a changes gradually in transition region 19c. The second space between second ground electrode 17b and second traveling wave electrode 16b changes gradually in transition region 19c. The reflection of the microwave propagating through first traveling wave electrode 16a and second traveling wave electrode 16b between modulation region 19a and non-modulation region 19b can be decreased in transition region 19c. Semiconductor optical modulator 1e in which the bandwidth is widened can be provided.

The width of first ground electrode 17a in transition region 19c may be larger than second width $W_2$ of first ground electrode 17a in modulation region 19a. The width of second ground electrode 17b in transition region 19c may be larger than fourth width $W_4$ of second ground electrode 17b in modulation region 19a. In transition region 19c, first insulating layers 24a, 24b may further be disposed between first optical waveguide 13a and first traveling wave electrode 16a and between second optical waveguide 13b and second traveling wave electrode 16b. For this reason, capacitance C of semiconductor optical modulator 1e is further decreased. Semiconductor optical modulator 1e in which the bandwidth is widened can be provided.

In semiconductor optical modulator 1e, the first length of modulation region 19a along first optical waveguide 13a and second optical waveguide 13b ranges from 0.50 times to 0.95 times the first entire length of unit structure 10e along first optical waveguide 13a and second optical waveguide 13b. The second length of non-modulation region 19b along first optical waveguide 13a and second optical waveguide 13b may range from 0.04 times to 0.48 times the first entire length of unit structure 10e. The ratio of modulation region 19a to unit structure 10e is made larger than the ratio of non-modulation region 19b to unit structure 10e, thereby suppressing the increase in the size of semiconductor optical modulator 1e and widening the bandwidth of semiconductor optical modulator 1e.

Sixth Embodiment

With reference to FIGS. 31 to 35, a semiconductor optical modulator 1f according to a sixth embodiment will be described. Semiconductor optical modulator 1f of the sixth embodiment has the same configuration as semiconductor optical modulator 1e of the fifth embodiment, but is mainly different from semiconductor optical modulator 1e in the following point.

Semiconductor optical modulator 1f includes the second Mach-Zehnder type optical waveguide, a third traveling wave electrode 18a, a fourth traveling wave electrode 18b, a third ground electrode 17c, optical input unit 66, optical branch unit 67, optical multiplex unit 68, and optical output unit 69. The second Mach-Zehnder type optical waveguide is disposed in parallel with the first Mach-Zehnder type optical waveguide. The second Mach-Zehnder type optical waveguide has the same configuration as the first Mach-Zehnder type optical waveguide.

Specifically, the second Mach-Zehnder type optical waveguide includes a second optical input unit 51, a second optical branch unit 52, a third optical waveguide 53a, a fourth optical waveguide 53b, and a second optical multiplex unit 54, and a second optical output unit 55. Second optical branch unit 52 is connected to second optical input unit 51. Third optical waveguide 53a and fourth optical waveguide 53b are connected to second optical branch unit 52. Second optical multiplex unit 54 is connected to third optical waveguide 53a and fourth optical waveguide 53b. Second optical output unit 55 is connected to second optical multiplex unit 54. Each of second optical branch unit 52 and second optical multiplex unit 54 is not particularly limited, but may be a multimode interference (MMI) waveguide, a Y-branch waveguide, or a directivity coupler.

The second Mach-Zehnder type optical waveguide may be formed by an i-type semiconductor layer such as an undoped semiconductor layer. The second Mach-Zehnder type optical waveguide may be formed by, for example, an i-type InP layer. The second Mach-Zehnder type optical waveguide may have a multiple quantum well (MQW) structure.

Optical branch unit 67 is connected to optical input unit 66. Optical branch unit 67 is connected to first optical input unit 11 and second optical input unit 51. The first Mach-Zehnder type optical waveguide and the second Mach-Zehnder type optical waveguide are connected to optical branch unit 67. Optical multiplex unit 68 is connected to first optical output unit 15 and second optical output unit 55. The first Mach-Zehnder type optical waveguide and the second Mach-Zehnder type optical waveguide are connected to optical multiplex unit 68. Optical output unit 69 is connected to optical multiplex unit 68. Semiconductor optical modulator 1f may be an IQ optical modulator. The IQ optical modulator is an optical modulator configured to independently generate orthogonal optical electric field components (I channel, Q channel). Semiconductor optical modulator 1f may be a quadrature phase shift keying (QPSK) optical modulator.

Third traveling wave electrode 18a is disposed above third optical waveguide 53a. Fourth traveling wave electrode 18b is disposed above fourth optical waveguide 53b. Second ground electrode 17b is disposed on the opposite side to fourth traveling wave electrode 18b with respect to third traveling wave electrode 18a, and disposed at a space from third traveling wave electrode 18a. Third ground electrode 17c is disposed on the opposite side to third traveling wave electrode 18a with respect to fourth traveling wave electrode 18b, and disposed at a space from fourth traveling wave electrode 18b. Third traveling wave electrode 18a and fourth traveling wave electrode 18b are disposed between second ground electrode 17b and third ground electrode 17c. Third traveling wave electrode 18a, fourth traveling wave electrode 18b, and third ground electrode 17c are not particularly limited, but may be made of conductive metal such as gold (Au) or platinum (Pt).

Semiconductor optical modulator 1f includes a first Mach-Zehnder optical modulator portion 61f and a second Mach-Zehnder optical modulator portion 62f. First Mach-Zehnder optical modulator portion 61f mainly includes the first Mach-Zehnder type optical waveguide, first traveling wave electrode 16a, second traveling wave electrode 16b, first ground electrode 17a, and second ground electrode 17b. Second Mach-Zehnder optical modulator portion 62f mainly includes the second Mach-Zehnder type optical waveguide, third traveling wave electrode 18a, fourth traveling wave electrode 18b, second ground electrode 17b, and third ground electrode 17c. Second ground electrode 17b electrically separates third traveling wave electrode 18a and fourth traveling wave electrode 18b from first traveling wave electrode 16a and second traveling wave electrode 16b. For this reason, crosstalk between first Mach-Zehnder optical modulator portion 61f and second Mach-Zehnder optical modulator portion 62f is decreased. In semiconductor optical modulator 1f, second ground electrode 17b is shared by first Mach-Zehnder optical modulator portion 61f and second Mach-Zehnder optical modulator portion 62f. For this reason, semiconductor optical modulator 1f can be downsized.

Second ground electrode 17b, third traveling wave electrode 18a, fourth traveling wave electrode 18b, and third ground electrode 17c constitute the second line. The second line is a GSSG (Ground, Signal, Signal, Ground) type differential line (coplanar line). The GSSG type differential line can downsize semiconductor optical modulator 1f. In the GSSG type differential line, third traveling wave electrode 18a and fourth traveling wave electrode 18b are adjacent to each other, so that the noise immunity can be improved.

One end of the third traveling wave electrode 18a and one end of the fourth traveling wave electrode 18b are electrically connected to signal source 30. Signal source 30 outputs a differential signal. The differential signal is not particularly limited, but may have a high frequency of 20 Gbit/s or higher. A voltage having an opposite phase to that of fourth optical waveguide 53b is applied to third optical waveguide 53a (push-pull configuration). Electric amplifier 33 may be disposed between signal source 30 and one end of third traveling wave electrode 18a and between signal source 30 and one end of fourth traveling wave electrode 18b. Electric amplifier 33 amplifies the differential signal output from signal source 30, and outputs the amplified differential signal to one end of third traveling wave electrode 18a and one end of fourth traveling wave electrode 18b.

Termination 7b is connected to the output sides (right side in FIG. 31) of first traveling wave electrode 16a, second traveling wave electrode 16b, third traveling wave electrode 18a, and fourth traveling wave electrode 18b. Termination 7b includes a first termination resistor 35b and a second termination resistor 36b. The other end of first traveling wave electrode 16a and the other end of second traveling wave electrode 16b may be connected to first termination resistor 35b. First termination resistor 35b may have a resistance of 100Ω. The other end of third traveling wave electrode 18a and the other end of fourth traveling wave electrode 18b may be connected to second termination resistor 36b. Second termination resistor 36b may have a resistance of 100Ω. One end of first ground electrode 17a, one end of second ground electrode 17b, and one end of third ground electrode 17c are connected to the grounding potential. The other end of first ground electrode 17a, the other end of second ground electrode 17b, and the other end of third ground electrode 17c are connected to the grounding potential.

Semiconductor optical modulator 1f includes unit structures 10f. Semiconductor optical modulator 1f has a periodic structure along first optical waveguide 13a and second optical waveguide 13b, and has a periodic structure along third optical waveguide 53a and fourth optical waveguide 53b.

Figure 32:
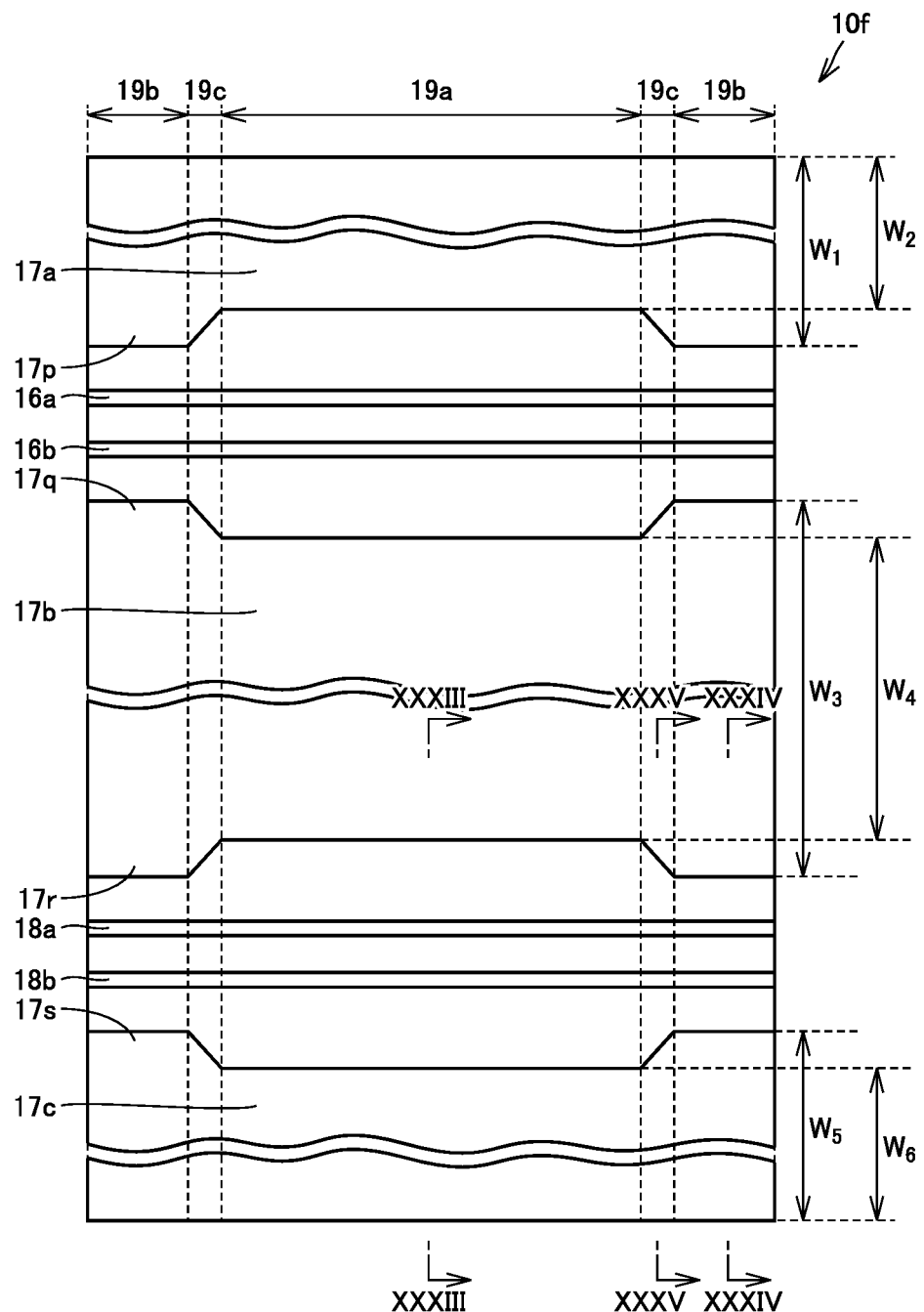
FIG. 32 is a partially enlarged plan view schematically illustrating the semiconductor optical modulator of the sixth embodiment.

Unit structures 10f are arrayed along third optical waveguide 53a and fourth optical waveguide 53b. As illustrated in FIG. 32, each of unit structures 10f includes modulation region 19a and non-modulation region 19b. First width $W_1$ of first ground electrode 17a in non-modulation region 19b is different from second width $W_2$ of first ground electrode 17a in modulation region 19a. Specifically, first width $W_1$ of first ground electrode 17a in non-modulation region 19b is larger than second width $W_2$ of first ground electrode 17a in modulation region 19a. Third width $W_3$ of second ground electrode 17b in non-modulation region 19b is different from fourth width $W_4$ of second ground electrode 17b in modulation region 19a. Specifically, third width $W_3$ of second ground electrode 17b in non-modulation region 19b is larger than fourth width $W_4$ of second ground electrode 17b in modulation region 19a. Fifth width $W_5$ of third ground electrode 17c in non-modulation region 19b is different from sixth width $W_6$ of third ground electrode 17c in modulation region 19a. Specifically, fifth width $W_5$ of third ground electrode 17c in non-modulation region 19b is larger than sixth width $W_6$ of third ground electrode 17c in modulation region 19a.

Specifically, third traveling wave electrode 18a may have a constant width in modulation region 19a and non-modulation region 19b. More specifically, third traveling wave electrode 18a may have a constant width in modulation region 19a, non-modulation region 19b, and transition region 19c. Fourth traveling wave electrode 18b may have a constant width in modulation region 19a and non-modulation region 19b. More specifically, fourth traveling wave electrode 18b may have a constant width in modulation region 19a, non-modulation region 19b, and transition region 19c.

In non-modulation region 19b, second ground electrode 17b may include third protrusion 17r. Third protrusion 17r is formed on the fourth side surface of second ground electrode 17b facing third traveling wave electrode 18a, and may protrude toward third traveling wave electrode 18a. In non-modulation region 19b, third ground electrode 17c may include fourth protrusion 17s. Fourth protrusion 17s is formed on the fifth side surface of third ground electrode 17c facing fourth traveling wave electrode 18b, and may protrude toward fourth traveling wave electrode 18b. A third space between second ground electrode 17b and third traveling wave electrode 18a may be the narrowest in non-modulation region 19b, and be the widest in modulation region 19a. A fourth space between third ground electrode 17c and fourth traveling wave electrode 18b may be the narrowest in non-modulation region 19b, and be the widest in modulation region 19a. The space between first traveling wave electrode 16a and second traveling wave electrode 16b may be constant in modulation region 19a, non-modulation region 19b, and transition region 19c. The space between third traveling wave electrode 18a and fourth traveling wave electrode 18b may be constant in modulation region 19a, non-modulation region 19b, and transition region 19c.

In unit structure 10f, the third length of modulation region 19a along third optical waveguide 53a and fourth optical waveguide 53b may range from 0.50 times to 0.95 times the second entire length of unit structure 10f along third optical waveguide 53a and fourth optical waveguide 53b. In unit structure 10f, the fourth length of non-modulation region 19b along third optical waveguide 53a and fourth optical waveguide 53b may range from 0.04 times to 0.48 times the second entire length of unit structure 10f. In semiconductor optical modulator 1f of the sixth embodiment, the fourth length of non-modulation region 19b is defined as the total length of the two portions of non-modulation region 19b along third optical waveguide 53a and fourth optical waveguide 53b in unit structure 10f. For example, the second entire length of unit structure 10f may range from 100 µm to 500 µm.

The second entire length of unit structure 10f may be equal to the first entire length of unit structure 10f, or be different from the first entire length of unit structure 10f. The third length of modulation region 19a may be equal to the first length of modulation region 19a, or be different from the first length of modulation region 19a. The fourth length of non-modulation region 19b may be equal to the second length of non-modulation region 19b, or be different from the second length of non-modulation region 19b.

Each of unit structures 10f may include transition region 19c disposed between modulation region 19a and non-modulation region 19b. In transition region 19c, the third space between second ground electrode 17b and third traveling wave electrode 18a decreases gradually from modulation region 19a toward non-modulation region 19b. In transition region 19c, the fourth space between third ground electrode 17c and fourth traveling wave electrode 18b decreases gradually from modulation region 19a toward non-modulation region 19b.

Figure 33:
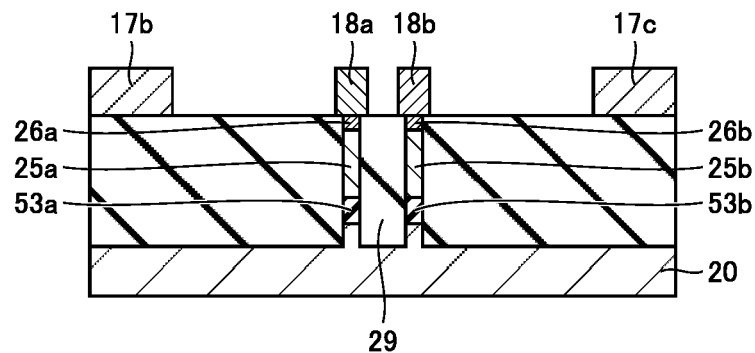
FIG. 33 is a partially sectional view schematically illustrating the semiconductor optical modulator of the sixth embodiment taken along a sectional line XXXIII-XXXIII in FIG. 32.
Figure 34:
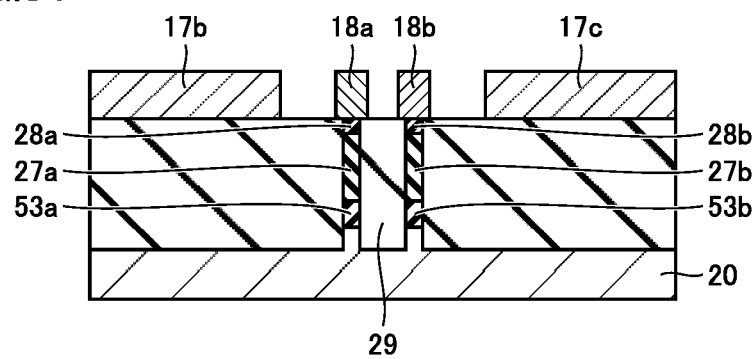
FIG. 34 is a partially sectional view schematically illustrating the semiconductor optical modulator of the sixth embodiment taken along a sectional line XXXIV-XXXIV in FIG. 32.
Figure 35:
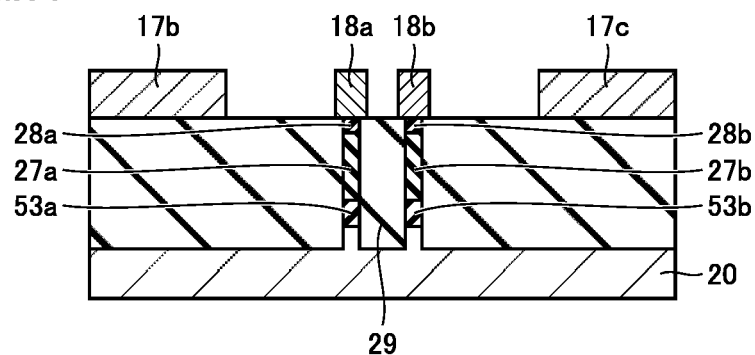
FIG. 35 is a partially sectional view schematically illustrating the semiconductor optical modulator of the sixth embodiment taken along a sectional line XXXV-XXXV in FIG. 32.

As illustrated in FIGS. 33 to 35, the second Mach-Zehnder type optical waveguide has the same sectional structure as the first Mach-Zehnder type optical waveguide. Specifically, first semiconductor layer 20 extends to modulation region 19a and non-modulation region 19b. First semiconductor layer 20 may further extend to transition region 19c. Third optical waveguide 53a and fourth optical waveguide 53b may be provided on first semiconductor layer 20. Third optical waveguide 53a and fourth optical waveguide 53b extend to modulation region 19a and non-modulation region 19b. Third optical waveguide 53a and fourth optical waveguide 53b may further extend to transition region 19c. Second semiconductor layer 25a may be provided on third optical waveguide 53a. Second semiconductor layer 25b may be provided on fourth optical waveguide 53b. Second semiconductor layers 25a, 25b extend to modulation region 19a.

Third optical waveguide 53a may be a core layer, and first semiconductor layer 20 and second semiconductor layer 25a sandwiching third optical waveguide 53a may be a clad layer. Fourth optical waveguide 53b may be a core layer, and first semiconductor layer 20 and second semiconductor layer 25b sandwiching fourth optical waveguide 53b may be a clad layer. First semiconductor layer 20, third optical waveguide 53a, and second semiconductor layer 25a may have a p-i-n junction structure. First semiconductor layer 20, fourth optical waveguide 53b, and second semiconductor layer 25b may have a p-i-n junction structure. First semiconductor layer 20, third optical waveguide 53a, and second semiconductor layer 25a may have a high-mesa optical waveguide structure. First semiconductor layer 20, fourth optical waveguide 53b, and second semiconductor layer 25b may have a high-mesa optical waveguide structure.

Contact layer 26a may be provided on second semiconductor layer 25a. Contact layer 26b may be provided on second semiconductor layer 25b. Contact layers 26a, 26b extend to modulation region 19a. Contact layer 26a is in ohmic contact with third traveling wave electrode 18a. Contact layer 26b is in ohmic contact with fourth traveling wave electrode 18b.

As illustrated in FIG. 34, second semiconductor layers 25a, 25b and contact layers 26a, 26b do not extend to non-modulation region 19b. Second insulating layer 27a may be provided on third optical waveguide 53a. Second insulating layer 27b may be provided on fourth optical waveguide 53b. Second insulating layers 27a, 27b extend to non-modulation region 19b. Second insulating layer 27a is disposed between third optical waveguide 53a and third traveling wave electrode 18a in non-modulation region 19b. Second insulating layer 27b is disposed between fourth optical waveguide 53b and fourth traveling wave electrode 18b in non-modulation region 19b. Third optical waveguide 53a may be a core layer, and first semiconductor layer 20 and second insulating layer 27a sandwiching third optical waveguide 53a may be a clad layer. Fourth optical waveguide 53b may be a core layer, and first semiconductor layer 20 and second insulating layer 27b sandwiching fourth optical waveguide 53b may be a clad layer. First semiconductor layer 20, third optical waveguide 53a, and second insulating layer 27a may have a high-mesa optical waveguide structure. First semiconductor layer 20, fourth optical waveguide 53b, and second insulating layer 27b may have a high-mesa optical waveguide structure.

First insulating layer 28a is disposed between third optical waveguide 53a and third traveling wave electrode 18a in non-modulation region 19b. First insulating layer 28b is disposed between fourth optical waveguide 53b and fourth traveling wave electrode 18b in non-modulation region 19b. First insulating layer 28a may be provided on second insulating layer 27a. First insulating layer 28b may be provided on second insulating layer 27b. First insulating layer 28a may be in contact with third traveling wave electrode 18a. First insulating layer 28b may be in contact with fourth traveling wave electrode 18b. First insulating layers 28a, 28b extend to non-modulation region 19b. First insulating layers 28a, 28b may be made of a low-dielectric constant material such as silicon dioxide, benzocyclobutene (BCB), polyimide, and epoxy. Even when the microwave propagates to third traveling wave electrode 18a and fourth traveling wave electrode 18b, the third partial light traveling through third optical waveguide 53a and the fourth partial light traveling through fourth optical waveguide 53b are hardly phase-modulated in non-modulation region 19b because of first insulating layers 28a, 28b.

As illustrated in FIG. 35, second semiconductor layers 25a, 25b and contact layers 26a, 26b may not extend to transition region 19c. Transition region 19c may have the same sectional structure as that of non-modulation region 19b. Specifically, second insulating layer 27a may be provided on third optical waveguide 53a. Second insulating layer 27b may be provided on fourth optical waveguide 53b.

First insulating layers 28a, 28b and second insulating layers 27a, 27b extend to transition region 19c. First insulating layer 28a and second insulating layer 27a are disposed between third optical waveguide 53a and third traveling wave electrode 18a in transition region 19c. First insulating layer 28b and second insulating layer 27b are disposed between fourth optical waveguide 53b and fourth traveling wave electrode 18b in transition region 19c. First insulating layer 28a may be in contact with third traveling wave electrode 18a. First insulating layer 28b may be in contact with fourth traveling wave electrode 18b. Even when the microwave propagates to third traveling wave electrode 18a and fourth traveling wave electrode 18b, the third partial light traveling through third optical waveguide 53a and the fourth partial light traveling through fourth optical waveguide 53b are hardly phase-modulated in transition region 19c because of first insulating layers 28a, 28b.

As illustrated in FIG. 33, in modulation region 19a, the high-mesa optical waveguide structure including first semiconductor layer 20, third optical waveguide 53a, and second semiconductor layer 25a may be buried in buried layer 29. In modulation region 19a, the high-mesa optical waveguide structure including first semiconductor layer 20, fourth optical waveguide 53b, and second semiconductor layer 25b may be buried in buried layer 29. As illustrated in FIG. 34, in non-modulation region 19b, the high-mesa optical waveguide structure including first semiconductor layer 20, third optical waveguide 53a, and second insulating layer 27a may be buried in buried layer 29. In non-modulation region 19b, the high-mesa optical waveguide structure including first semiconductor layer 20, fourth optical waveguide 53b, and second insulating layer 27b may be buried in buried layer 29. As illustrated in FIG. 35, in transition region 19c, the high-mesa optical waveguide structure including first semiconductor layer 20, third optical waveguide 53a, and second insulating layer 27a may be buried in buried layer 29. In transition region 19c, the high-mesa optical waveguide structure including first semiconductor layer 20, fourth optical waveguide 53b, and second insulating layer 27b may be buried in buried layer 29.

The operation of semiconductor optical modulator 1f will be described.

Light 41 is input from laser light source 40 to optical input unit 66. Light 41 is branched into the first partial light propagating through first optical waveguide 13a, the second partial light propagating through second optical waveguide 13b, third partial light propagating through third optical waveguide 53a, and fourth partial light propagating through fourth optical waveguide 53b by optical branch unit 67, first optical branch unit 12, and second optical branch unit 52.

The first microwave propagating through first traveling wave electrode 16a changes the refractive index of first optical waveguide 13a in modulation region 19a. The first partial light propagating through first optical waveguide 13a is modulated by the first microwave propagating through first traveling wave electrode 16a. The second microwave propagating through second traveling wave electrode 16b changes the refractive index of second optical waveguide 13b in modulation region 19a. The second partial light propagating through second optical waveguide 13b is modulated by the second microwave propagating through second traveling wave electrode 16b.

The third microwave propagating through third traveling wave electrode 18a changes the refractive index of third optical waveguide 53a in modulation region 19a. The third partial light propagating through third optical waveguide 53a is modulated by the third microwave propagating through third traveling wave electrode 18a. The fourth microwave propagating through fourth traveling wave electrode 18b changes the refractive index of fourth optical waveguide 53b in modulation region 19a. The fourth partial light propagating through fourth optical waveguide 53b is modulated by the fourth microwave propagating through fourth traveling wave electrode 18b.

The modulated first partial light, the modulated second partial light, the modulated third partial light, and the modulated fourth partial light are multiplexed by first optical multiplex unit 14, second optical multiplex unit 54, and optical multiplex unit 68 to become modulated light 42. Modulated light 42 is output from optical output unit 69.

In order to widen the bandwidth of semiconductor optical modulator 1f, it is necessary to decrease the reflection of the microwave signal as much as possible, and to match the phase velocity between the microwave signal and the light. When the differential driving of semiconductor optical modulator 1f is performed, it is necessary to bring impedance $Z_1$ of the first line and impedance $Z_2$ of the second line of semiconductor optical modulator 1f close to 100Ω, and to bring microwave refractive index $n_m$ close to 3.6.

For the same reason as the fifth embodiment, the capacitance of non-modulation region 19b decreases, and capacitance C of semiconductor optical modulator 1f also decreases. The fourth impedance of the second line in non-modulation region 19b increases and becomes larger than the third impedance of the second line in modulation region 19a, and impedance $Z_2$ of the second line increases. In this way, impedance $Z_2$ of the second line of semiconductor optical modulator 1f can be brought close to 100Ω. Furthermore, microwave refractive index $n_m$ in non-modulation region 19b decreases and becomes smaller than microwave refractive index $n_m$ in modulation region 19a, and microwave refractive index $n_m$ of semiconductor optical modulator 1f decreases. In this way, microwave refractive index $n_m$ of semiconductor optical modulator 1f can be brought close to 3.6.

In semiconductor optical modulator 1f, the third impedance of the second line in modulation region 19a may be smaller than 100Ω at a microwave frequency of 20 Gbit/s or more. The fourth impedance of the second line in non-modulation region 19b may be greater than 100Ω, be greater than 110Ω, or be greater than 115Ω at a microwave frequency of 20 Gbit/s or higher. The microwave refractive index in modulation region 19a may be larger than 3.6 at a microwave frequency of 20 Gbit/s or more. The second impedance of the first line in non-modulation region 19b may be smaller than 3.6, be smaller than 3.2, or be smaller than 2.8 at a microwave frequency of 20 Gbit/s or more.

Impedance $Z_2$ of the second line of semiconductor optical modulator 1f and microwave refractive index $n_m$ of semiconductor optical modulator 1f can be adjusted by changing at least one of the ratio of the fourth length of non-modulation region 19b to third width $W_3$ of second ground electrode 17b in non-modulation region 19b, the ratio of the fourth length of non-modulation region 19b to fifth width $W_5$ of third ground electrode 17c in non-modulation region 19b, and the ratio of the fourth length of non-modulation region 19b to the second entire length of unit structure 10f.

Semiconductor optical modulator 1f may include transition region 19c. First insulating layers 28a, 28b are disposed between third optical waveguide 53a and third traveling wave electrode 18a and between fourth optical waveguide 53b and fourth traveling wave electrode 18b in transition region 19c. In semiconductor optical modulator 1f, the width of second ground electrode 17b in transition region 19c is larger than fourth width $W_4$ of second ground electrode 17b in modulation region 19a. The width of third ground electrode 17c in transition region 19c is larger than sixth width $W_6$ of third ground electrode 17c in modulation region 19a. For this reason, even in transition region 19c, the capacitance and microwave refractive index $n_m$ decrease similarly to non-modulation region 19b. In this way, impedance $Z_2$ of the second line of semiconductor optical modulator 1f can be brought close to 100Ω, and microwave refractive index $n_m$ of semiconductor optical modulator 1f can be brought close to 3.6.

The impedance of the second line in transition region 19c may be greater than 100Ω, be greater than 110Ω, or be greater than 115Ω at a microwave frequency of 20 Gbit/s or higher. The microwave refractive index in modulation region 19a may be larger than 3.6 at a microwave frequency of 20 Gbit/s or more. The second impedance of the first line in transition region 19c may be smaller than 3.6, be smaller than 3.2, or be smaller than 2.8 at a microwave frequency of 20 Gbit/s or more.

Impedance $Z_2$ of the second line of semiconductor optical modulator 1f and microwave refractive index $n_m$ of semiconductor optical modulator 1f can be adjusted by changing at least one of the ratio of the length of transition region 19c to the width of second ground electrode 17b in transition region 19c, the ratio of the length of transition region 19c to the width of third ground electrode 17c in transition region 19c, and the ratio of the length of transition region 19c to the second entire length of unit structure 10f.

The effect of semiconductor optical modulator 1f of the sixth embodiment will be described. Semiconductor optical modulator 1f of the sixth embodiment has the same effects as those of semiconductor optical modulator 1e of the fifth embodiment.

In addition to the configuration of semiconductor optical modulator 1e, semiconductor optical modulator 1f includes the second Mach-Zehnder type optical waveguide, third traveling wave electrode 18a, fourth traveling wave electrode 18b, third ground electrode 17c, optical input unit 66, optical branch unit 67 connected to optical input unit 66, optical multiplex unit 68, and optical output unit 69 connected to optical multiplex unit 68. The second Mach-Zehnder type optical waveguide includes second optical input unit 51, second optical branch unit 52 connected to second optical input unit 51, third optical waveguide 53a connected to second optical branch unit 52, fourth optical waveguide 53b connected to second optical branch unit 52, second optical multiplex unit 54 connected to third optical waveguide 53a and fourth optical waveguide 53b, and second optical output unit 55 connected to second optical multiplex unit 54.

Third traveling wave electrode 18a is disposed above third optical waveguide 53a. Fourth traveling wave electrode 18b is disposed above fourth optical waveguide 53b.

Second ground electrode 17b is disposed on the opposite side to fourth traveling wave electrode 18b with respect to third traveling wave electrode 18a, and disposed at a space from third traveling wave electrode 18a. Third ground electrode 17c is disposed on the opposite side to third traveling wave electrode 18a with respect to fourth traveling wave electrode 18b, and disposed at a space from fourth traveling wave electrode 18b. Optical branch unit 67 is connected to first optical input unit 11 and second optical input unit 51. Optical multiplex unit 68 is connected to first optical output unit 15 and second optical output unit 55. Unit structures 10f are arrayed along third optical waveguide 53a and fourth optical waveguide 53b. Fifth width $W_5$ of third ground electrode 17c in non-modulation region 19b is larger than sixth width $W_6$ of third ground electrode 17c in modulation region 19a. In the non-modulation region 19b, first insulating layers 28a, 28b are disposed between third optical waveguide 53a and third traveling wave electrode 18a and between fourth optical waveguide 53b and fourth traveling wave electrode 18b.

In semiconductor optical modulator 1f, the capacitance of non-modulation region 19b is decreased, and capacitance C of semiconductor optical modulator 1f is decreased. For this reason, impedance $Z_1$ of the first line and impedance $Z_2$ of the second line of semiconductor optical modulator 1f can be increased. Microwave refractive index $n_m$ of semiconductor optical modulator 1f can be decreased. Semiconductor optical modulator 1f in which the bandwidth is widened can be provided.

In semiconductor optical modulator 1f, third traveling wave electrode 18a has a constant width in modulation region 19a, non-modulation region 19b, and modulation region 19a. Fourth traveling wave electrode 18b has a constant width in modulation region 19a, non-modulation region 19b, and modulation region 19a. Each of third traveling wave electrode 18a and fourth traveling wave electrode 18b has a simple shape. For this reason, the degradation of the microwave propagation characteristic can be prevented in third traveling wave electrode 18a and fourth traveling wave electrode 18b. Semiconductor optical modulator 1f in which the bandwidth is widened can be provided. Furthermore, the increase in the size of semiconductor optical modulator 1f and the increase of manufacturing cost of semiconductor optical modulator 1f can be prevented.

In semiconductor optical modulator 1f, each of unit structures 10f may include transition region 19c disposed between modulation region 19a and non-modulation region 19b. The first space between first ground electrode 17a and first traveling wave electrode 16a changes gradually in transition region 19c. The second space between second ground electrode 17b and second traveling wave electrode 16b changes gradually in transition region 19c. The third space between second ground electrode 17b and third traveling wave electrode 18a changes gradually in transition region 19c. The fourth space between third ground electrode 17c and fourth traveling wave electrode 18b changes gradually in transition region 19c. The reflection of the microwave propagating through first traveling wave electrode 16a, second traveling wave electrode 16b, third traveling wave electrode 18a, and fourth traveling wave electrode 18b between modulation region 19a and non-modulation region 19b can be decreased in transition region 19c. Semiconductor optical modulator 1f in which the bandwidth is widened can be provided.

The width of first ground electrode 17a in transition region 19c may be larger than second width $W_2$ of first ground electrode 17a in modulation region 19a. The width of second ground electrode 17b in transition region 19c may be larger than fourth width $W_4$ of second ground electrode 17b in modulation region 19a. The width of third ground electrode 17c in transition region 19c may be larger than sixth width $W_6$ of third ground electrode 17c in modulation region 19a. In transition region 19c, first insulating layers 24a, 24b, 28a, 28b may be disposed between first optical waveguide 13a and first traveling wave electrode 16a, between second optical waveguide 13b and second traveling wave electrode 16b, between third optical waveguide 53a and third traveling wave electrode 18a, and between fourth optical waveguide 53b and fourth traveling wave electrode 18b. For this reason, capacitance C of semiconductor optical modulator 1f is further decreased. Semiconductor optical modulator 1f in which the bandwidth is widened can be provided.

In semiconductor optical modulator 1f, the first length of modulation region 19a along first optical waveguide 13a and second optical waveguide 13b ranges from 0.50 times to 0.95 times the first entire length of unit structure 10f along first optical waveguide 13a and second optical waveguide 13b. The second length of non-modulation region 19b along first optical waveguide 13a and second optical waveguide 13b may range from 0.04 times to 0.48 times the first entire length of unit structure 10f. The third length of modulation region 19a along third optical waveguide 53a and fourth optical waveguide 53b may range from 0.50 times to 0.95 times the second entire length of unit structure 10f along third optical waveguide 53a and fourth optical waveguide 53b. The fourth length of non-modulation region 19b along third optical waveguide 53a and fourth optical waveguide 53b may range from 0.04 times to 0.48 times the second entire length of unit structure 10f. The ratio of modulation region 19a to unit structure 10f is made larger than the ratio of non-modulation region 19b to unit structure 10f, thereby suppressing the increase in the size of semiconductor optical modulator 1f and widening the bandwidth of semiconductor optical modulator 1f.

Seventh Embodiment

Figure 36:
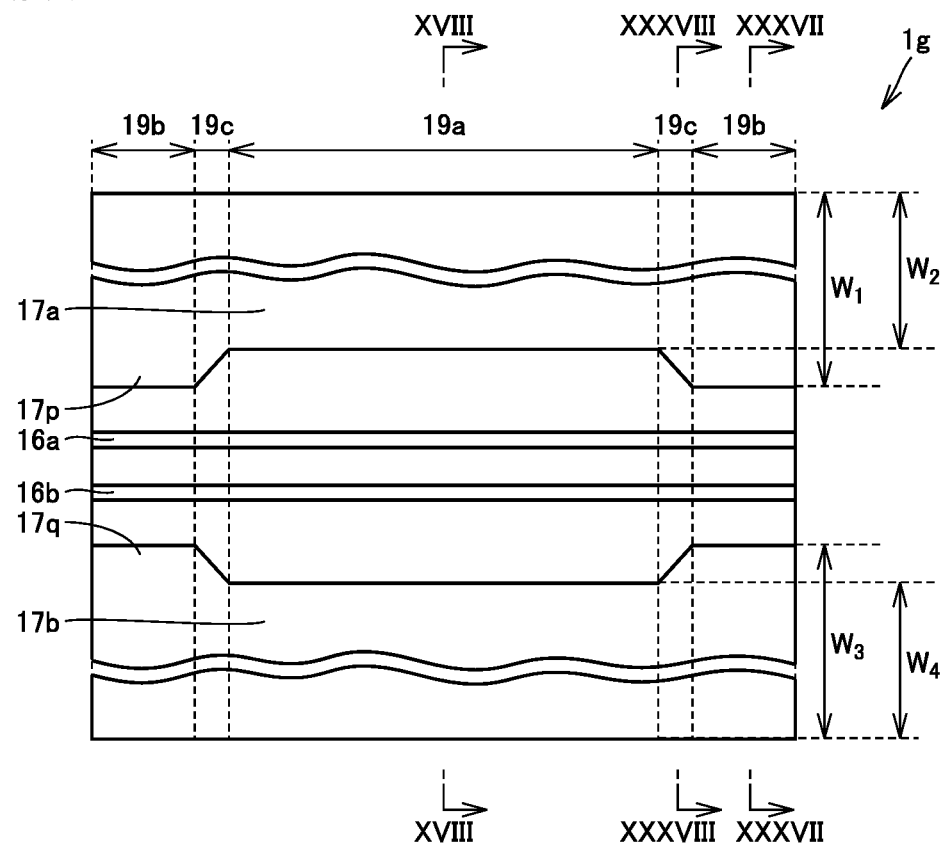
FIG. 36 is a partially enlarged plan view schematically illustrating a semiconductor optical modulator according to a seventh embodiment.
Figure 37:
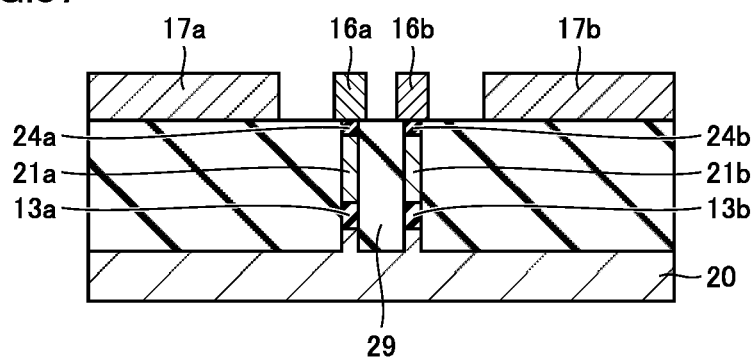
FIG. 37 is a schematic sectional view of the semiconductor optical modulator of the seventh embodiment taken along a sectional line XXXVII-XXXVII in FIG. 36.
Figure 38:
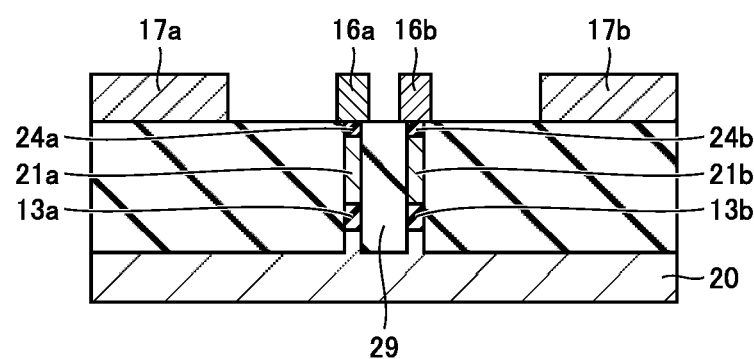
FIG. 38 is a schematic sectional view of the semiconductor optical modulator of the seventh embodiment taken along a sectional line XXXVIII-XXXVIII in FIG. 36.

With reference to FIGS. 36 to 38, a semiconductor optical modulator 1g according to a seventh embodiment will be described. Semiconductor optical modulator 1g of the seventh embodiment has the same configuration as semiconductor optical modulator 1e of the fifth embodiment, but is mainly different from semiconductor optical modulator 1e in the following points.

As illustrated in FIG. 37, in non-modulation region 19b of semiconductor optical modulator 1g, second semiconductor layers 21a, 21b of the fifth embodiment are provided in place of second insulating layers 27a, 27b of the fifth embodiment. As illustrated in FIG. 38, in transition region 19c of semiconductor optical modulator 1g, second semiconductor layers 21a, 21b of the fifth embodiment are provided in place of second insulating layers 27a, 27b of the fifth embodiment.

The effect of semiconductor optical modulator 1g of the seventh embodiment will be described. Semiconductor optical modulator 1g of the seventh embodiment has the following effects in addition to the effects of semiconductor optical modulator 1e of the fifth embodiment.

In semiconductor optical modulator 1g, modulation region 19a and non-modulation region 19b have the same high-mesa optical waveguide structure. For this reason, semiconductor optical modulator 1g has the structure that can easily be manufactured, and a manufacturing error of semiconductor optical modulator 1g can be reduced. Additionally, modulation region 19a, non-modulation region 19b, and transition region 19c may have the same high-mesa optical waveguide structure. For this reason, semiconductor optical modulator 1g has the structure that can easily be manufactured, and a manufacturing error of semiconductor optical modulator 1g can be reduced.

Eighth Embodiment

Figure 39:
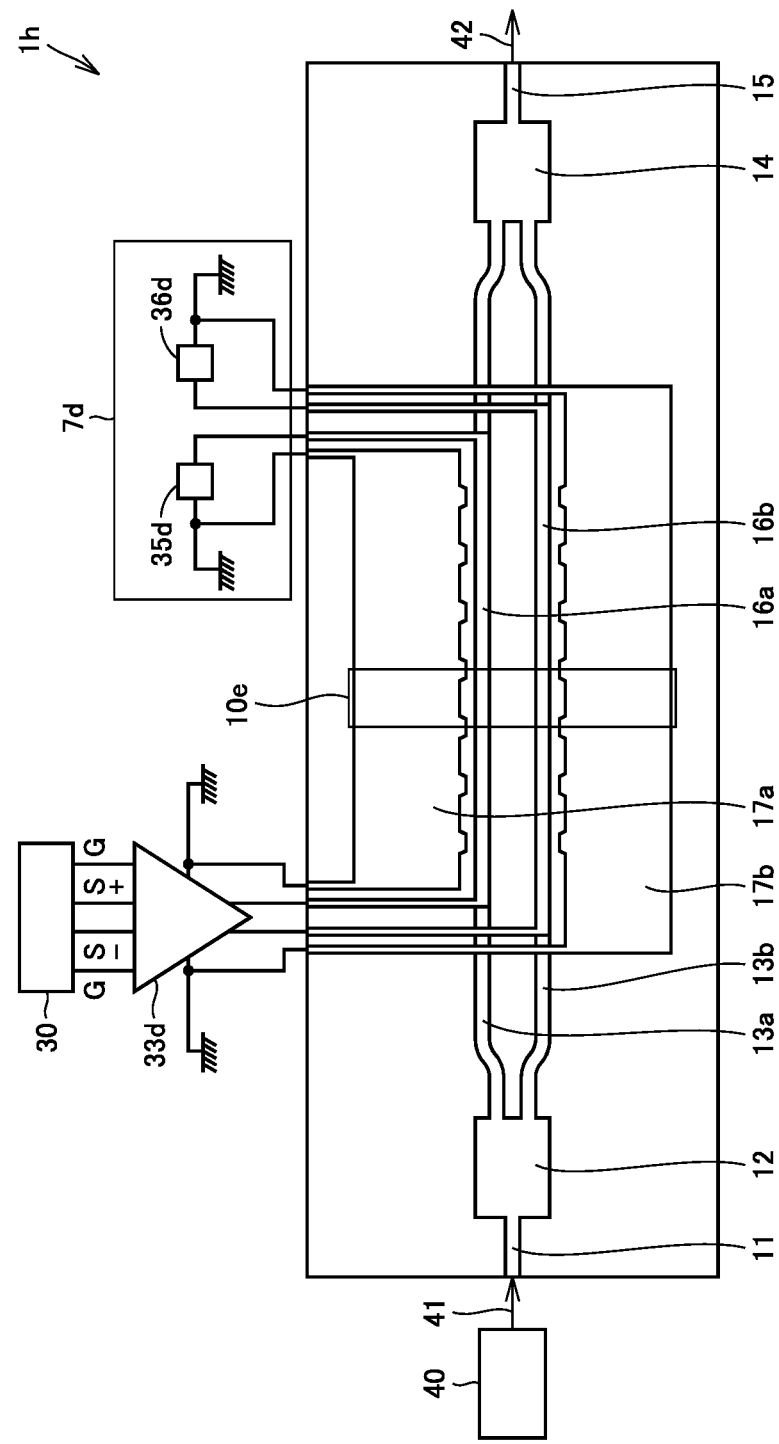
FIG. 39 is a schematic plan view of a semiconductor optical modulator according to an eighth embodiment.

With reference to FIG. 39, a semiconductor optical modulator 1h according to an eighth embodiment will be described. Semiconductor optical modulator 1h of the eighth embodiment has the same configuration as semiconductor optical modulator 1e of the fifth embodiment, but is mainly different from semiconductor optical modulator 1e in the following points.

In semiconductor optical modulator 1h, the differential impedance of termination 7d is less than 100Ω. The differential impedance of termination 7d may be greater than or equal to 25Ω, or be greater than or equal to 50Ω. The impedance of non-modulation region 19b is larger than the first impedance of modulation region 19a. The impedance of transition region 19c is larger than the impedance of modulation region 19a, and is smaller than the impedance of non-modulation region 19b. For example, the differential impedance of termination 7d has the impedance of 70Ω, and each of a first termination resistor 35d and a second termination resistor 36d has the impedance of 35Ω. Modulation region 19a has the impedance less than 70Ω, and non-modulation region 19b has the impedance more than 70Ω. In this way, the impedance of entire semiconductor optical modulator 1h can be brought close to 70Ω.

For example, MAOM-06408 or MAOM-06412 manufactured by MACOM can be used as an electric amplifier 33d that enables the differential impedance of termination 7d to set less than 100Ω.

The effect of semiconductor optical modulator 1h of the eighth embodiment will be described. In addition to the effects of semiconductor optical modulator 1e of the fifth embodiment, semiconductor optical modulator 1h of the eighth embodiment has the following effect.

In semiconductor optical modulator 1h of the eighth embodiment, the differential impedance of termination 7d is less than 100Ω. For this reason, the impedance matching between semiconductor optical modulator 1h and termination 7d can easily be performed without particularly decreasing capacitance C of semiconductor optical modulator 1h as compared with a semiconductor optical modulator in which the differential impedance of the termination has 100Ω. In this way, the bandwidth of semiconductor optical modulator 1h can easily be widened. Semiconductor optical modulator 1h can be downsized.

It should be considered that the disclosed first to eighth embodiments and the modifications thereof are examples in all respects and not restrictive. For example, in the first to eighth embodiments, the InP-based semiconductor optical modulator has been described. However, other semiconductor material-based semiconductor optical modulators such as a GaAs-based semiconductor optical modulator may be used. As long as there is no contradiction, at least two of the disclosed first to eighth embodiments and the modifications thereof may be combined. The scope of the present invention is defined by not the above description but the claims, and it is intended that all modifications within the meaning and scope of the claims are included in the present invention.

REFERENCE SIGNS LIST 1, 1b, 1c, 1d: optical modulator, 1e, 1f, 1g, 1h: semiconductor optical modulator, 5: optical waveguide, 7, 7b, 7d: termination, 10, 10b, 10e, 10f: unit structure, 11: first optical input unit, 12: first optical branch unit, 13a: first optical waveguide, 13b: second optical waveguide, 14: first optical multiplex unit, 15: first optical output unit, 16a: first traveling wave electrode, 16b: second traveling wave electrode, 17a: first ground electrode, 17b: second ground electrode, 17c: third ground electrode, 17p: first protrusion, 17q: second protrusion, 17r: third protrusion, 17s: fourth protrusion, 18a: third traveling wave electrode, 18b: fourth traveling wave electrode, 19a: modulation region, 19b: non-modulation region, 19c: transition region, 20: first semiconductor layer, 21a, 21b, 25a, 25b: second semiconductor layer, 22a, 22b, 26a, 26b: contact layer, 23a, 23b, 27a, 27b: second insulating layer, 24a, 24b, 28a, 28b: first insulating layer, 29: buried layer, 30, 30b: signal source, 33, 33b, 33d: electric amplifier, 35, 35b, 35d: first termination resistor, 36, 36b, 36d: second termination resistor, 40: laser light source, 41: light, 42: modulated light, 51: second optical input unit, 52: second optical branch unit, 53a: third optical waveguide, 53b: fourth optical waveguide, 54: second optical multiplex unit, 55: second optical output unit, 61, 61f: first Mach-Zehnder optical modulator portion, 62, 62f: second Mach-Zehnder optical modulator portion, 66: optical input unit, 67: optical branch unit, 68: optical multiplex unit, 69: optical output unit, 112, 113, 223: ground electrode, 114: first electrode, 116: second electrode, 120: low dielectric constant material layer, 130: n layer, 224: third electrode, 226: fourth electrode, A: modulation portion, B: transition portion, C: non-modulation portion

The invention claimed is:
1. A semiconductor optical modulator comprising:
a first Mach-Zehnder type optical waveguide;
a first traveling wave electrode;
a second traveling wave electrode;
a first ground electrode;
a second ground electrode; and
a first insulating layer,
wherein
the first Mach-Zehnder type optical waveguide includes:
a first optical input unit;
a first optical branch unit connected to the first optical input unit;
a first optical waveguide connected to the first optical branch unit;
a second optical waveguide connected to the first optical branch unit;
a first optical multiplex unit connected to the first optical waveguide and the second optical waveguide; and
a first optical output unit connected to the first optical multiplex unit,
the first traveling wave electrode is disposed above the first optical waveguide,
the second traveling wave electrode is disposed above the second optical waveguide,
the first ground electrode is disposed on a side of the first traveling wave electrode, and disposed at a space from the first traveling wave electrode, the second traveling wave electrode is disposed on an opposite side of the first traveling wave electrode as compared to the first ground electrode, the second ground electrode is disposed on a side of the second traveling wave electrode, and disposed at a space from the second traveling wave electrode, the first traveling electrode is disposed on an opposite side of the second traveling wave electrode as compared to the second ground electrode, the semiconductor optical modulator includes unit structures arrayed along the first optical waveguide and the second optical waveguide, each of the unit structures includes a modulation region and a non-modulation region, a first width of the first ground electrode in the non-modulation region is different from a second width of the first ground electrode in the modulation region, a third width of the second ground electrode in the non-modulation region is different from a fourth width of the second ground electrode in the modulation region, and in the non-modulation region, a second insulating layer is stacked on the first optical waveguide and the second optical waveguide, the first insulating layer is stacked on the second insulating layer, and the first traveling wave electrode and the second traveling wave electrode are stacked on the first insulating layer.

2. The semiconductor optical modulator according to claim 1, wherein the first width of the first ground electrode in the non-modulation region is smaller than the second width of the first ground electrode in the modulation region, and the third width of the second ground electrode in the non-modulation region is smaller than the fourth width of the second ground electrode in the modulation region.

3. The semiconductor optical modulator according to claim 2, further comprising a termination connected to the first traveling wave electrode and the second traveling wave electrode, wherein a differential impedance of the termination is less than $100\Omega$.

4. The semiconductor optical modulator according to claim 2, wherein each of the unit structures includes a transition region disposed between the modulation region and the non-modulation region, a first space between the first traveling wave electrode and the second traveling wave electrode changes gradually in the transition region from the modulation region to the non-modulation region, and a width of the first ground electrode in a perpendicular direction that is perpendicular to a longest dimension of the first optical waveguide and a width of the second ground electrode in the perpendicular direction change gradually in the transition region from the modulation region to the non-modulation region.

5. The semiconductor optical modulator according to claim 2, further comprising:

a second Mach-Zehnder type optical waveguide;
a third traveling wave electrode;
a fourth traveling wave electrode;
a third around electrode;
an optical input unit;
an optical branch unit connected to the optical input unit;
an optical multiplex unit; and
an optical output unit connected to the optical multiplex unit,
wherein the second Mach-Zehnder type optical waveguide includes:

a second optical input unit;
a second optical branch unit connected to the second optical put unit;
a third optical waveguide connected to the second optical branch unit;
a fourth optical waveguide connected to the second optical branch unit;
a second optical multiplex unit connected to the third optical waveguide and the fourth optical waveguide; and
a second optical output unit connected to the second optical multiplex unit, the third traveling wave electrode is disposed above the third optical waveguide, the fourth traveling wave electrode is disposed above the fourth optical waveguide, the second ground electrode is disposed on a side of the third traveling wave electrode, and disposed at a space from the third traveling wave electrode, the fourth traveling wave electrode is disposed on an opposite side of the third traveling wave electrode as compared to the second ground electrode, the third ground electrode is disposed on a side of the fourth traveling wave electrode, and disposed at a space from the fourth traveling wave electrode, the third traveling wave electrode is disposed on an opposite side of the fourth traveling wave electrode as compared to the third ground electrode, the optical branch unit is connected to the first optical input unit and the second optical input unit, the optical multiplex unit is connected to the first optical output unit and the second optical output unit, the unit structures are arrayed along the third optical waveguide and the fourth optical waveguide, a fifth width of the third ground electrode in the non-modulation region is smaller than a sixth width of the third ground electrode in the modulation region, and the first insulating layer is disposed between the third optical waveguide and the third traveling wave electrode and between the fourth optical waveguide and the fourth traveling wave electrode in the non-modulation region.

6. The semiconductor optical modulator according to claim 5, wherein each of the unit structures includes a transition region disposed between the modulation region and the non-modulation region, a first space between the first traveling wave electrode and the second traveling wave electrode changes gradually in the transition region, the width of the first ground electrode and the width of the second ground electrode change gradually in the transition region, a second space between the third traveling wave electrode and the fourth traveling wave electrode changes gradually in the transition region, and the width of the second ground electrode and a width of the third ground electrode change gradually in the transition region.

7. The semiconductor optical modulator according to claim 1, wherein the first width of the first ground electrode in the non-modulation region is greater than the second width of the first ground electrode in the modulation region, and the third width of the second ground electrode in the non-modulation region is larger than the fourth width of the second ground electrode in the modulation region.

8. The semiconductor optical modulator according to claim 7, wherein
the first traveling wave electrode has a constant width in the modulation region, the non-modulation region, and the modulation region, and
the second traveling wave electrode has a constant width in the modulation region, the non-modulation region, and the modulation region.

9. The semiconductor optical modulator according to claim 7, further comprising a termination connected to the first traveling wave electrode and the second traveling wave electrode,
wherein a differential impedance of the termination is less than 100Ω.

10. The semiconductor optical modulator according to claim 7, wherein
each of the unit structures includes a transition region disposed between the modulation region and the non-modulation region,
a first space between the first ground electrode and the first traveling wave electrode changes gradually in the transition region, and
a second space between the second ground electrode and the second traveling wave electrode changes gradually in the transition region.

11. The semiconductor optical modulator according to claim 7, further comprising:
a second Mach-Zehnder type optical waveguide;
a third traveling wave electrode;
a fourth traveling wave electrode;
a third ground electrode;
an optical input unit;
an optical branch unit connected to the optical input unit;
an optical multiplex unit; and
an optical output unit connected to the optical multiplex unit,
wherein
the second Mach-Zehnder type optical waveguide includes:
a second optical input unit;
a second optical branch unit connected to the second optical input unit;
a third optical waveguide connected to the second optical branch unit;
a fourth optical waveguide connected to the second optical branch unit;
a second optical multiplex unit connected to the third optical waveguide and the fourth optical waveguide; and
a second optical output unit connected to the second optical multiplex unit,
the third traveling wave electrode is disposed above the third optical waveguide,
the fourth traveling wave electrode is disposed above the fourth optical waveguide,
the second ground electrode is disposed on a side of the third traveling wave electrode, and disposed at a space from the third traveling wave electrode, the fourth traveling wave electrode is disposed on an opposite side of the third traveling wave electrode as compared to the second ground electrode,
the third ground electrode is disposed on a side of the fourth traveling wave electrode, and disposed at a space from the fourth traveling wave electrode, the third traveling wave electrode is disposed on an opposite side of the fourth traveling wave electrode as compared to the third ground electrode,
the optical branch unit is connected to the first optical input unit and the second optical input unit,
the optical multiplex unit is connected to the first optical output unit and the second optical output unit,
the unit structures are arrayed along the third optical waveguide and the fourth optical waveguide,
a fifth width of the third ground electrode in the non-modulation region is larger than a sixth width of the third ground electrode in the modulation region, and
the first insulating layer is disposed between the third optical waveguide and the third traveling wave electrode and between the fourth optical waveguide and the fourth traveling wave electrode in the non-modulation region.

12. The semiconductor optical modulator according to claim 11, wherein
the third traveling wave electrode has a constant width in the modulation region, the non-modulation region, and the modulation region, and
the fourth traveling wave electrode has a constant width in the modulation region, the non-modulation region, and the modulation region.

13. The semiconductor optical modulator according to claim 11, wherein
each of the unit structures includes a transition region disposed between the modulation region and the non-modulation region,
a first space between the first ground electrode and the first traveling wave electrode changes gradually in the transition region,
a second space between the second ground electrode and the second traveling wave electrode changes gradually in the transition region,
a third space between the second ground electrode and the third traveling wave electrode changes gradually in the transition region, and
a fourth space between the third ground electrode and the fourth traveling wave electrode changes gradually in the transition region.

* * * * *